US006970925B1

(12) United States Patent
Springmeyer et al.

(10) Patent No.: US 6,970,925 B1
(45) Date of Patent: Nov. 29, 2005

(54) METHOD AND SYSTEM FOR PROPERTY NOTIFICATION

(75) Inventors: Stephen Springmeyer, Bellevue, WA (US); Richard Hasha, Seattle, WA (US)

(73) Assignee: William H. Gates, III, Medina, WA (US)

( * ) Notice: Subject to any disclaimer, the term of this patent is extended or adjusted under 35 U.S.C. 154(b) by 0 days.

(21) Appl. No.: 09/322,457

(22) Filed: May 28, 1999

Related U.S. Application Data

(60) Provisional application No. 60/118,668, filed on Feb. 3, 1999.

(51) Int. Cl.$^7$ .......................... G06F 15/173; G06F 9/46
(52) U.S. Cl. ....................................... 709/224; 718/104
(58) Field of Search ........................... 709/1, 100–108, 709/200–224; 718/1, 104

(56) References Cited

U.S. PATENT DOCUMENTS

| | | | | |
|---|---|---|---|---|
| 5,315,703 A | | 5/1994 | Matheny et al. ............ | 395/164 |
| 5,390,328 A | | 2/1995 | Frey et al. .................. | 395/650 |
| 5,603,034 A | * | 2/1997 | Swanson ..................... | 717/111 |
| 5,925,108 A | * | 7/1999 | Johnson et al. ............. | 709/300 |
| 5,983,190 A | * | 11/1999 | Trower, II et al. .......... | 704/276 |
| 5,991,536 A | * | 11/1999 | Brodsky et al. ............. | 395/704 |
| 6,073,184 A | * | 6/2000 | Couturier et al. ........... | 709/313 |
| 6,085,198 A | * | 7/2000 | Skinner et al. ............. | 707/103 |
| 6,185,613 B1 | * | 2/2001 | Lawson et al. ............. | 709/224 |
| 6,275,957 B1 | * | 8/2001 | Novik et al. ................. | 714/39 |
| 6,282,568 B1 | * | 8/2001 | Sondur et al. ............... | 709/223 |
| 6,308,179 B1 | * | 10/2001 | Petersen et al. ............ | 707/102 |
| 6,311,206 B1 | * | 10/2001 | Malkin et al. .............. | 709/202 |
| 6,353,926 B1 | * | 3/2002 | Parthesarathy et al. ..... | 717/170 |
| 6,397,244 B1 | * | 5/2002 | Morimoto et al. .......... | 709/200 |
| 6,438,216 B1 | * | 8/2002 | Aktas ....................... | 379/88.01 |
| 6,489,974 B1 | * | 12/2002 | Johnson et al. ............. | 345/772 |

FOREIGN PATENT DOCUMENTS

| | | |
|---|---|---|
| EP | 0735469 A2 | 10/1996 |
| WO | WO 98/49618 | 11/1998 |

OTHER PUBLICATIONS

Bushby, "Bacnet: A Standard Communication Infrastructure for Intelligent Buildings" Automation in Construction, NL, Elsevier Science Publishers, Amsterdam, NL, vol. 6, No. 5–6, XP004100759.

"Customizing the Lan Netview Fix Action Table" IBM Technical Disclosure Bulletin, US, IBM Corp., New York, vol.37, No. 4B, XP000451194.

(Continued)

*Primary Examiner*—Meng-Al T. An
*Assistant Examiner*—Kenneth Tang
(74) *Attorney, Agent, or Firm*—Woodcock Washburn LLP

(57) ABSTRACT

A method system for tracking the state of an entity (e.g., an object) on behalf of a client (e.g., an application program). The states of an entity include up and down. The tracking system of the present invention receives a request from a client to track the state of an entity. The tracking system then watches the state of the entity to detect when the entity enters the up state. When the entity enters the up state, the tracking system performs a behavior that is specified by the client to be performed when the entity enters the up state. When the entity is in the up state, the tracking system monitors the state of the entity to detect when the entity enters the down state. When the entity enters the down state, the tracking system performs a behavior that is specified by the client to be performed when the entity enters the down state. When the tracking system receives a request from the client for a pointer to the entity, the tracking system determines the current state of the entity and either provides a pointer to the entity or indicates that a pointer is not being provided.

16 Claims, 70 Drawing Sheets

OTHER PUBLICATIONS

"Dynamic Object Temporary Stop/Disappearance Notification/Permission" IBM Technical Disclosure Bulletin, US, IBM Corp., New York, vol. 38, No. 12, XP000588187.

Garcia–Molina et al., "Ordered and Reliable Multicast Communication" ACM Transactions on Computer Systems, US, Association for Computing Machinery, New York, vol. 9, No. 3, XP000266186.

Attiya et al., "Sequential Consistency Versus Linearizability" ACM Transactions on Computer Systems, US, Association for Computing Machinery, New York, vol. 12, No. 2, XP000484232.

International Business Machine Corporation, "SOMobjects Developer Toolkit. Users Guide. An Introductory Guide to the System Object Model and Its Accompanying Frameworks. Version 2.1", XP002004062.

Stevenson et al., "Client–Server in Multi–Server Operating Systems: The Mach–US Approach" 'Online!, XP002140278.

Object Management Group, "The Common Object Request Broker: Architecture and Specification. Revision 2.0" Corba Specification, Jul. 1995, XP002139668.

Patterson et al., "Notification Servers for Synchronous Groupware" ACM Conference on Computer Supported Cooperative Work '96, US, New York, NY, XP000724417.

Wegner, "Frameworks for Compound Active Documents (Draft)" 'Online!, XP002140277.

Sony et al., "The HAVI Specification: Specification of the Home Audio/Video Interoperability (HAVI) Architecture: Version 1.0 Beta." HAVI Organization, San Ramon, CA, US, XP002116332.

* cited by examiner

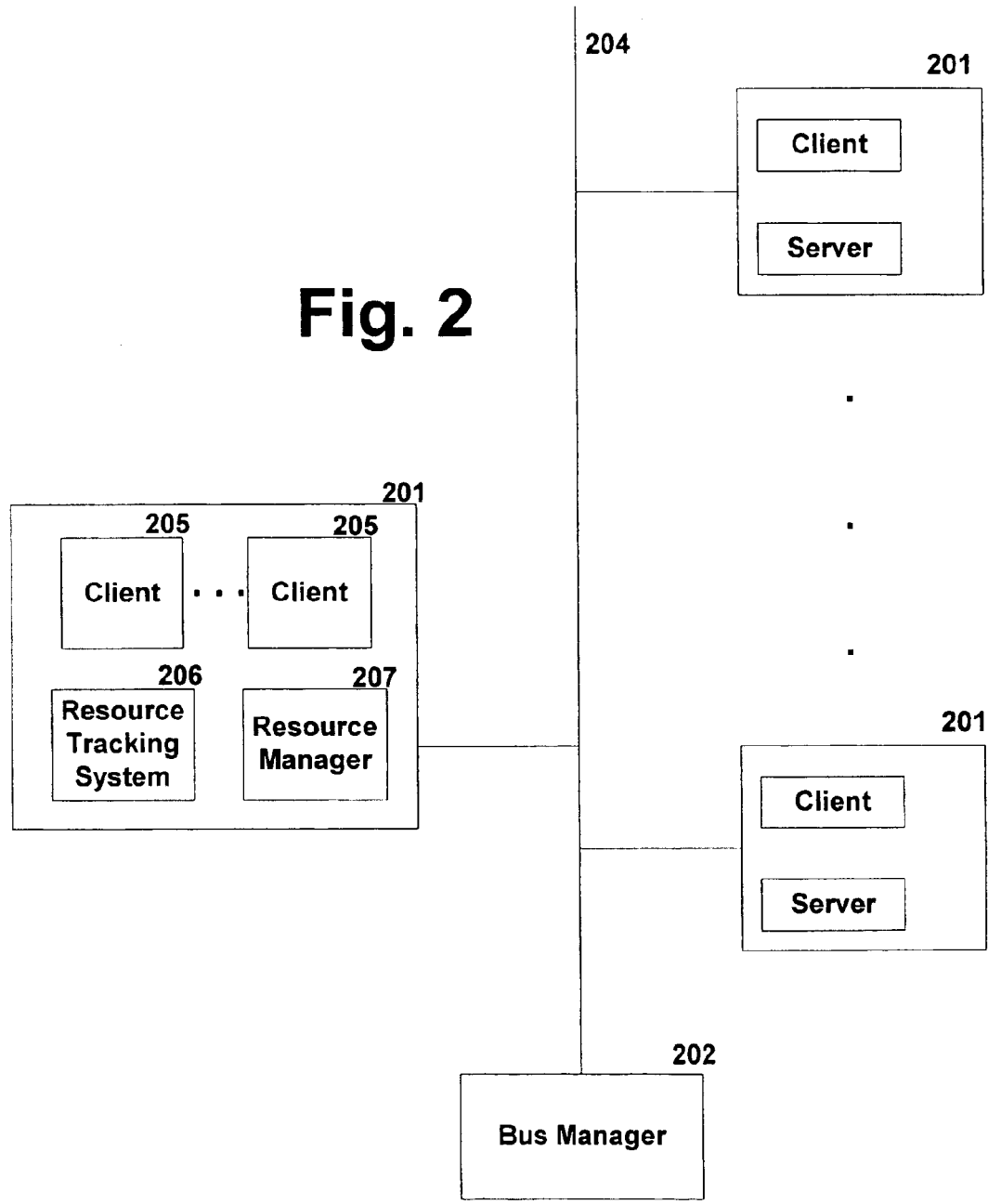

METHOD AND SYSTEM FOR PROPERTY NOTIFICATION

CROSS-REFERENCE TO RELATED APPLICATIONS

This application is related to U.S. Patent Application No. 60/118,668, entitled "COMMON DISTRIBUTED OBJECT PLATFORM," filed on Feb. 3, 1999; U.S. patent application Ser. No. 09/322,455, entitled "METHOD AND SYSTEM FOR TRACKING SOFTWARE COMPONENTS," filed on May 28, 1999, now U.S. Pat. No. 6,721,898 issued Apr. 13, 2004; U.S. patent application Ser. No. 09/322,962, entitled "METHOD AND SYSTEM FOR TRACKING CLIENTS," filed on May 28, 1999, now U.S. Pat. No. 6,684,246 issued on Jan. 27, 2004; U.S. patent application Ser. No. 09/322,643, entitled "AUDIO VISUAL ARCHITECTURE," filed on May 28, 1999; U.S. patent application Ser. No. 09/322,459, entitled "METHOD AND SYSTEM FOR CONTROLLING ENVIRONMENTAL CONDITIONS," filed on May 28, 1999, now U.S. Pat. No. 6,466,234 issued Oct. 15, 2002 ; U.S. patent application Ser. No. 09/322,207, entitled "METHOD AND SYSTEM FOR DISTRIBUTING ART," filed on May 28, 1999, now U.S Pat. No. 6,670,934 issued on Dec. 30, 2003; U.S. patent application Ser. No. 09/322,964, entitled "METHOD AND SYSTEM FOR GENERATING A USER INTERFACE FOR DISTRIBUTED DEVICES," filed on May 28, 1999; and U.S. patent application Ser. No. 09/322,852, entitled "METHOD AND SYSTEM FOR MANAGING SOFTWARE COMPONENTS," filed on May 28, 1999, the disclosures of which are incorporated herein by reference.

TECHNICAL FIELD

The present invention relates generally to a computer system for tracking references to objects and, more particularly, to a system that encapsulates the complexities of tracking objects as they come up and go down.

BACKGROUND

The tracking of objects in computer systems can involve very complex processes. The processes are complex because the number of objects may be in the thousands, the objects may be distributed across many different computer systems, and the objects may frequently change states. For example, a distributed system to control the various systems in a large building may include hundreds of computers. These computers may control the lighting systems, the heating systems, the elevators, and various electronic systems (e.g., a television and a laserdisc player). The distributed system may instantiate an object for each of the devices that can be controlled or that can receive input or output. For example, an object may be instantiated for each light that can be separately controlled, and an object may be instantiated for each light switch. The number of such devices in a large building can be very large.

Such large distributed systems need to ensure that they can function even when portions of the system fail or go off-line for maintenance. For example, when one object goes down because of a failure of one computer, the objects that reference that failed object should not also fail. In addition, when the failed object eventually comes up, the objects that reference that failed object should be able to continue to access the object. This tracking of objects as they go down and come up can be very complex. For example, in a large distributed system, there may be no guarantee that messages relating to when an object comes up or goes down are received in the order in which they are generated or even received at all. Thus, applications accessing the objects need to perform these complex processes to ensure that references are current. Current object models, however, provide very little support for tracking objects in such complex systems.

Current object models, such as Microsoft's Component Object Model ("COM"), facilitate the implementing of complex systems that may use hundreds or thousands of objects. COM is more fully described in "Inside COM" by Dale Rogerson and published by Microsoft Press in 1997. COM specifies that each object is to implement a certain interface referred to as the IUknown interface. An interface is a collection of functions that all are generally semantically related. The IUnknown interface provides a query interface function, an add reference function, and a release function. The query interface function is passed the identifier of an interface and returns a reference to that interface. The add reference and the release functions are used for reference counting the object. Each object that conforms to COM implements the IUknown interface.

A client that requests to instantiate a COM object may receive a pointer to the IUknown interface in return. The client may then invoke the query interface function passing the identifier of another interface supported by that COM object. The query interface function returns a pointer to the requested interface. The client can then use the pointer to invoke one of the functions of the requested interface. Each interface of a COM object inherits the IUknown interface. Thus, each of these interfaces provide access to other interfaces and provides reference counting. Whenever a client duplicates a pointer to an interface of a COM object, the client is expected to invoke the add reference function, which increments the reference count to that COM object. Whenever the client no longer needs a pointer to an interface of a COM object, the client is expected to invoke the release function, which decrements the reference count to that COM object and destructs the COM object when the reference count goes to 0.

SUMMARY

A method and system for tracking the state of an entity (e.g., an object) on behalf of a client (e.g., an application program) is provided. The states of an entity include up and down. The tracking system of the present invention receives a request from a client to track the state of an entity. The tracking system then watches the state of the entity to detect when the entity enters the up state. When the entity enters the up state, the tracking system performs a behavior (e.g., notification) that is specified by the client to be performed when the entity enters the up state. When the entity is in the up state, the tracking system monitors the state of the entity to detect when the entity enters the down state. When the entity enters the down state, the tracking system performs a behavior (e.g., notification) that is specified by the client to be performed when the entity enters the down state. When the tracking system receives a request from the client for a reference to the entity, the tracking system determines the current state of the entity and either provides a reference to the entity or indicates that a reference is not being provided. Such a reference allows a client to access the behavior of the entity. For example, the reference may be a pointer and the behavior is accessed by invoking a function of the entity using the pointer.

In one embodiment, the tracking system receives notifications when the state of the entity has changed. When a notification is received, the tracking system retrieves a pointer to the entity. If the tracking system had previously retrieved a pointer to the entity, the tracking system determines whether the previously retrieved pointer and the newly retrieved pointer point to the sane occurrence (e.g., instantiation) of the entity. If the references do not point to the same occurrence, then the tracking system notifies the client that the entity has gone down and then notifies the client that the entity has come up. In this way, the client is made aware that the previously retrieved pointer is out-of-date and that a newly retrieved pointer is available. In one embodiment, the tracking system determines whether the pointers point to the same occurrence based on the time at which the occurrences were created.

BRIEF DESCRIPTION OF THE DRAWINGS

FIG. 2 is a block diagram illustrating the components of a system that uses the object tracking system.

DETAILED DESCRIPTION

A method and system for tracking the state of objects and references to the objects is provided. The object tracking system in one embodiment provides an asynchronous notification mechanism for notifying a client, when an object that is referenced by the client changes state in a distributed object environment. An object can be either in an up state (e.g., instantiated) or a down state (e.g., destructed). The object tracking system also provides a mechanism through which a client can register its interest in accessing an object, can retrieve a pointer to the object when the object is in the up state, and can unregister its interest in accessing the object. The object tracking system interacts with an object manager that provides the facility to locate objects, to monitor the state of objects, and to retrieve pointers to the objects. The object manager notifies the object tracking system when objects change state. The object tracking system hides the complexities of tracking object state changes from the clients by working in conjunction with an installable object manager. In one embodiment, the object tracking system allows multiple clients to register their interests in the same object. A client as used in this specification refers to a process, a thread of execution within a process, a routine, a module, a program, or some other programming entity that may need to track changes in state of an object.

Figure 1:
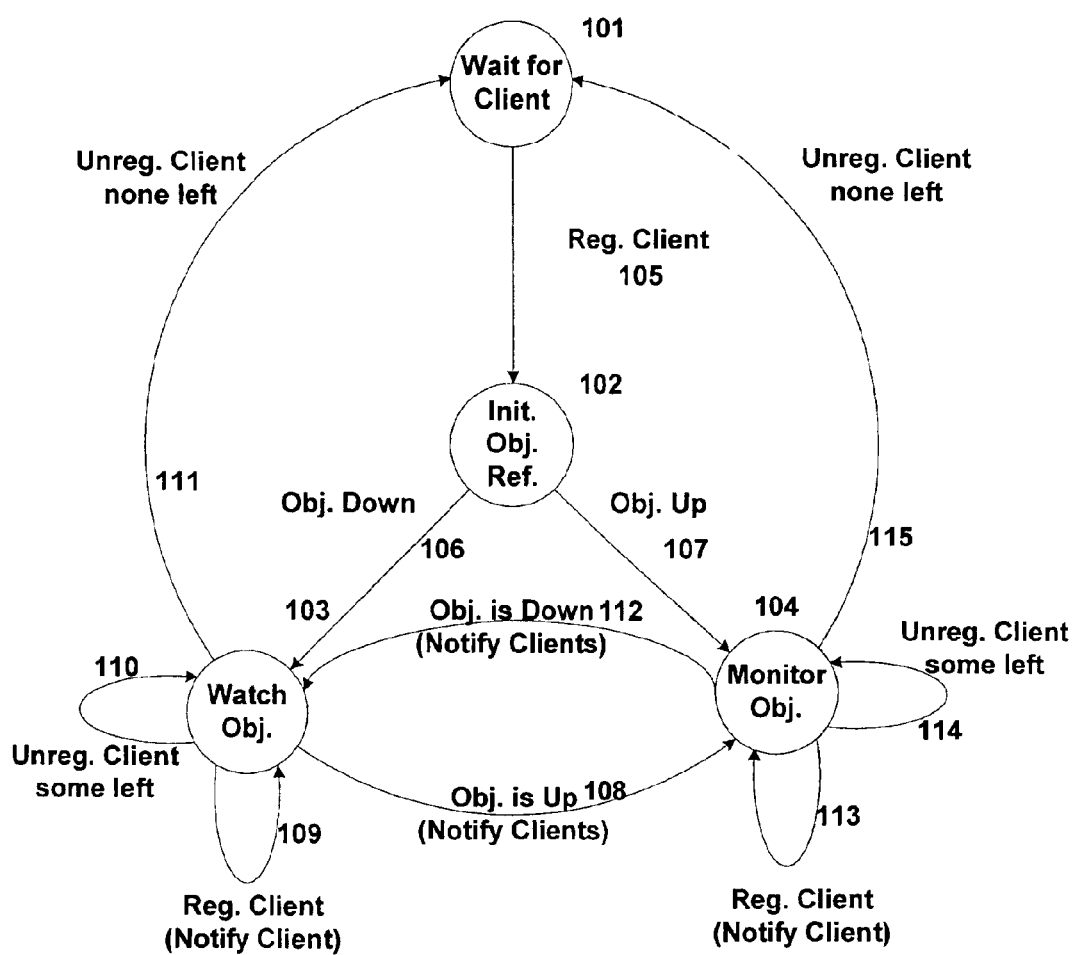
FIG. 1 is a state diagram that shows the state of the object tracking system while it tracks an object.

FIG. 1 is a state diagram that shows the state of the object tracking system while it tracks an object. The four states are waiting for a client to register an interest in the object 101, initializing a reference to the object 102, watching for the object to enter the up state 103, and monitoring the object to enter the down state 104. When the object tracking system is in the waiting for a client state and it receives a register client request 105, it enters the initializing object reference state. During the initializing object reference state, the object tracking system creates the data structures necessary to track the object for the client and determines the current state of the object. If the object is in the up state, then the object tracking system notifies the client that the object is up 107 and enters the monitoring object state, else the object tracking system notifies the client that the object is down 106 and enters the watching object state. In the watching object state, the object tracking system waits until it receives notification from the object manager that the object has entered the up state 108 and when notification is received, it notifies the clients and provides a pointer to the object and enters the monitoring object state. If the object tracking system receives a register client request 109 while in the watching object state, it allocates the data structures for tracking the object for that client, notifies the client that the object is down, and stays in the watching object state. If the object tracking system receives a request to unregister a client 110–111, it deallocates the data structures for tracking that object for the client. The object tracking system then enters the waiting for client state if no clients are left as registered. Otherwise, the object tracking system stays in the watching object state. In the monitoring object state, the object tracking system waits until it receives notification from the object manager that the object has entered the down state, and when so notified, it notifies the clients 112 and enters the watching object state. If the object tracking system receives a register client request 113 while in the monitoring object state, it allocates the data structures for tracking the object for the client, notifies the client that the object is up, and stays in the monitoring object state. If the object tracking system receives a request to unregister a client 114–115, it deallocates the data structures for tracking that object for the client. The object tracking system then enters the waiting for client state if no clients are left as registered. Otherwise, the object tracking system stays in the monitoring object state. The term "component" refers to any hardware or software entity that can be tracked. A hardware component may be a device such as a CD player, and a software component may be a computer routine, object, thread, process, and so on. A software component may serve to control a hardware component. For example, a software component may serve as a programmatic interface to a CD player. The objects and resources are types of software components; and the object tracking system can be used to track any software component. A "tracking reference" is a reference that identifies a software component and can be used to request that the availability of a software component be tracked. A software component that requests that another software component be tracked may be notified when the tracked software component becomes available (up) and unavailable (down). When a software component becomes available a "behavioral reference" can be retrieved and used to access the behavior of the software component so long as the software component stays available. For example, a tracking reference may be the name of a software component, and a behavioral reference may be a pointer to a software component.

The object tracking system correctly tracks the state of objects in environments where the objects are long-lived and where there is no guarantee that notification of changes in the state of objects will be received in the same order as they are generated. For example, an object may correspond to and monitor a real-world component (e.g., a light). Since the real-world component is always in an up state in the sense that it can always be utilized, the corresponding object should always be in the up state. A client that also corresponds to a real-world component (e.g., a light switch) that wants to control the physical state of another real-world component (e.g., the light) may register an interest in the object that controls the other real-world component. While the client is executing, it may not need to actually access the object for long periods of time. During that time period, the object may occasionally enter the down state because, for example, the computer on which the object resides has a failure or a new version of code for the object is provided. The object tracking system tracks these changes of states and notifies the client. When the client eventually decides to access the object, it requests the object tracking system to provide a pointer to the object.

The object tracking system also tracks each new instantiation of an object to help ensure that current behavioral reference (e.g., pointer) held by the object tracking system points to the currently instantiated object. In one embodiment, the object tracking system uses the creation time of different instantiations of the same object to ensure the validity of a pointer. A problem may arise if the object tracking system receives notifications from the object manager that are out of order. For example, the object tracking system may receive two notifications that an object is up without receiving an intervening notification that the object is down. The two notifications that the object is up may correspond to either redundant notifications (e.g., because of retransmission) or notifications of two different is instantiations of the object. Since the object tracking system may have a pointer to the object, it needs to ensure that the pointer is correct. In certain situations there is no guarantee that two pointers to the same instantiation of an object will be the same. In particular, the object may want to track the particular client to which a pointer is provided and may provide different valued pointers to track which client is accessing the object. For example, the object may want to track the clients to enforce different access rights for different clients. To ensure the pointer is current, the object tracking system compares the creation time of the current object with the creation time of the object whose pointer it has. If the times are equal, then the object tracking system does not need to notify the clients that the object has changed state. If, however, the creation times are different, then the object tracking system can notify the clients and the clients can request new pointers as appropriate.

FIG. 2 is a block diagram illustrating the components of a system that uses the object tracking system. In the following, the terms "object" and "resource" are used interchangeably. These terms refer to any software entity that can be tracked and that may correspond to a real-world component. The system includes nodes 201 and a bus manager 202 that are interconnected through a communications link or bus 204. The communications link can be any physical or logical means for communicating between entities. Each node may contain resources that request access to other resources. A resource that requests access to another resource is referred to as a client resource or client, and a resource that is accessed by another resource is referred to as a server resource or server. The bus manager tracks all the resources as they come up and go down. The bus manager receives notifications when each resource comes up and goes down. Each node on which a resource is located, referred to as a server node, notifies the bus manager when a resource comes up in that node, in a process referred to as "attaching," and notifies the bus manager when a resource goes down, in a process referred to as "detaching."

The watching of a resource is coordinated by the bus manager, but the monitoring of a resource is performed on a client-to-server node basis without interaction from the bus manager. When a client wants to watch a resource so that it knows when the resource is in the up state, the client node notifies the bus manager. The resource is identified using a tracking reference. If the resource is already up, then the bus manager then notifies the client node that the resource is up. Otherwise, the bus manager notifies the client node when the resource comes up. When the client node is notified that the resource is up, it may notify the bus manager to stop watching for the resource. The monitoring of a resource is performed on a peer-to-peer basis. That is, once a client node is informed that a resource has entered the up state, it establishes a connection directly with the server node that contains the resource. Once the connection is established, the client node notifies the server node periodically note that is up and running. If the server node does not receive this notification, it assumes that the client node is no longer up and running and resets its internal state accordingly. Similarly, if the client node receives an error when sending its periodic notification to the server node, it assumes the server node is down and resets its internal state accordingly. When the resource goes down, the server node notifies the client node that the resource is now down. Each node includes clients 205, a resource tracking system 206, and a resource manager 207. A client requests the resource tracking system to provide pointers to resources and to notify the client when resources come up or go down. The resource tracking system interacts with the resource manager to watch, monitor, and retrieve pointers to the resource. The resource manager also detects when resources on its node come up and go down and notifies the bus manager or other nodes as appropriate. The nodes may all be computer systems with a central processing unit, memory, and input/output devices. The software components and data structures of these nodes may be stored on computer-readable medium such as memory, CD-ROM, flexible disk, hard disk, and so on and may transmitted via a data transmission medium.

Figure 2A:
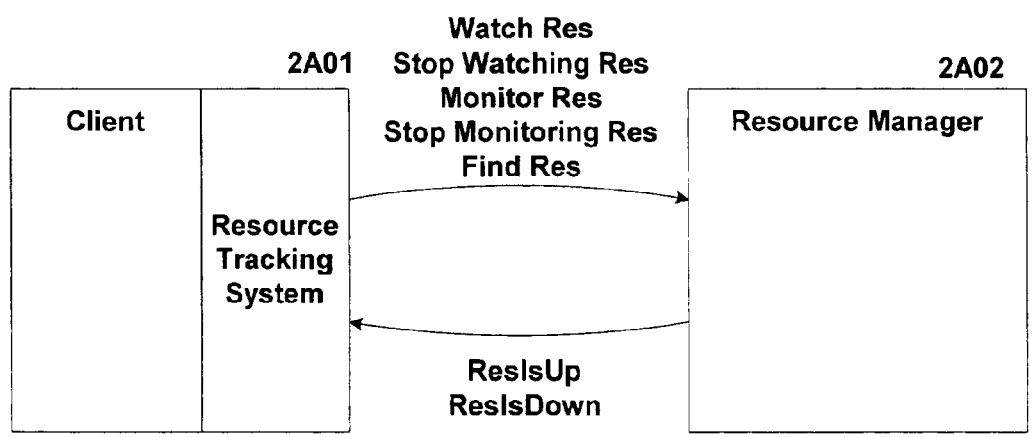
FIG. 2A is a block diagram illustrating the communications between a client and a resource manager.

FIG. 2A is a block diagram illustrating the communications between a client and a resource manager. Client 2A01 sends various messages to the resource manager 2A02 to request the watching and the monitoring of resources. The resource manager notifies the client by sending messages to the client that the resource has come up or gone down. In one embodiment, the message passing is generally performed by invoking functions of various objects that have the same name as the message. The client sends a watch resource message to request the resource manager to start watching for a resource to come up. The client sends a stop watching resource message to the resource manager to indicate that the client no longer wants or needs the resource manager to watch for a certain resource. The client sends a monitor resource message to request the resource manager to start monitoring for a resource that is up to go down. The resource manager detects (e.g., by receiving messages from the bus manager) when a resource that is being watched goes up and detects (e.g., by receiving an attach or detach message from the node on which the resource is located) when a resource that is being monitored goes down and sends a resource is up or a resource is down message to the client. The resource tracking system serves as an interface of the client to the resource manager.

Figure 2B:
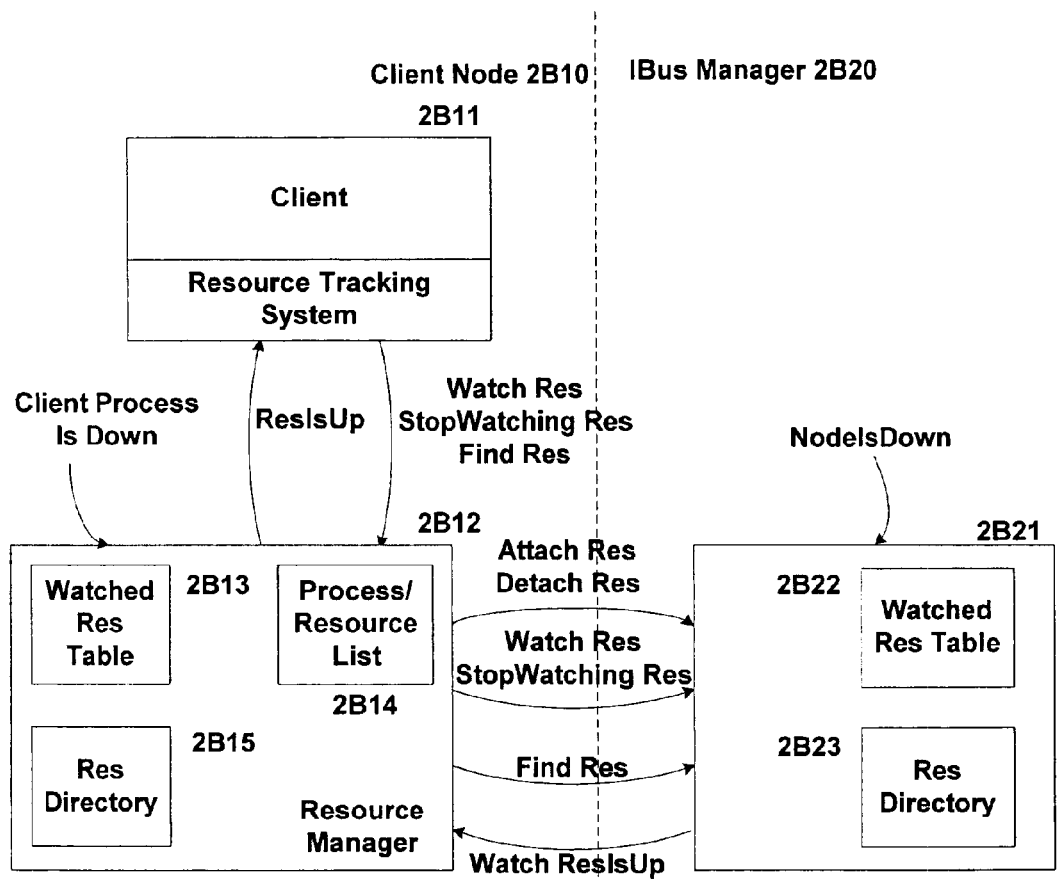
FIG. 2B is a block diagram illustrating the watching of a resource.

FIG. 2B is a block diagram illustrating the watching of a resource. The client node 2B10 is a node on which a client 2B11 has requested to watch for a certain resource to come up. The client node tracks the resource with components 2B12 of the resource manager. The resource manager includes a watched resource table 2B13, a process/resource list 2B14, and resource directory 2B15. The client and the resource manager interact as described in FIG. 2A. The resource manager interacts with a bus manager 2B20 to notify the bus manager when resources of that node go up and come down and to request that the bus manager watch for a resource on the client node's behalf. The bus manager includes a bus manager component 2B21 that has a watched resource table 2B22 and a resource directory 2B23. The watched resource table at the client node contains an indication of each resource that a client located at that node has requested to watch along with an indication of the requesting client. The resource directory at the client node contains the identification of each resource that is currently up at the client node. The resource manager uses the resource directory to re-notify the bus manager of the resources that are up in the event that the bus manager goes down and then comes back up or when another bus manager takes control of the bus. The resource manager similarly uses the watched resource table to re-notify the bus manager of the resources that its clients are watching. The process/resource list identifies each resource by the process in which it is executing. When a process goes down, the resource manager can use the process/resource list to notify the bus manager that those resources are now down. The client node sends to the bus manager an attach resource message whenever a resource comes up and a detach resource message whenever a resource goes down. The client node sends a watch resource message to the bus manager to notify the bus manager to start watching for a particular resource to come up. The client node keeps track of the resources that it is watching in the watched resource table. If a client requests to watch a resource that another client on the same node is already watching, then the client node does not need to send another watch resource message to the bus manager. The client node sends a stop watching resource message to the bus manager whenever it wants to stop watching for a resource to come up. The client node may want to stop watching for a resource whenever all of its clients who were watching the resource request to stop watching the resource or whenever the resource comes up. The client node sends a find resource message to the bus manager when it wants to retrieve a pointer to a resource. When a client comes up, the bus manager sends a watched resource is up message to each client node that is watching that resource. The watched resource table of the bus manager contains an identifier of each resource that is being watched and the client node that requested a watch of that resource. The resource directory of the bus manager contains an identifier of and a pointer to each resource that is currently up. When the bus manager receives an attach resource message, it updates the resource directory to indicate that the resource is up. It then checks the watched resource table to determine whether any client nodes are watching that resource. If so, the bus manager sends a watched resource is up message to each such client node. When the bus manager receives a detach resource message, it updates its resource directory to indicate that the resource is now down. When the bus manager receives a node is down message, it effectively detaches all resources that were attached at the node that is now down and effectively stops all the watches from that node.

Figure 2C:
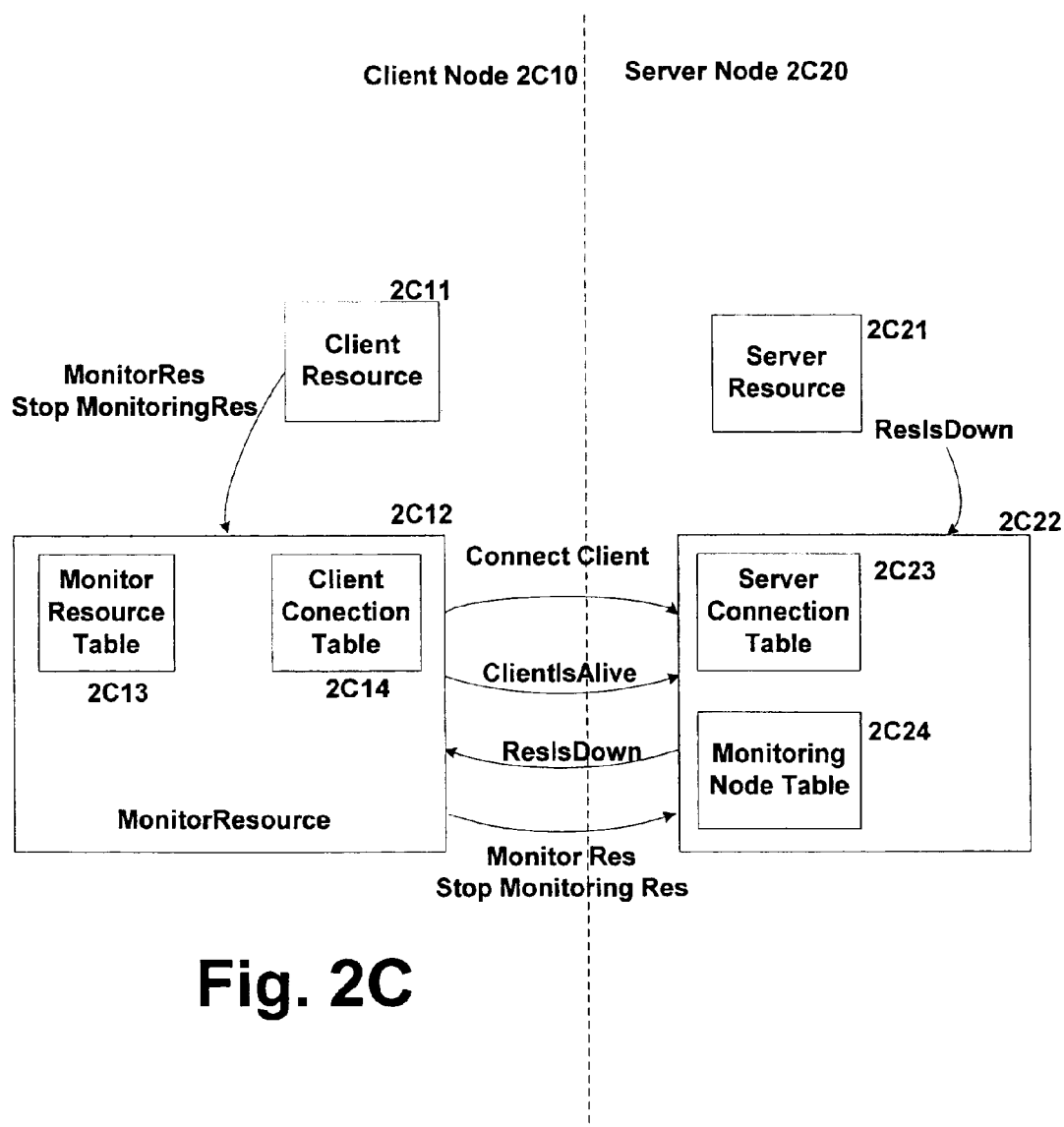
FIG. 2C is a block diagram illustrating the monitoring of a resource.

FIG. 2C is a block diagram illustrating the monitoring of a resource. The client node 2C10 includes a client resource 2C11 and a client-side monitor resource component 2C12, which is part of the resource manager. The server node 2C20 includes a server resource 2C21 and a server-side monitor resource component 2C22, which is part of the resource manager. The server-side monitor resource component and the client-side monitor resource component interact to effect the monitoring of resources on a peer-to-peer basis. Each node may be both a server node and a client node and thus may have both server-side and client-side monitor resource components. When a client wants to start monitoring a resource or to stop monitoring a resource, it sends a monitor resource or a stop monitoring resource message to the resource manager as described in FIG. 2A. When the client node receives a request to monitor a resource from a client on that node, it uses the reference to the resource passed by the client to identify the server node at which the resource is located. The client node then sends a connect client message to the server node if a connection is not already established. The connect client message includes a pointer to an interface of the client node along with a client context for the client node. When the server node receives the connect client request, it determines whether a connection has already been established with that client node. If a connection has already been established, then the server node assumes that the client node has gone down since the connection was last established and adjusts its state accordingly and returns an error to the client node. Otherwise, the server node returns a server context. If the client receives an error in return, it can again attempt to establish a connection with the server node. The combination of client context and server context uniquely identifies the connection. The client node periodically notifies the server node that the client node is still alive by sending a client is alive message. If the server node detects that a client is alive message has not been received from the client node during that period, then the server node assumes that the client node is down and cancels the connection with the client node. After a connection is established, the client node requests to monitor resources on a per resource basis. The client node sends a monitor resource message or a stop monitoring resource message to the server node identifying the resource. The server node records a mapping between the resource and the client node and notifies the client node when that resource goes down. If the resource is down when the monitor resource message is received, then the server node notifies the client node that the resource is down. The client node maintains a monitor resource table 2C13 and a client connection table 2C14. The monitor resource table contains a mapping of resources being monitored to the clients that requested to monitor the resources. The client connection table contains the identification of the server node to which the client nodes is connected along with the client context and the server context for the current connection. The server connection table 2C23 contains references to the client nodes to which the server node is connected along with the client context and the server context for the current connection. The monitoring node table 2C24 contains a mapping from each resource that is being monitored to the monitoring client nodes.

1. Resource Tracking System/Resource Manager Interface

Figure 3:
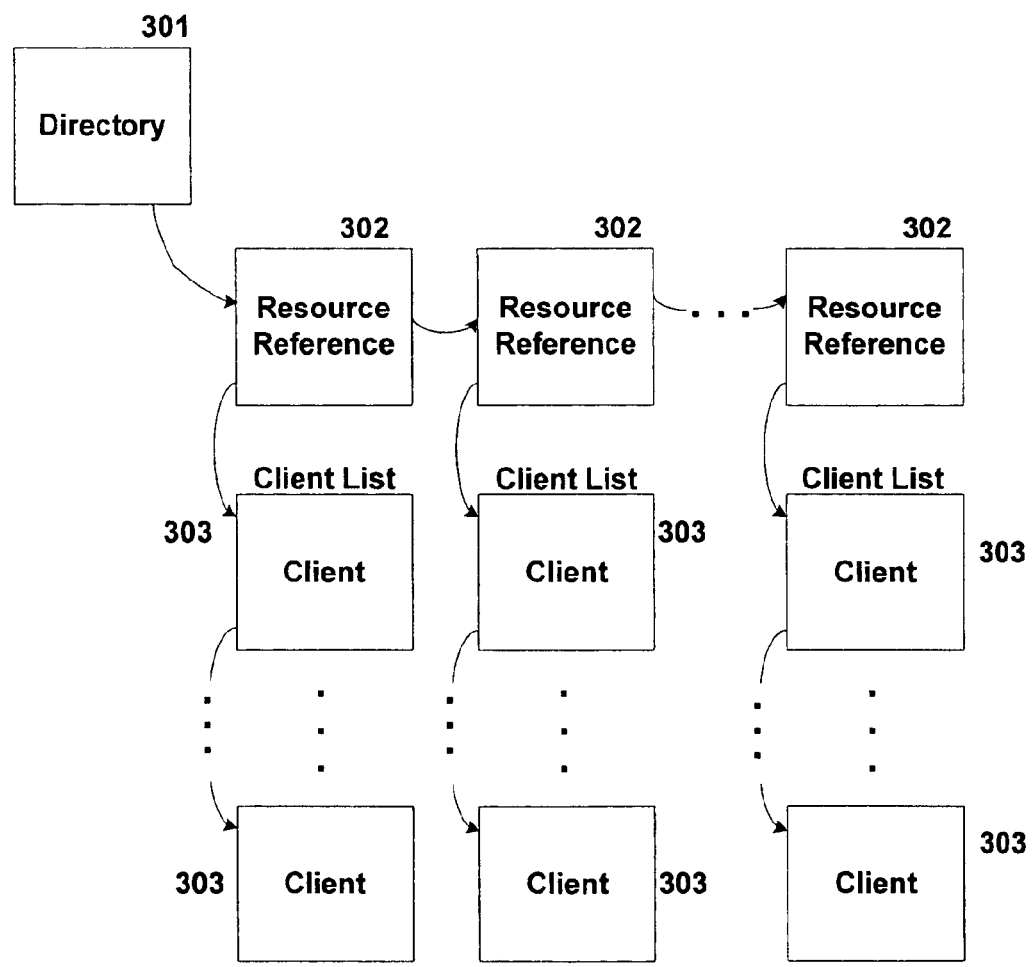
FIG. 3 is a block diagram illustrating data structures of the resource tracking system.

FIG. 3 is a block diagram illustrating data structures of the resource tracking system. The resource tracking system provides a directory object 301, a list of resource reference objects 302, and, for each resource reference object, a list of client objects 303. The directory object provides functions for controlling the access to resources by interacting with an installable resource manager. The directory object maintains a resource reference object for each resource that a client has registered to track. Each resource reference object contains the name of the resource and, if the resource is up, a unique instance identifier of the resource (e.g., a pointer to the resource and the time at which the resource was created).

Each resource reference object also contains a pointer to a client list of client objects that each represent a client that has registered to track the corresponding resource. Whenever a client wants to reference to a resource, it supplies a client object to the resource tracking system. This client object includes functions that the resource tracking system uses to notify the client when the resource changes its state (e.g., a call-back routine). Since these data structures may be accessed concurrently by multiple threads of execution, a concurrency management technique is used when accessing these data structures. For example, before accessing a data structure, a thread may lock the data structure and then unlock it after the access is complete. In the following, the description of the functions that access these data structures omit these well-known concurrency management techniques.

Figure 4:
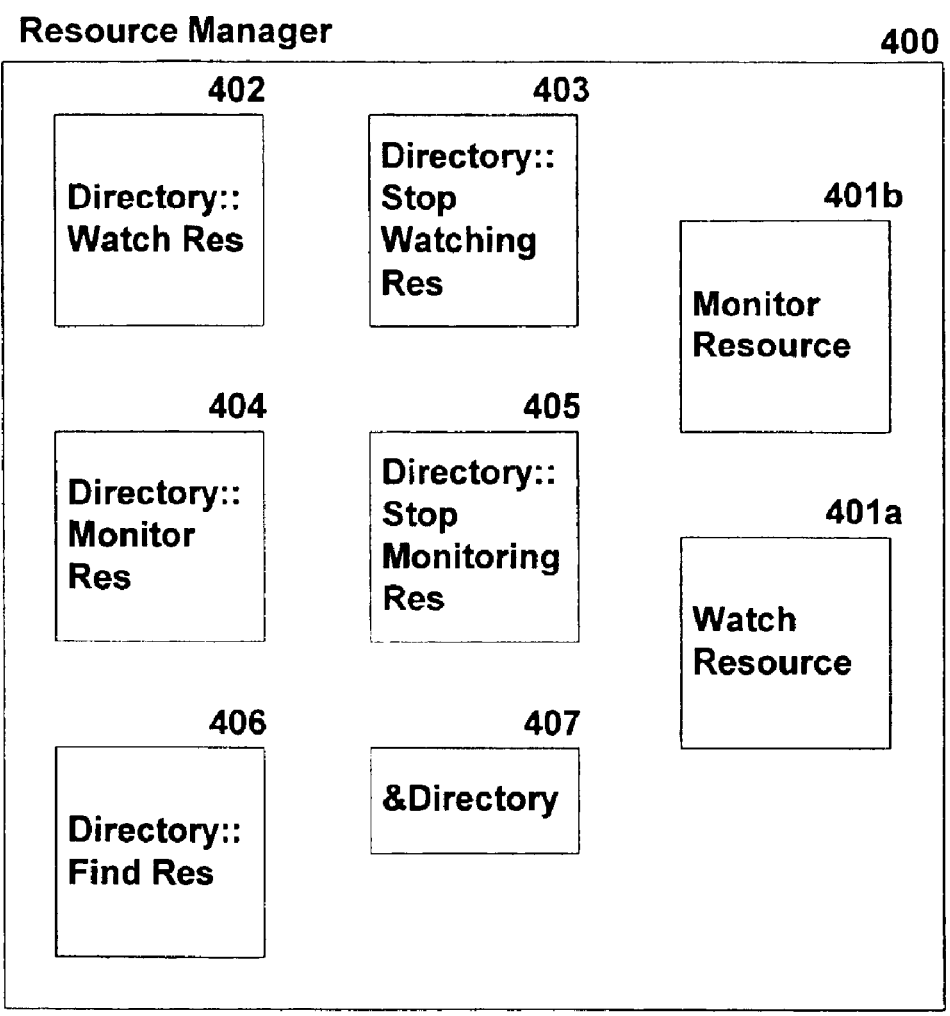
FIG. 4 is a block diagram illustrating components of the resource manager.

FIG. 4 is a block diagram illustrating components of the resource manager. The resource manager 400 includes a watch resource component 401 a and monitor resource component 401b, an implementation of resource tracking functions of the directory object 402–406, and a reference 407 to the directory object. The resource manager provides the implementation of the resource tracking functions so that the resource tracking system can be independent of the particular resource manager. For example, the resource manager may manage resources in the same computer in which the clients execute or on different computers that are connected via a local area network or connected via the Internet. Thus, the resource manager is installable in the sense that the resource tracking system can interact with any resource manager that provides these functions and notifies the resource tracking system by invoking certain functions as specified below. The watch resource component and the monitor resource component each provide sub-components to support watching and monitoring of resources.

Figure 5:
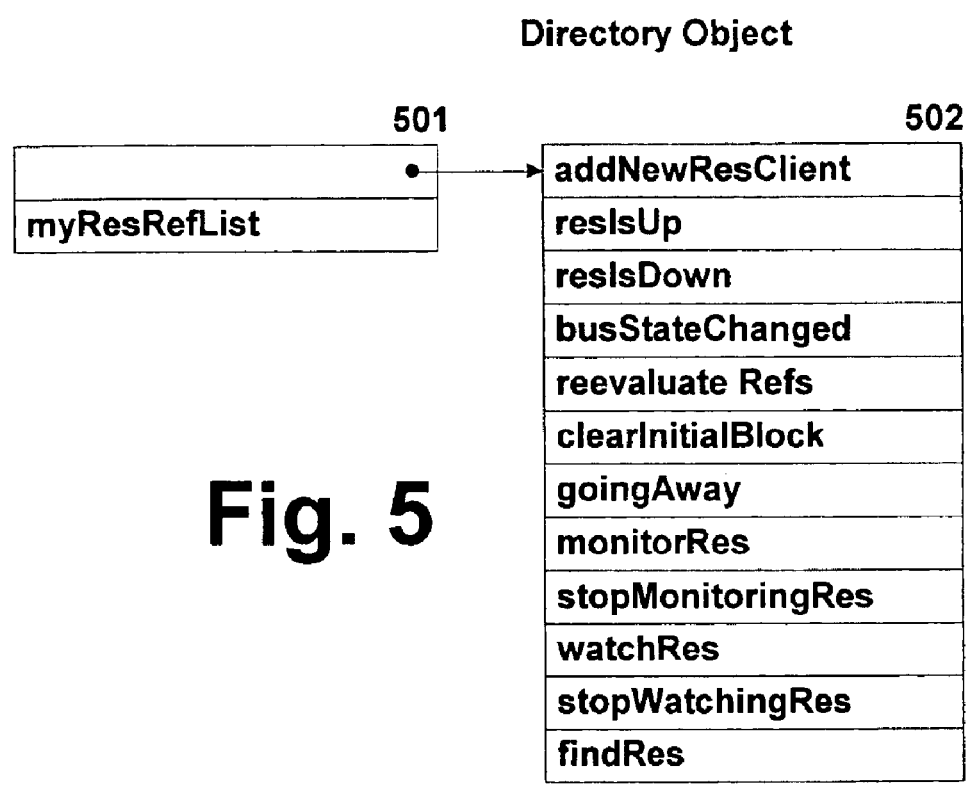
FIGS. 5–7 illustrate the data structures of the objects of the resource tracking system.
Figure 6:
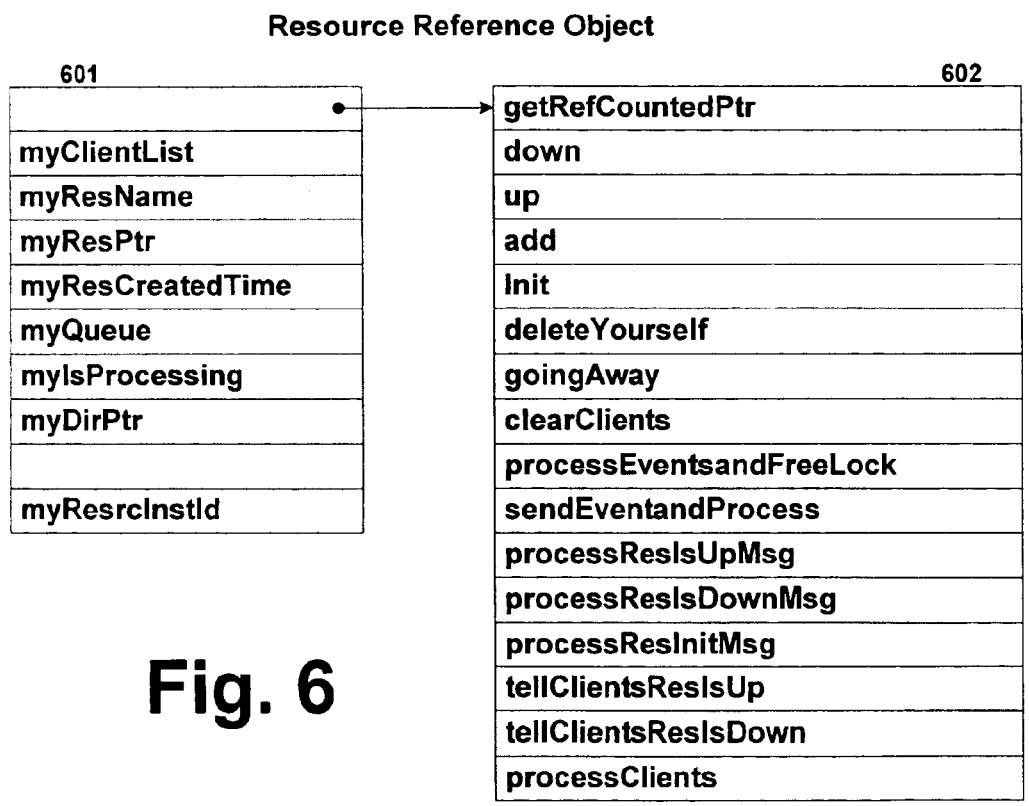
Figure 7:
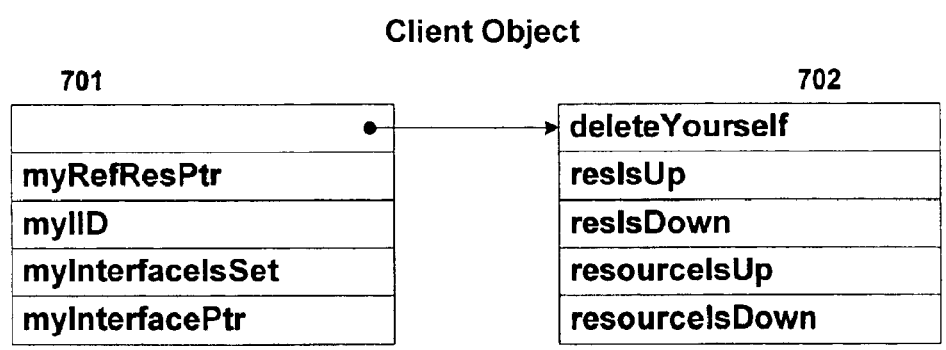

FIGS. 5–7 illustrate the data structures of the objects of the resource tracking system. The tables on the left 501, 601, 701 contain the data of the objects and the tables on the right to 502, 602, 702 contain the names of the functions of the objects. Table 1 contains a description of the data and functions of each of these objects.

TABLE 1

| Name | Description |
|---|---|
| | Directory Object |
| myResRefList | A pointer to the resource reference list for this directory object. |
| addNewResClient | A function that is invoked by a client to register that it wants to track a resource. |
| resIsUp | A function that is invoked by the resource manager to notify the resource tracking system that a resource is up. |
| resIsDown | A function that is invoked by the resource manager to notify the resource tracking system that a resource is down. |
| busStateChanged | A function that is invoked by the resource manager to notify the resource tracking system that the bus has changed state (i.e., came up or gone down). |
| reevaluateRefs | A function that is invoked by the resource manager to notify the resource tracking system to reset all its references to the down state. |
| clearInitialBlock | A function that is invoked by the resource manager to notify the resource tracking system to start processing notifications. |
| goingAway | A function that is invoked by a resource reference object to notify the directory object that a resource reference object is going away. |

TABLE 1-continued

| Name | Description |
|---|---|
| | Directory Object |
| monitorRes | A function that is implemented by the resource manager and invoked by the resource tracking system to notify the resource manager to start monitoring a resource to go down. This function may be provided as a derivation of the directory object. |
| stopMonitoringRes | A function that is implemented by the resource manager and invoked by the resource tracking system to nofify the resource manager to stop monitoring a resource to go down. This function may be provided as a derivation of the directory object. |
| watchRes | A function that is implemented by the resource manager and invoked by the resource tracking system to notify the resource manager to start watching for a resource to come up. This function may be provided as a derivation of the directory object. |
| stopWatchingRes | A function that is implemented by the resource manager and invoked by the resource tracking system to notify the resource manager to stop watching for a resource to come up. This function may be provided as a derivation of the directory object. |
| finders | A function that is implemented by the resource manager and invoked by the resource tracking system to retrieve a pointer to a resource. This function may be provided as a derivation of the directory object. |
| | Resource Reference Object |
| myClientList | A pointer to the client list for this resource reference object. |
| myResName | The name of the resource. |
| myResPtr | A pointer to the resource. |
| myResCreatedTime | The time when the resource was created. |
| myQueue | A queue for notifications relating to this resource. |
| myIsProcessing | A flag indicating that a thread is processing the notifications that are on the queue. |
| myDirPtr | A pointer to the directory object. |
| myResrcInstId | A synonym for the name of the resource. |
| getRefCountedPtr | A function that returns a reference counted pointer to the resource. |
| down | A function that is invoked by the directory object to indicate that the resource has gone down. |
| up | A function that is invoked by the directory object to indicate that the resource has come up. |
| add | A function that adds a client object to the client list for this resource reference object. |
| init | A function invoked by the directory object to initialize the resource reference object. |
| deleteYourself | A function that is invoked by the directory object when it is destructed. |
| goingAway | A function that is called by a client object to notify the resource reference object that the client object is being deleted. |
| clearClients | A function that is invoked to remove the client objects from the client list. |
| processEventsandFreeLock | A function that processes the notifications that are on the queue. |
| sendEventandProcess | A function that adds notifications onto the queue. |
| processResIsUpMsg | A function that processes a notification that a resource is up. |
| processResIsDownMsg | A function that processes a notification that a resource is down. |
| processResInitMsg | A function that processes a notification to initialize this resource reference object. |
| tellClientsResIsUp | A function that is invoked to notify clients that a resource is up. |
| tellClientsResIsDown | A function that is invoked to notify clients that a resource is down. |
| processClients | A function that is invoked to invoke a passed function for each client object in the client list for this resource reference object. |

TABLE 1-continued

| Name | Description |
|---|---|
| | Directory Object |
| | Client Object |
| myRefResPtr | A pointer to the resource reference object for this client object. |
| myIID | The interface identifier of the interface of the resource that the client wants returned. |
| myInterfaceIsSet | A flag that indicates whether the client wants a pointer maintained to a specific interface of the resource. |
| myInterfacePtr | The pointer to the interface. |
| getRefCountedPtr | A function that returns a reference counted pointer to the resource. |
| getInterfacePtr | A function that returns a pointer to the interface. |
| deleteYourself | A function that is invoked by thh resource reference object when it is deleting itself. |
| resIsUp | A function that is invoked by the resource reference object to notify this client object that the resource is up. |
| init | A function that initializes the client object. |
| resIsDown | A function that is invoked by the resource reference object to notify this client object that the resource is down. |
| resourceIsUp | A function provided by the client that is invoked by this client object to notify the client that the resource is up. This function may be provided as a derivation of the client object. |
| resourceIsDown | A function provided by the client that is invoked by this client object to notify the client that the resource is down. This function may be provided as a derivation of the client object. |

A pointer used may be "smart pointer" such that when a pointer is copied it is automatically reference counted; when the pointer is reset, it is automatically released. When a smart pointer goes out of scope, its destructor releases it. The myResPtr of the resource reference object and myRefResPtr of the client object are smart pointers.

Figure 8:
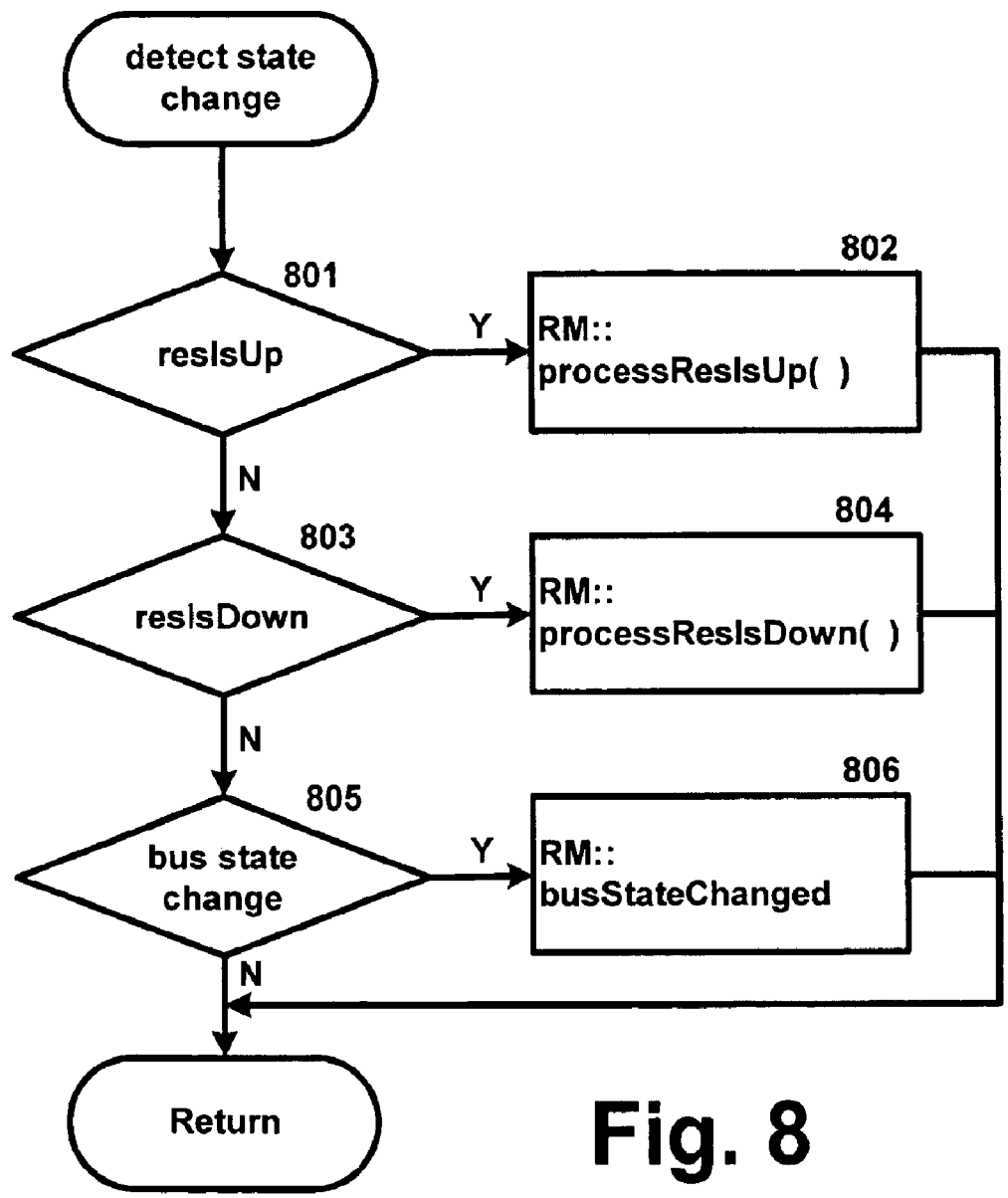
FIG. 8 is a flow diagram of an example implementation of the resource monitor component of the resource manager.

FIG. 8 is a flow diagram of an example implementation of the resource manager when it detects a change in state of a resource that is being watched or monitored by a client on this node. In step 801, if the resource manager detects that a resource has come up, then, in step 802, the resource manager invokes its processResIsUp function passing an identifier of the resource. In step 803, if the resource manager detects that the resource has gone down as indicated by the server node, then, in step 804, the resource manager invokes its processResIsDown function passing an identifier of the resource. In step 805, if the resource manager detects a change in the state of the bus, then, in step 806, the resource manager invokes its busStateChange function.

Figure 9:
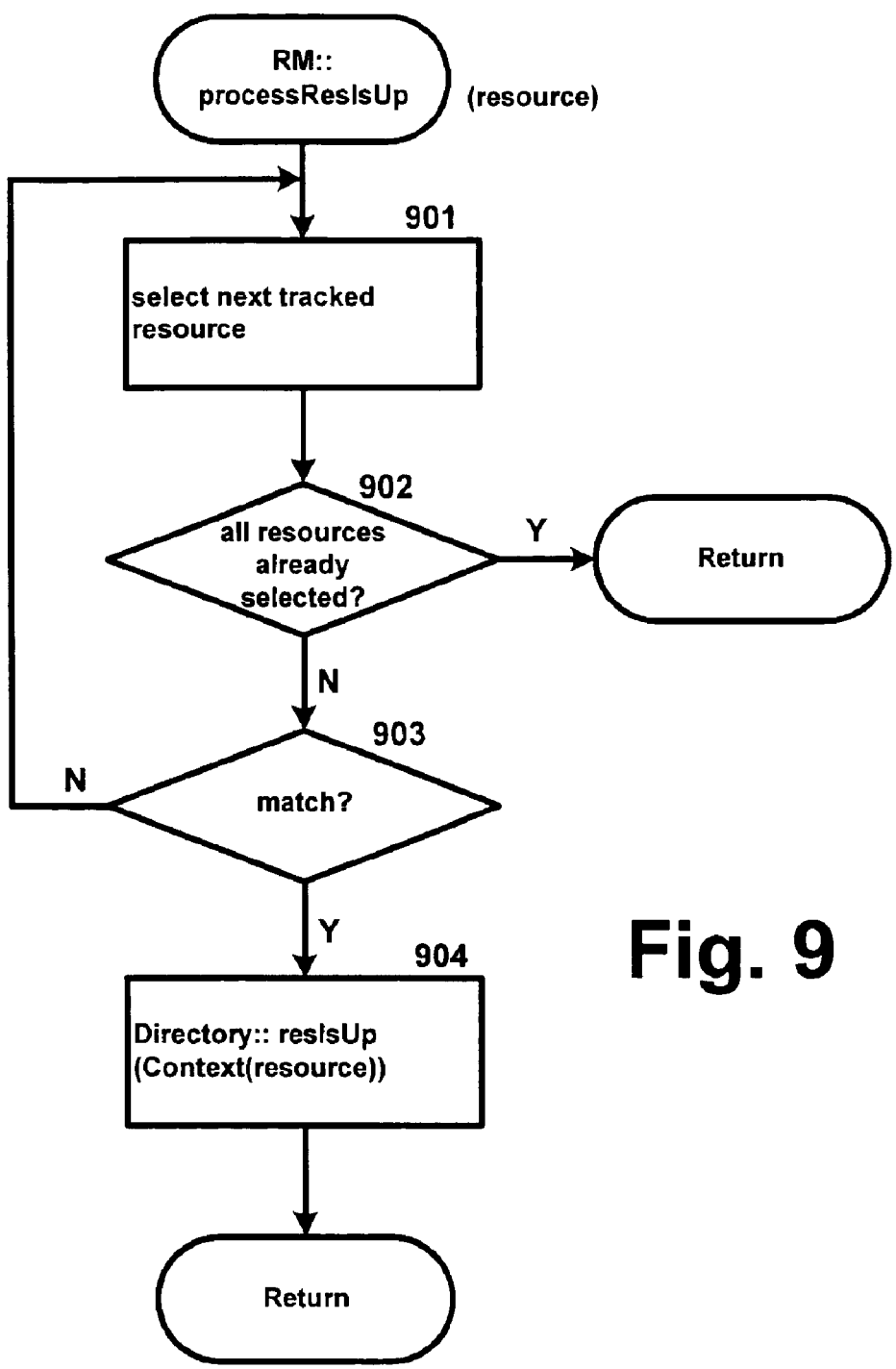
FIG. 9 is a flow diagram of an example implementation of the processResIsUp function of the resource monitor component.

FIG. 9 is a flow diagram of an example implementation of the processResIsUp function of the resource manager. This function is passed an indication of the resource and, if the resource is being tracked (i.e., watched or monitored), the function notifies the resource tracking system by invoking a function of the directory object. In steps 901–903, the function loops selecting each resource that is being tracked to determine whether the notification is for that resource. In the step 901, the function selects the next tracked resource from a tracked list (e.g., the watched resource table), which contains the identification of the resources that are being tracked. In the step 902, if all the resources have already been selected, then the resource is not being tracked and the function returns, else the function continues at step 903. In step 903, if the selected resource matches the passed resource for which the notification was received, then the function continues at step 904, else the function loops to step 901 to select the next resource. In step 904, the function invokes the resIsUp function of the directory object passing the context of (e.g., pointer to the resource reference object for the resource) the resource, which was passed to the resource monitor as part of the registration process. The function then returns. The resource manager implements an analogous function for processing resource down notifications. The busStateChanged function causes each client to reset by invoking the busStateChanged function of the directory object and resets it internal state.

Figure 10:
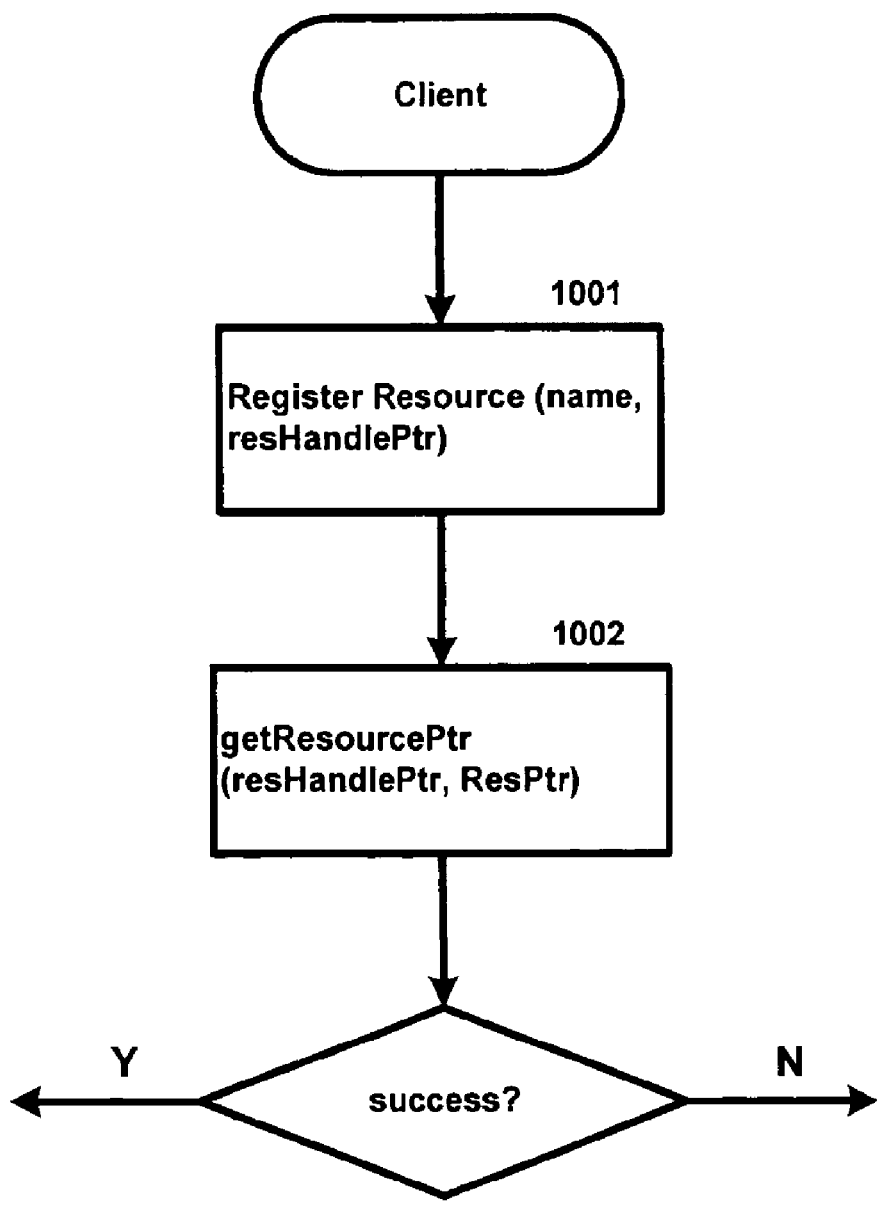
FIG. 10 is a flow diagram of an example use of a resource pointer by a client.

FIG. 10 is a flow diagram of an example use of a resource pointer by a client. In step 1001, the client invokes to the RegisterResource function passing the name of the resource and receiving a handle to the resource in return. In step 1002, the function invokes the getResourcePtr function passing the handle to the resource and receiving a pointer to the resource in return. The client may periodically check whether it has been notified of a change in state in the resource. If so, the client can use the handle to retrieve a reference counted pointer to a current instantiation of the resource. When the client no longer needs the pointer, it releases the pointer. The client may also receive asynchronous notifications from the resource tracking system via the resourceIsUp and resourceIsDown functions that it implements and provides to the resource tracking system.

Figure 11:
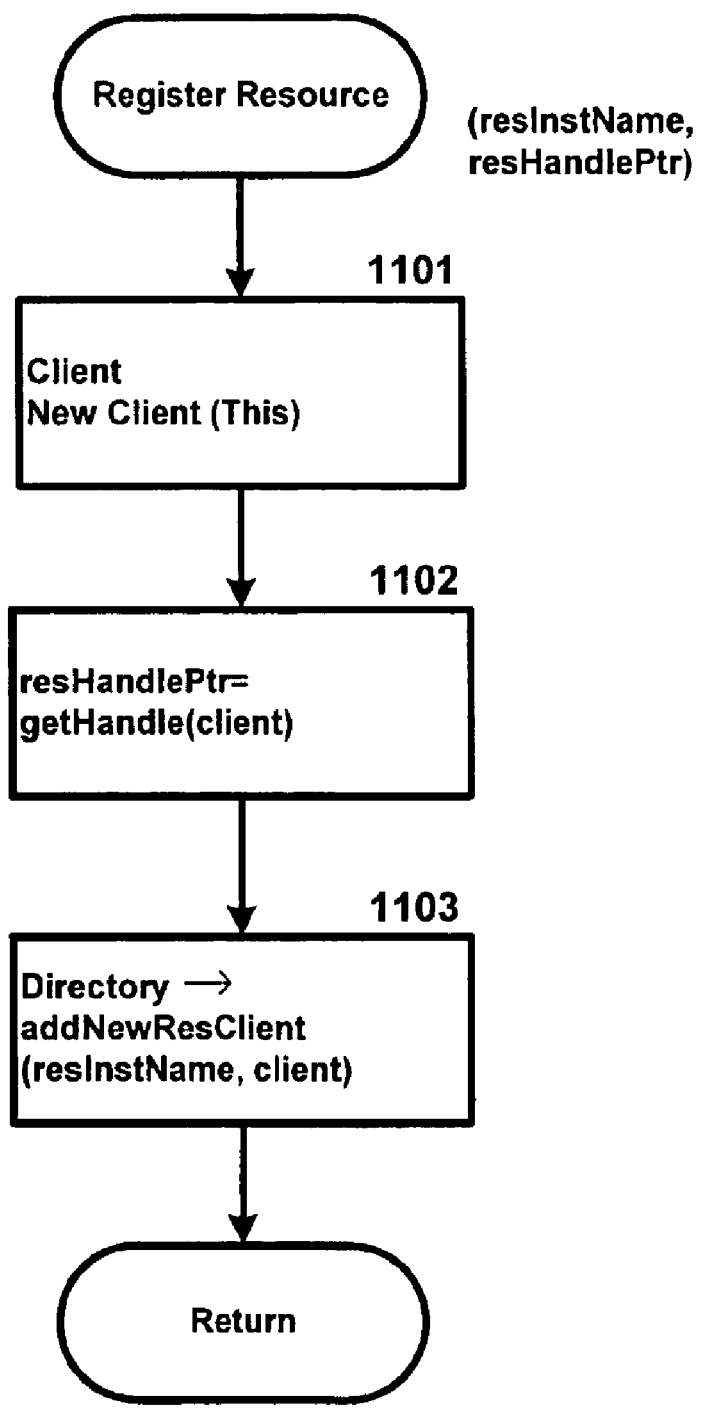
FIG. 11 is a flow diagram of an example implementation of the RegisterResource function.

FIG. 11 is a flow diagram of an example implementation of the RegisterResource function. This function is invoked by a client to register an interest in a resource. The client identifies the resource by providing the name of the resource. The function returns a handle that identifies the resource. The function has two parameters: the name of the resource instance (resInstName) and resource handle (resHandlePtr). In step 1101, the function creates a new element object, which is derived from a client object. The element object adds handle management to a client object. In the step 1102, the function retrieves a handle for the new element object and sets the resource handle to be returned to the client to the retrieved value. In step 1103, the function adds the client object to the resource tracking system data structures by invoking the Directory::addNewResClient function passing the resource name and the element object. The function returns after the client object has been added. The element object may maintain a mapping from the handles to the client objects in a handle resource table. Alternatively, the handle may be a pointer to the client object.

Figure 12:
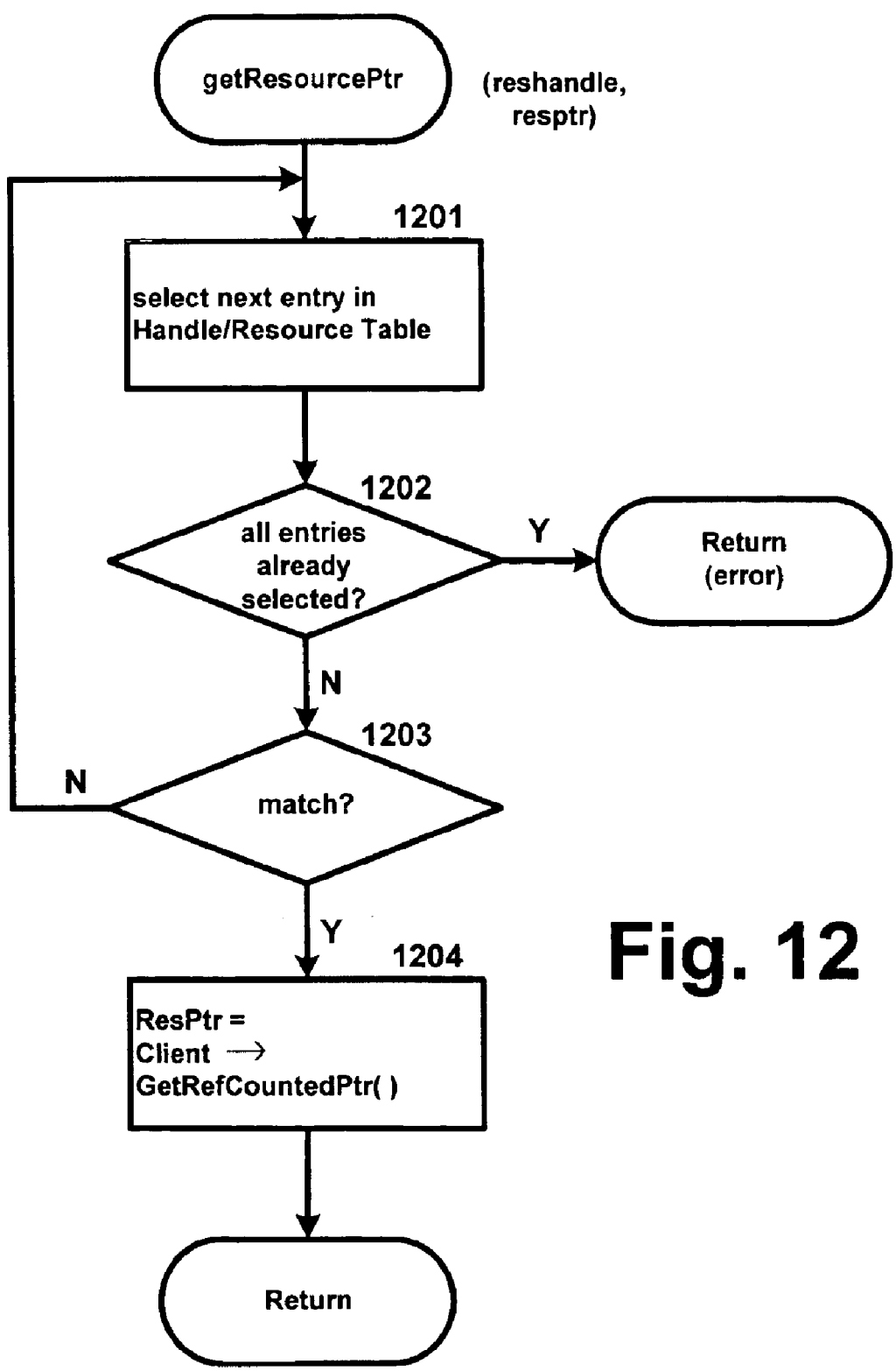
FIG. 12 is a flow diagram of example implementation of the getResourcePtr function.

FIG. 12 is a flow diagram of example implementation of the getResourcePtr function. This function is passed the handle of a resource and returns a pointer to the resource. In step 1201, the function selects the next entry in the handle/resource table. In step 1202, if all the entries have already been selected, then the function returns an error, else the function continues at step 1203. In step 1203, if the passed handle matches the handle in the selected entry, then the function continues at step 1204, else the function loops to step 1201 to select the next entry. In step 1204, the function retrieves a reference counted pointer to the resource by invoking the getRefCountedPtr function of the client object that is indicated in the selected entry. The function then returns.

Figure 13:
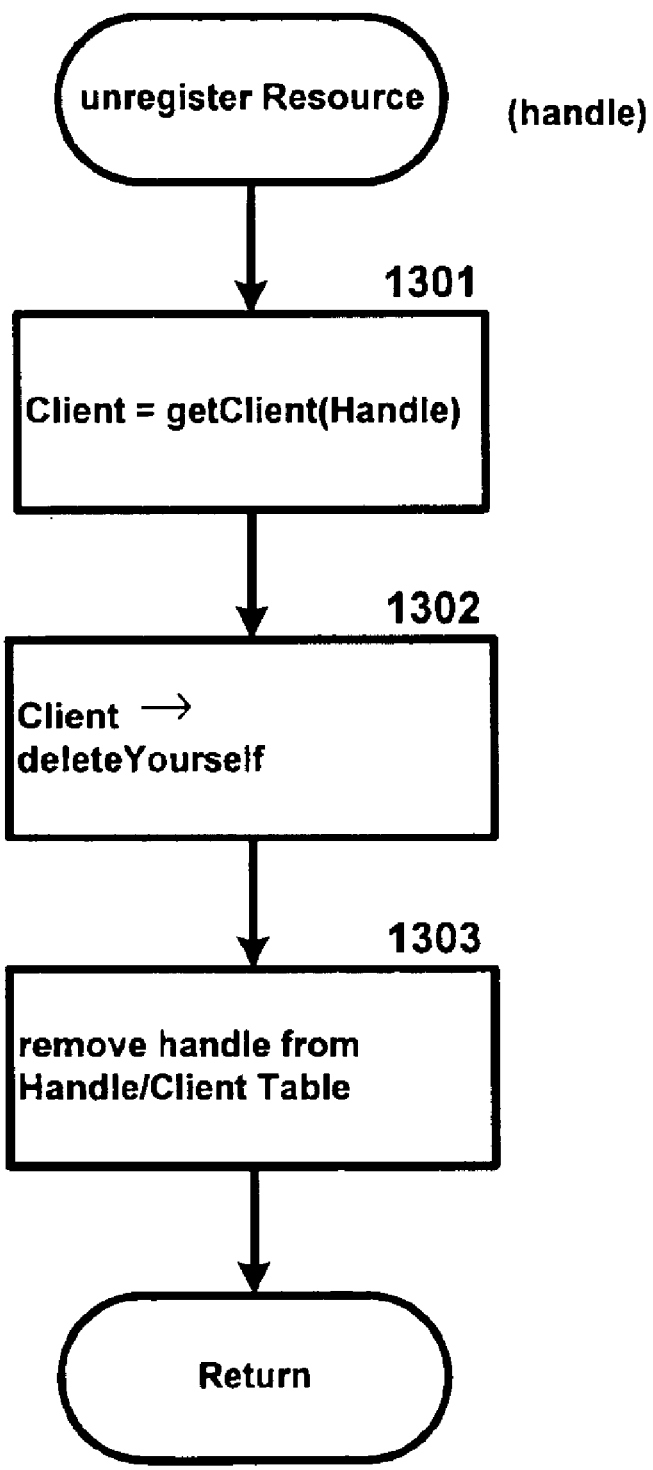
FIG. 13 is a flow diagram of an example implementation of a UnregisterResource function.

FIG. 13 is a flow diagram of an example implementation of a UnregisterResource function. This function undoes the processing of the RegisterResource function. This function is passed the handle for the resource. In step 1301, the function retrieves the client object by invoking the getClient function passing the handle. In step 1302, the function directs the client object to delete itself by invoking the deleteYourself function of the client object. In step 1303, the function removes the handle from the handle/resource table and returns.

A. Directory Object

Figure 14:
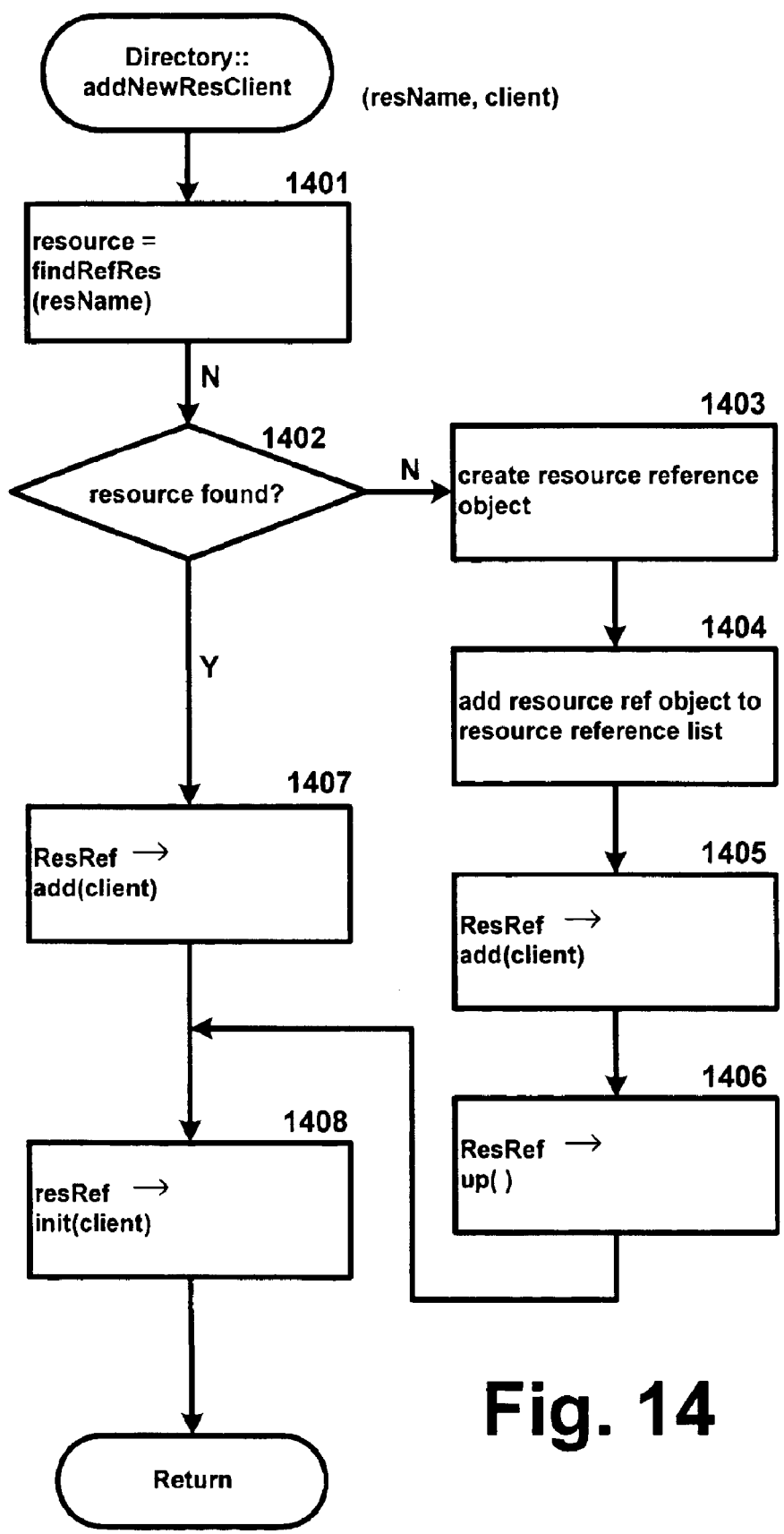
FIG. 14 is a flow diagram of an example implementation of the Directory::addNewResClient function.

FIGS. 14–19 are flow diagrams illustrating the functions of the directory objects. FIG. 14 is a flow diagram of an example implementation of the Directory::addNewResClient function. This function adds a new client object for a resource to the directory. This function is passed the name of the resource (resName) and the client object. In step 1401, the function finds the resource reference object associated with the passed resource name by invoking the findRefRes function of the directory object. That function searches the resource reference list and returns a reference to a resource reference object with that name. In step 1402, if a resource reference object with that name is found, then the function continues that step 1407, else the function continues at step 1403. In steps 1403–1406, the function adds a resource reference object for the named resource to the resource reference list. In step 1403, the function creates a resource reference object. In step 1404, the function adds the resource reference object to the resource reference list of this directory object. In step 1405, the function adds the client object to the client list of the resource reference object by invoking the add function of the resource reference object passing the client object. In step 1406, the function signals the clients that the resource is up by invoking the up function of the resource reference object. If the resource is not actually up, the resource tracking system will enter the watch for resource state for this resource and notify clients that the resource is down. In step 1407, the function adds the client object to the client list of the resource reference object by invoking the add function of the resource reference object. In step 1408, the function initializes the client object by invoking the init function of the resource reference object passing the client object and then returns.

Figure 15:
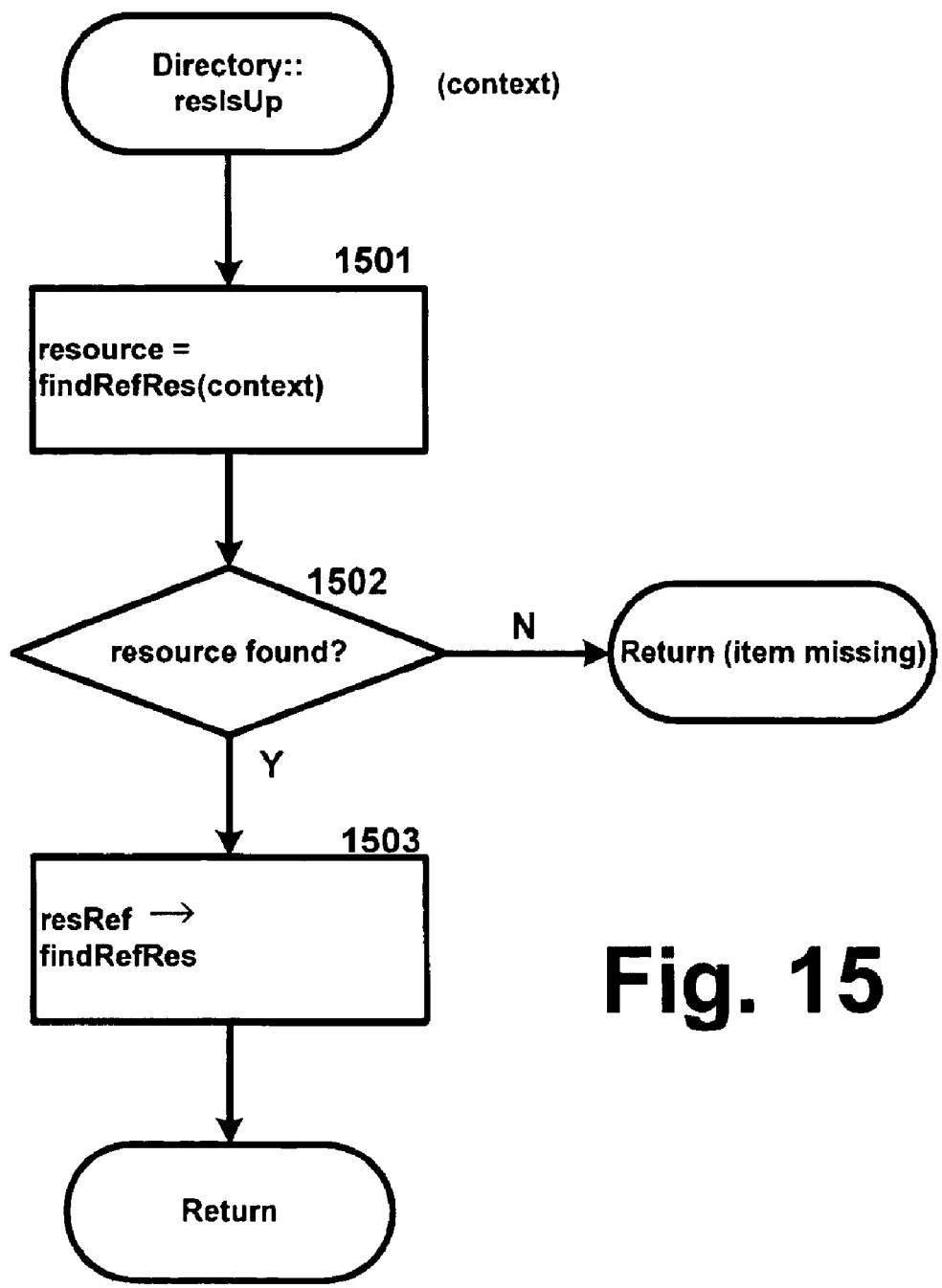
FIG. 15 is a flow diagram of the example implementation of the Directory::resIsUp function.

FIG. 15 is a flow diagram of the example implementation of the Directory::resIsUp function. This function is passed the context of a resource (e.g., a pointer to a resource reference object for the resource) and sets the corresponding resource reference object to indicate that the resource is up. This function is invoked by the resource manager to notify the resource tracking system that the resource is up. In step 1501, the function retrieves a pointer to the resource by invoking the findRefRes function of this directory object passing the context. In step 1502, if a resource reference object was found, then the function continues at step 1503, else the function returns an error indication. In step 1503, the function invokes the up function of the resource reference object to notify the clients that the resource is up. The function then returns. The Directory::resIsDown function operates in an analogous manner except that the down function of the resource reference object is invoked in step 1503.

Figure 16:
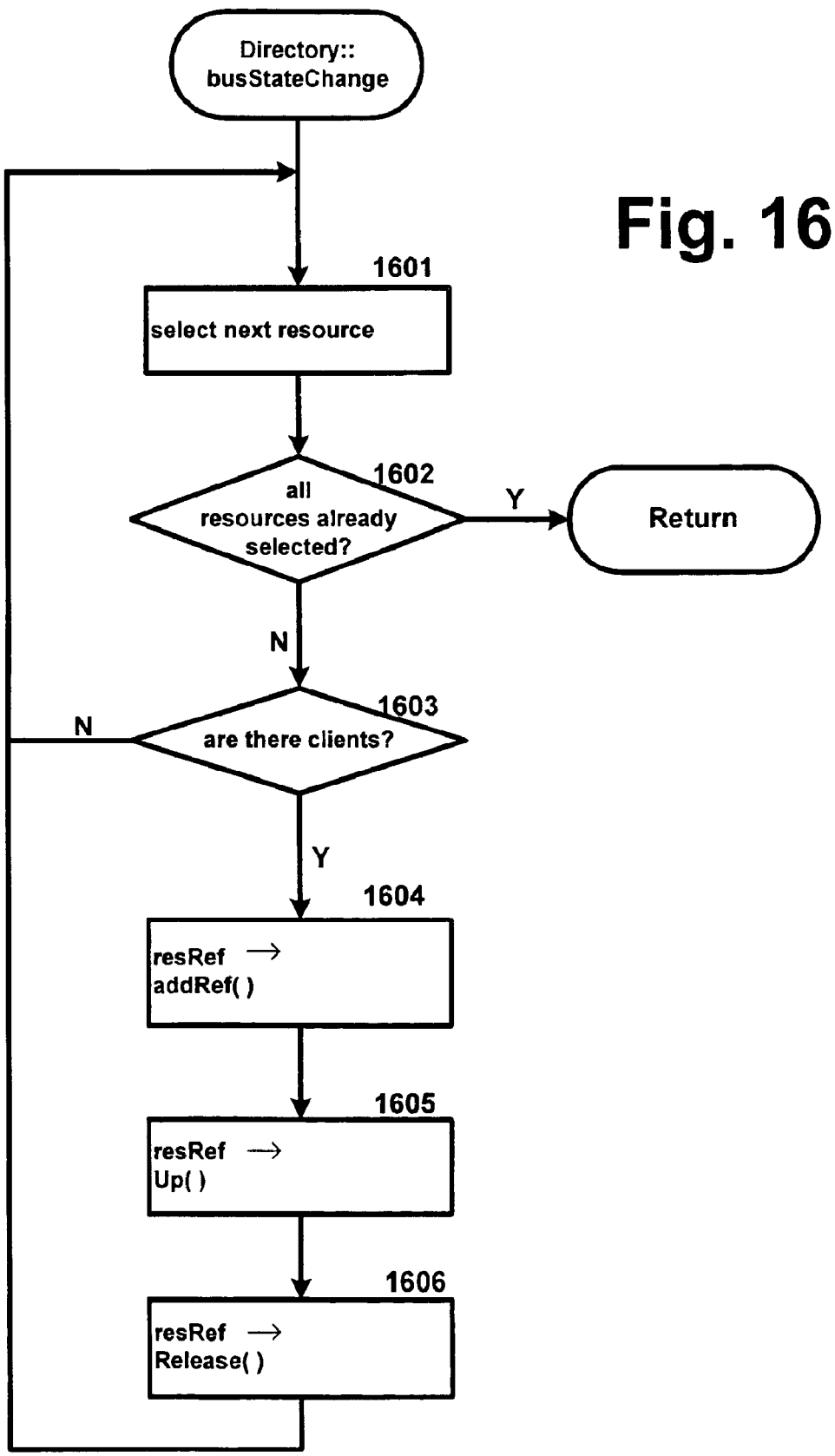
FIG. 16 is a flow diagram of an example implementation of the Directory::busIsUp function.

FIG. 16 is a flow diagram of an example implementation of the Directory::busStateChanged function. This function is invoked by the resource manager to indicate that the state of the bus has changed. In step 1601, the function selects the next resource reference object in the resource reference list. In step 1602, if all the resource reference objects have already been selected, then the function returns, else the function continues at step 1603. In step 1603, if there is a client object in the client list of the selected resource reference object, then the function continues step 1604, else the function loops to step 1601 to select the next resource reference object. In step 1604, the function reference counts the resource reference object by invoking the AddRef function. In step 1605, the function invokes the up function of the selected resource reference object to notify the client objects that the resource is up. If the bus is down, the up function will be unable to locate the resource and cause the resource tracking system to enter the watching for resource state. In step 1606, the function invokes the release function of the resource reference object to decrement the reference count and loops to step 1601 to select the next resource reference object. Two other functions of the directory object operate in an analogous manner. The resetref function performs the same processing except that in the step 1605 the function invokes the down function of the resource reference object after the up function is invoked. This resets all the references to the resources to the down state. The clearInitialBlock function also performs the same processing except that in step 1605 the function invokes the clearInitialBlock function, rather than the up function, which processes the events in the message queue (described below) of the resource reference objects. The resource manager invokes this function after a client resource is activated so that the client resource can start processing events.

Figure 17:
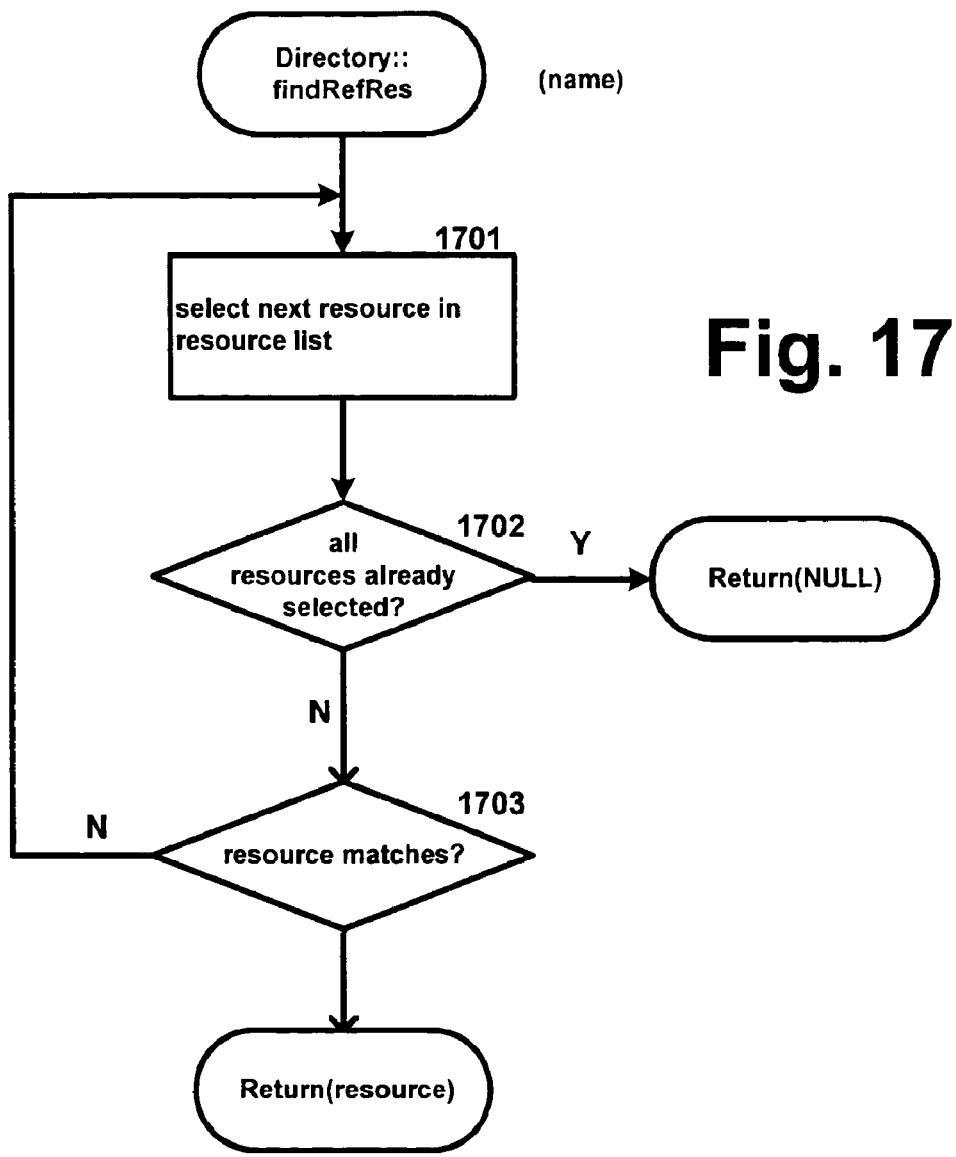
FIG. 17 is a flow diagram of an example implementation of the Directory::findRefRes function.

FIG. 17 is a flow diagram of an example implementation of the Directory::findRefRes function. This function is invoked passing the name of a resource. The function returns the resource reference object corresponding to that name. In step 1701, the function selects the next resource reference object in the resource reference list. In step 1702 if all the resource reference objects have already been selected, then the function returns an error indication, else the function continues at step 1703. In step 1703, if the passed name matches the name of the selected resource reference object, then the function reference counts the resource reference object and returns a pointer to that resource reference object, else the function loops to step 1701 to select the next resource reference object. The directory object has another function with the same name that operators in an analogous manner except that it is passed a context of (e.g., pointer to) the resource reference object rather than the name.

Figure 18:
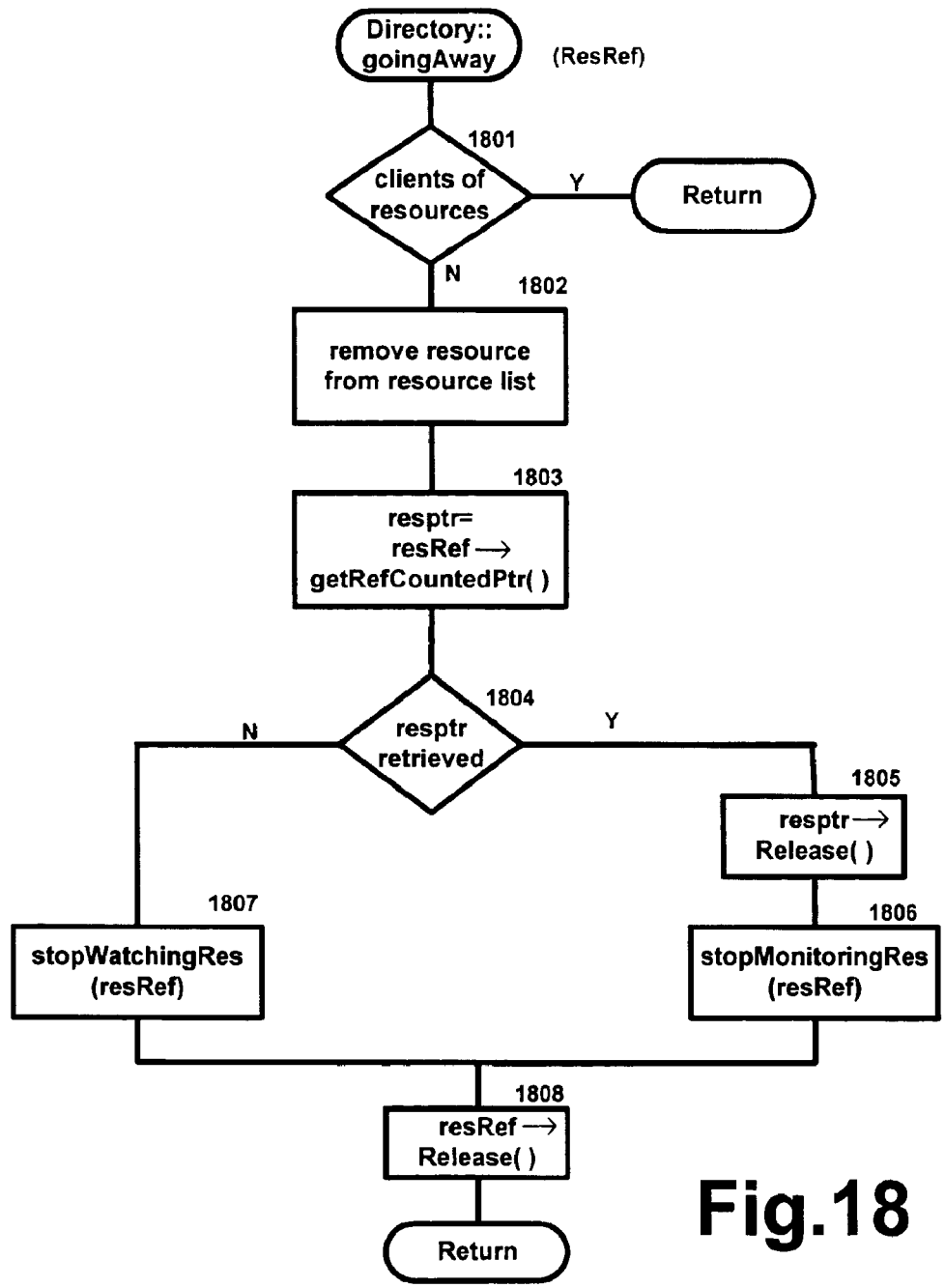
FIG. 18 is a flow diagram of an example implementation of the Directory::goingAway function.

FIG. 18 is a flow diagram of an example implementation of the Directory::goingAway function. This function is passed a resource reference object and performs the processing to indicate that the resource reference object is going away, that is, the last client is unregistering its interest in the resource. In step 1801, if there are client objects on the client list of the passed resource reference object, then some client objects are waiting to be deleted and the resource cannot go away and the function returns, else the function continues at step 1802. In step 1802, the function removes the resource reference object from the resource reference list. In step 1803, the function retrieves a reference counted pointer to the resource by invoking the getRefCountedPtr function of the resource reference object. In step 1804, if a reference counted pointer was retrieved, then the resource is up and the function continues at step 1805, else the function continues at step 1807. In step 1805, the function releases the resource by invoking its Release function. In step 1806, the function invokes the stopMonitoringRes function passing the resource reference object to notify the resource manager to stop monitoring for the resource to go down. In step 1807, the function invokes the stopWatchingRes function passing the resource reference object to notify the resource manager to stop watching for the resource to come up. In step 1808, the function releases the resource reference object by invoking the Release function of the resource reference object and then returns.

Figure 19:
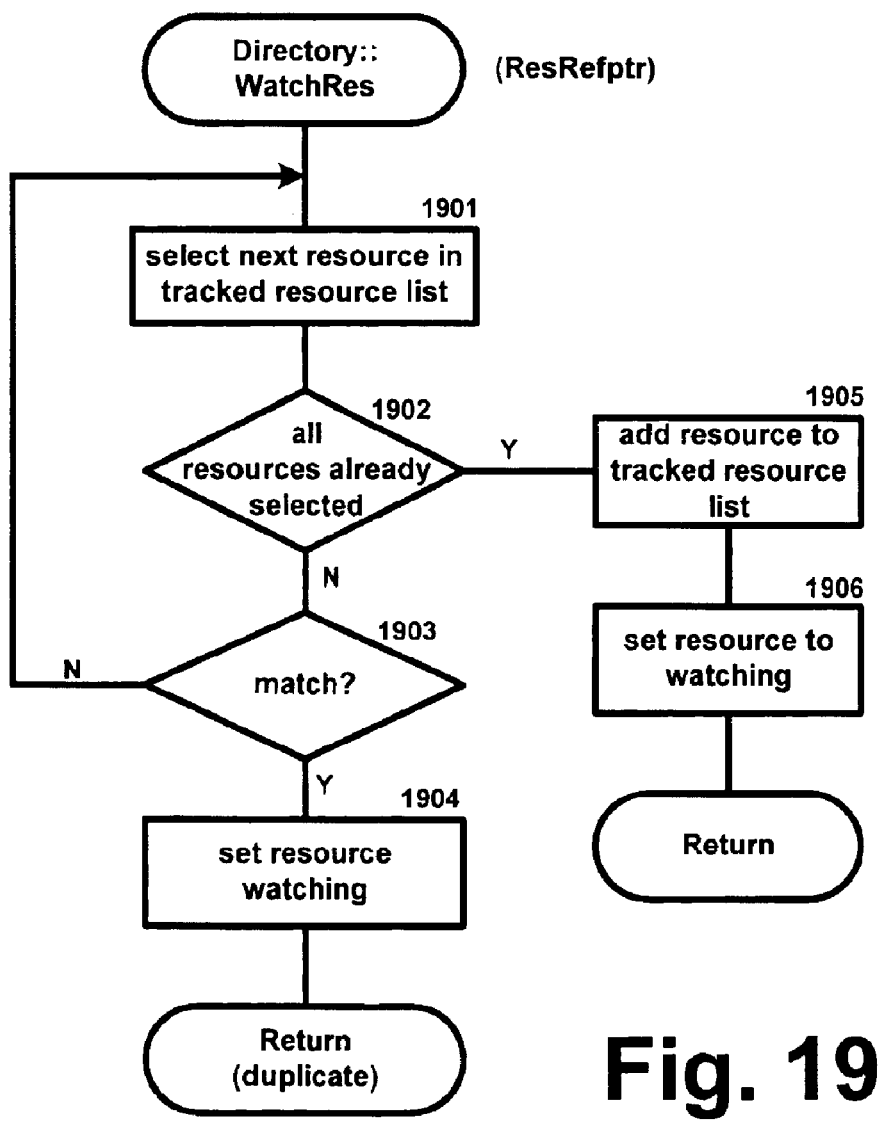
FIG. 19 is a flow diagram of an example implementation of the watchRes function.

FIG. 19 is a flow diagram of an example implementation of the watchRes function. The function is passed a reference object and places a watch on the resource. In steps 1901–1903, the function loops determining whether that resource is already in the tracked resource list (e.g., watched resource table). In step 1901, the function selects the next resource in the tracked resource list. In step 1902, if all the resources have already been selected, then the is function continues at step 1905, else the function continues at step 1903. In step 1903, if the selected resource matches the passed resource, then the function continues in step 1904, else the function loops to step 1901 to select the next resource. In step 1904, the function sets the entry for that resource to being watched and returns an indication of a duplicate watch. In step 1905, the function adds an entry to the tracked resource list that points to the passed resource reference object. In step 1906, the function sets the entry for that resource to being watched and returns. The stopWatchingRes, monitorRes, and stopMonitoringRes functions operate in an analogous manner. Further implementations of these functions are described below.

B. Resource Reference Object

Figure 20:
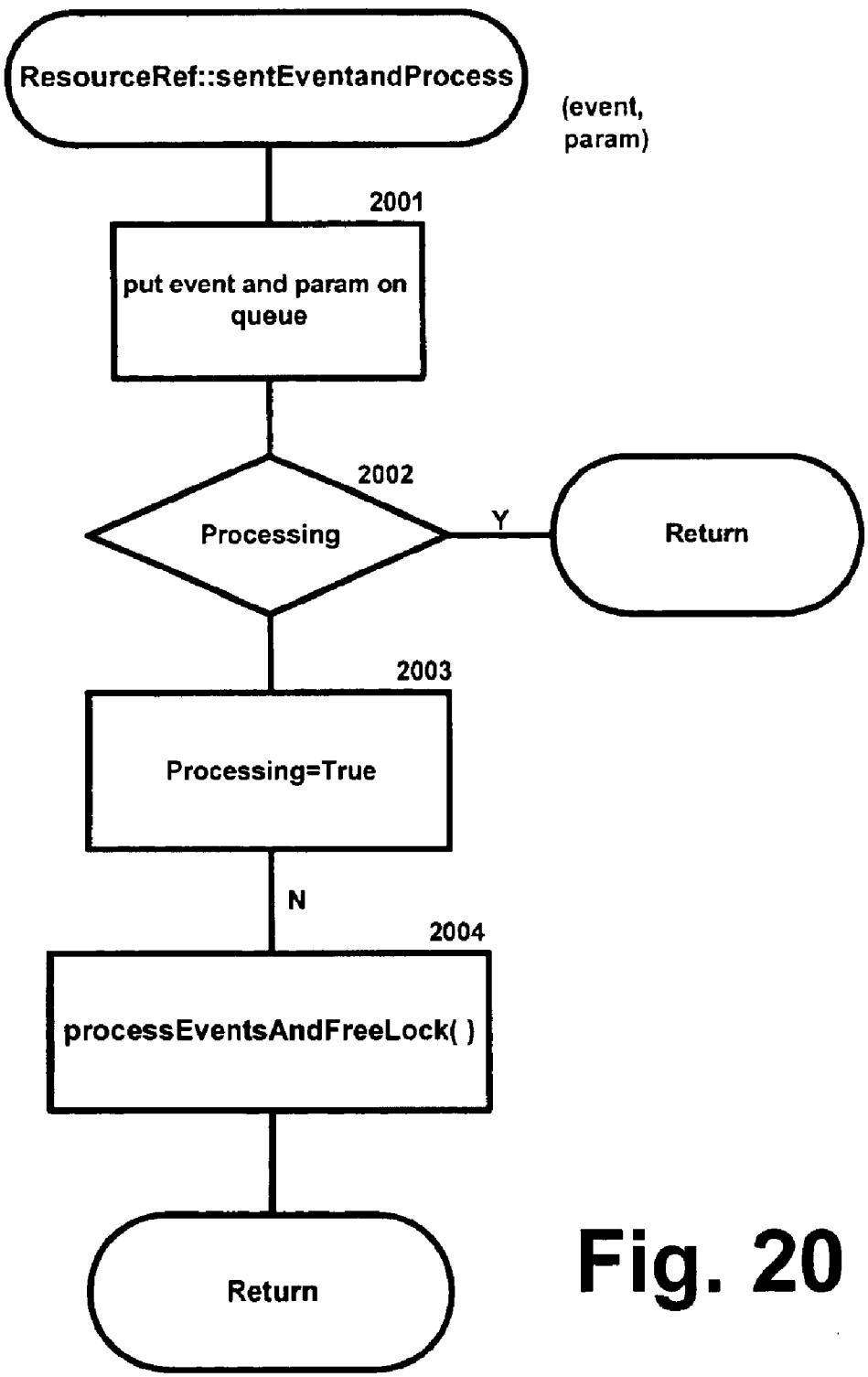
FIG. 20 is a flow diagram of an example implementation of the ResRef::sendEventAndProcess function.

FIGS. 20–30 are flow diagrams illustrating the processing of the functions of the resource reference objects. FIG. 20 is a flow diagram of an example implementation of the ResRef::sendEventAndProcess function. This function is passed an event and a parameter and places the event and parameter on the message queue for the resource reference object and then processes the event and parameters that are on the queue. The event can be an indication that the resource is up or down or is being initialized. In step 2001, the function puts the event and the parameter on the message queue for the resource reference object. In step 2002, if another thread is processing messages for this resource reference object, then the function returns, else the function continues at step 2003. In step 2003, the function sets a processing flag to true. In step 2004, the function invokes the processEventsAndFreeLock function of this resource reference object to process the messages in the message queue.

Figure 21:
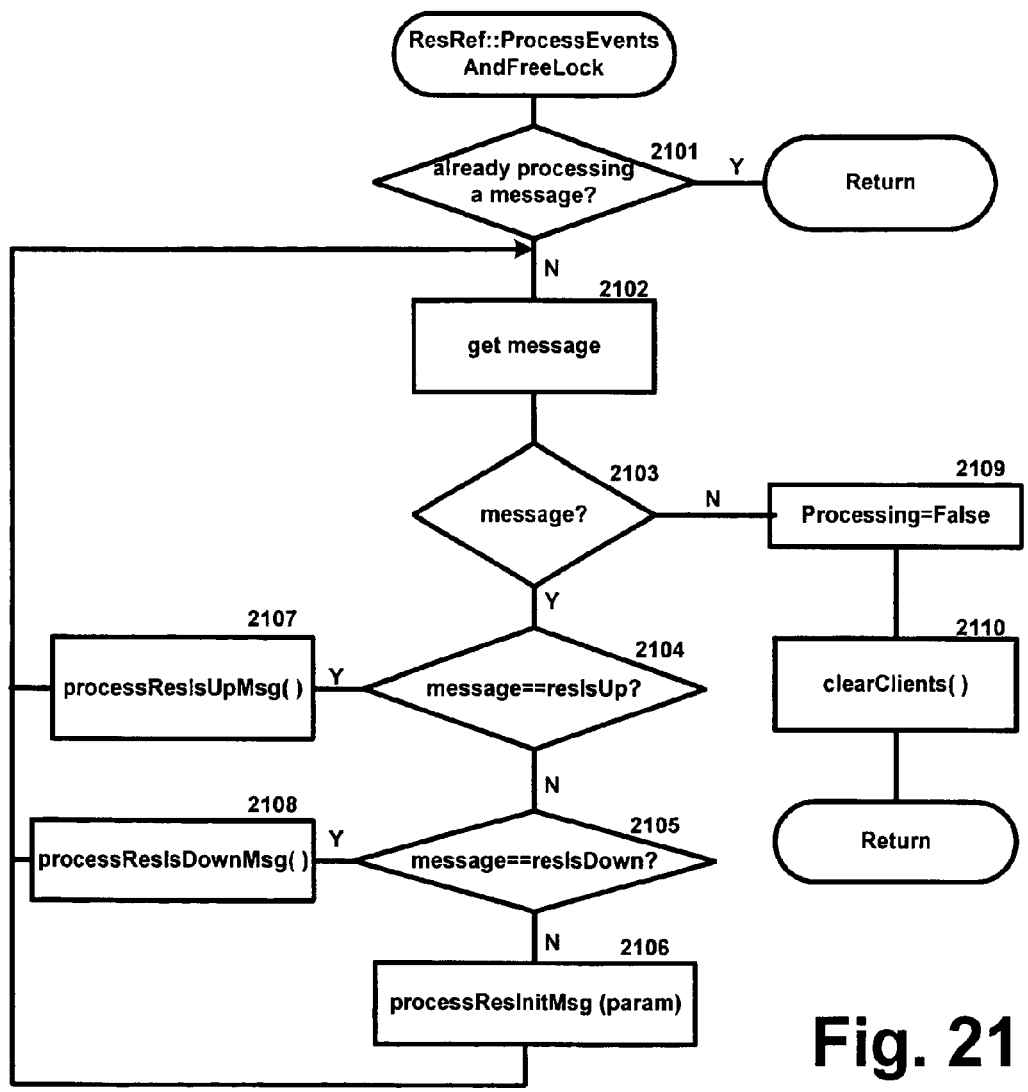
FIG. 21 is a flow diagram of an example implementation of the ResRef::processEventsAndFreeLock function.

FIG. 21 is a flow diagram of an example implementation of the ResRef::processEventsAndFreeLock function. This function loops retrieving messages from the message queue for this resource reference object. The function determines the type of the message and performs the necessary processing. In step 2101, if this resource reference object is already processing a message (e.g., invoked by another thread), then the function returns, else the function continues at step 2102. In step 2102, the function retrieves a message from the message queue. In step 2103, if all the messages have already been retrieved, then the function continues at step 2109, else the function continues at step 2104. In steps 2104–2105, the function determines whether the retrieved message indicates that the resource is up or down, or is being initialized. In steps 2106–2108, the function invokes the appropriate function (i.e., processResIsUpMsg, processResIsDownMsg and processResInitMsg) of this resource reference object to process the retrieved message. The function then loops to step 2102 to retrieve the next message from the message queue. In step 2109, the function sets the processing flag to false. In step 2110, the function invokes the clearClients function of this resource reference object and returns. The clear clients function deletes any client objects whose delete flag is set.

Figure 22:
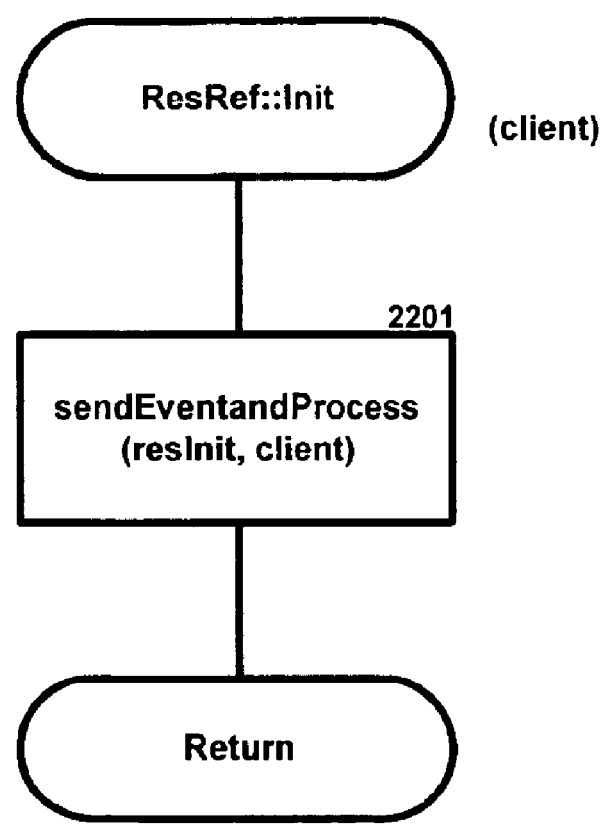
FIG. 22 is a flow diagram of an example implementation of the ResRef::Init function.

FIG. 22 is a flow diagram of an example implementation of the ResRef::Init function. This function is passed a client object, and in step 2201, the function places a message on the message queue of this resource reference object to initialize that client. The function then returns.

Figure 23:
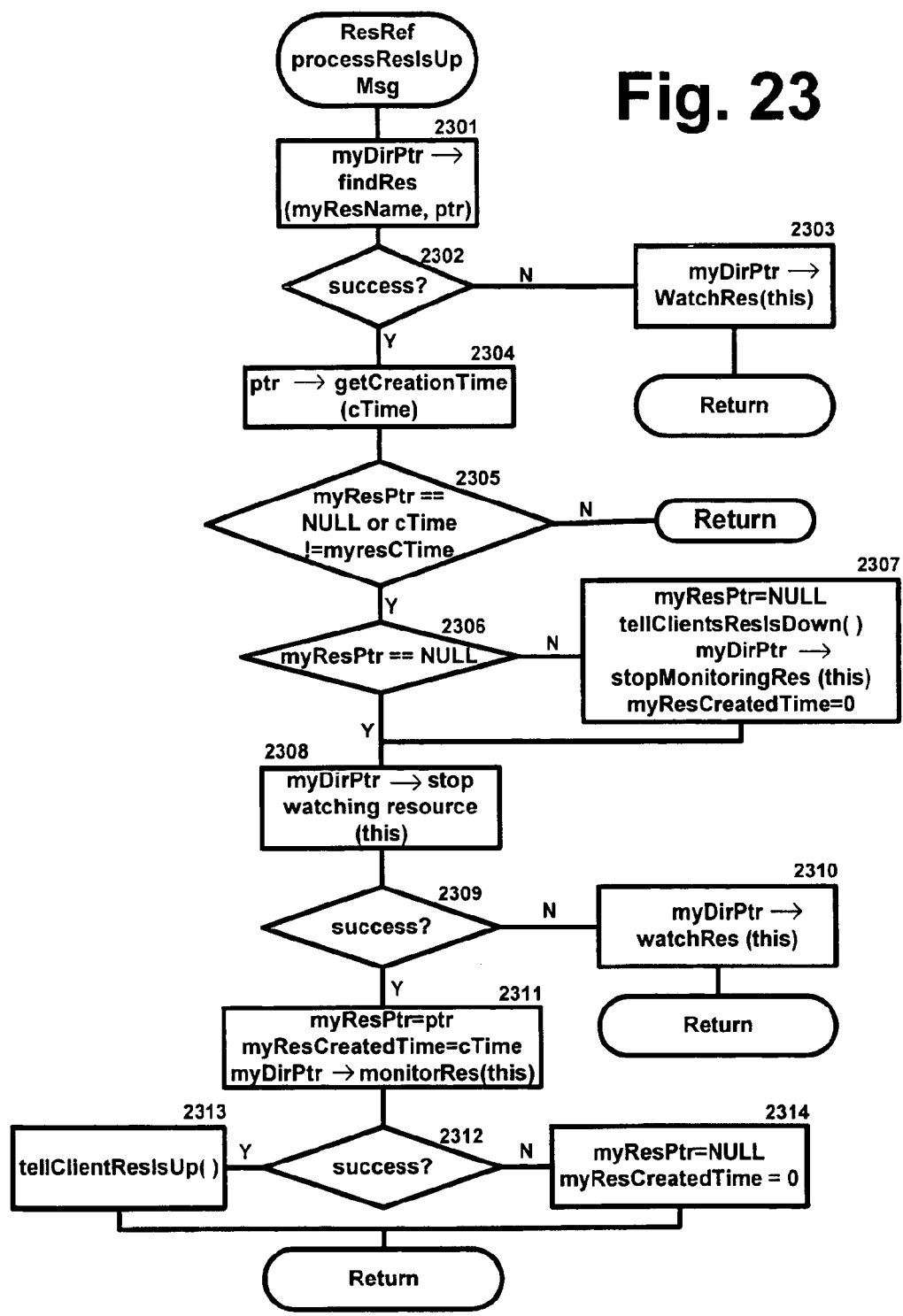
FIG. 23 is a flow diagram of an example implementation of the ResRef::processResIsUpMsg function.

FIG. 23 is a flow diagram of an example implementation of the ResRef::processResIsUpMsg function. This function is invoked when a message indicating that the resource is up is retrieved from the message queue. In step 2301, the function invokes the findRes function of the directory object to retrieve a pointer to the resource. The findRes function is supplied by the resource manager. In step 2301, if a pointer to the resource is returned, then the resource is up and the function continues at step 2304, else the resource went down since the up message was generated and the function continues at step 2303. In step 2303, the function notifies the resource manager to start watching the resource to come up by invoking the watchRes function of the directory object passing this resource reference object and then returns. In step 2304, the function retrieves the created time of the resource. In step 2305, if the pointer to the reference in the reference resource object is null (which may mean that this resource reference object recognized that the resource was down) or the created time of the resource is not equal to the created time indicated in this resource reference object (which may mean that a new occurrence of the resource has been instantiated), then the function continues at step 2306, else this reference resource object already has the correct pointer to the resource and the resource is already being monitored so the function returns. In step 2306, if this resource reference object has a pointer to the resource, then the pointer is out-of-date and the function continues at step 2307, else the function continues at step 2308. In step 2307, the function sets the resource pointer in this resource reference object to null, notifies the client objects that the resource is down by invoking the tellClientsResIsDown function, directs the resource manager to stop monitoring the resource, and sets the created time for the resource to zero. In step 2308, the function directs the resource manager to stop watching the resource by invoking the stopWatchingRes function of the directory object. In step 2309, if the stopWatchingRes invocation was successful, then the resource is up and the function continues at step 2311, else the function continues at step 2310. In step 2310, the function directs the resource manager to start watching the resource by invoking the watchRes function of the directory object and then returns. In step 2311, the function sets the resource pointer to point to the resource provided in step 2301, sets the created time of this resource reference object to the new created time, and directs the resource manager to start monitoring the resource by invoking the monitorRes function of the directory object. In step 2312, if the start of monitoring is successful, then the function continues at step 2313, else the function continues at step 2314. In step 2313, the function notifies the client objects that the resource is up by invoking the tellClientsResIsUp function and returns. In step 2314, the function records that the resource is down by setting the resource pointer to null and setting the created time to zero for this reference resource object and returns.

Figure 24:
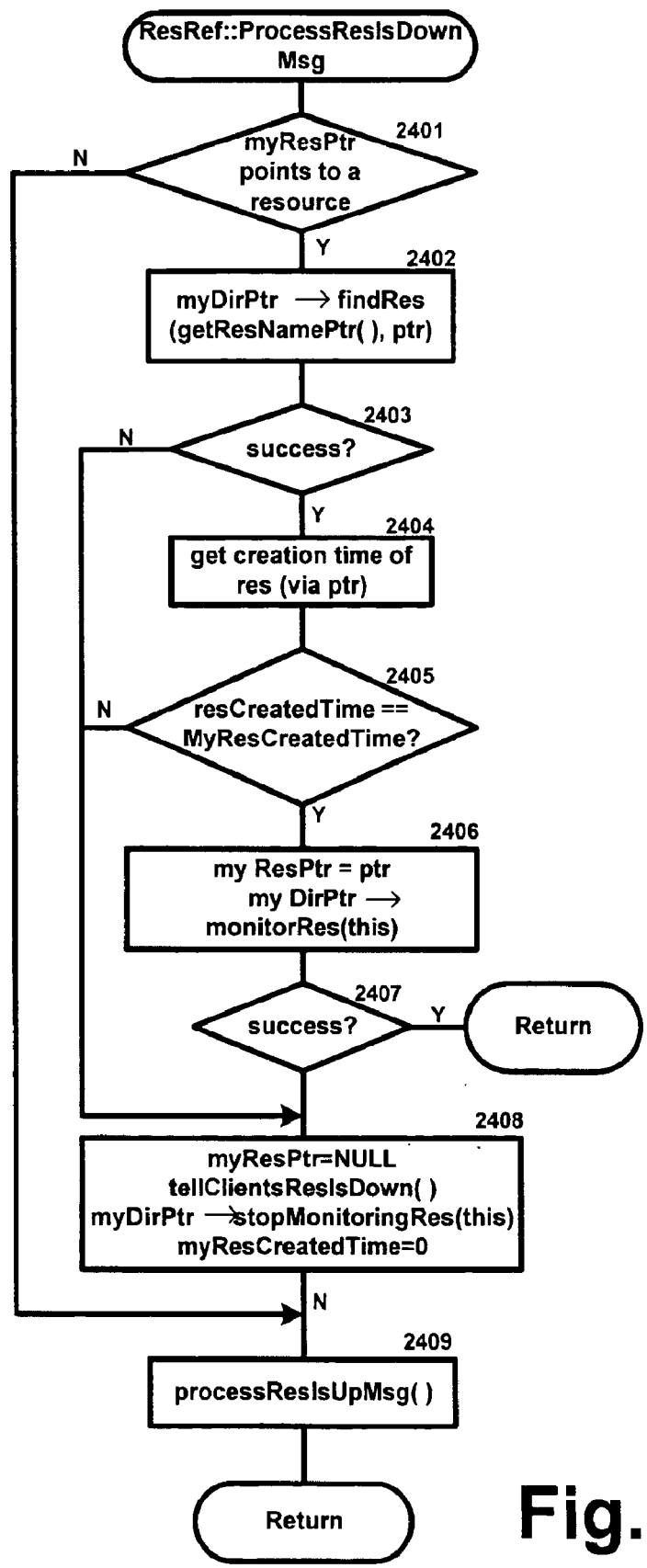
FIG. 24 is a flow diagram of an example implementation of the ResRef::processResIsDownMsg function.

FIG. 24 is a flow diagram of an example implementation of the ResRef::processResIsDownMsg function. This function is invoked to process the resource down message that is retrieved from the message queue. In step 2401, if this resource reference object points to a resource, the function continues at step 2402, else the resource reference object already indicates that the resource is down and the function continues at step 2409. In step 2402, the function requests the resource manager to supply a resource pointer by invoking the findRes function of the directory object. In step 2403, if the pointer to the resource is supplied, then the resource is now up and the function continues at step 2404, else the function continues at step 2408 to indicate that the resource is really down. In step 2404, the function retrieves the created time of the resource. In step 2405, if the created time of the resource is equal to the created time stored in the resource reference object, then the function continues at step 2406, else the reference to the resource is out-of-date because the resource went down and has already come back up and the function continues at step 2408 to indicate that the resource went down. In step 2406, the function sets the resource reference object to point to the resource and directs the resource manager to start monitoring the resource by invoking the monitorRes function of the directory object. In step 2407, if the start of monitoring was successful, then the function returns, else the function continues at step 2408. In step 2408, the function sets the resource pointer of this resource reference object to null, notifies the client objects that the resource is down by invoking the tellClientsResIsDown function, directs the resource manager to stop monitoring the resource by invoking the stopMonitoringRes function of the directory object, and sets the created time of the resource to zero. In step 2409, the function simulates the receiving of a resource up message from the application by invoking the processResIsUpMsg function. That invocation will start watching the resource if it is not up and start monitoring the resource if it is up.

Figure 25:
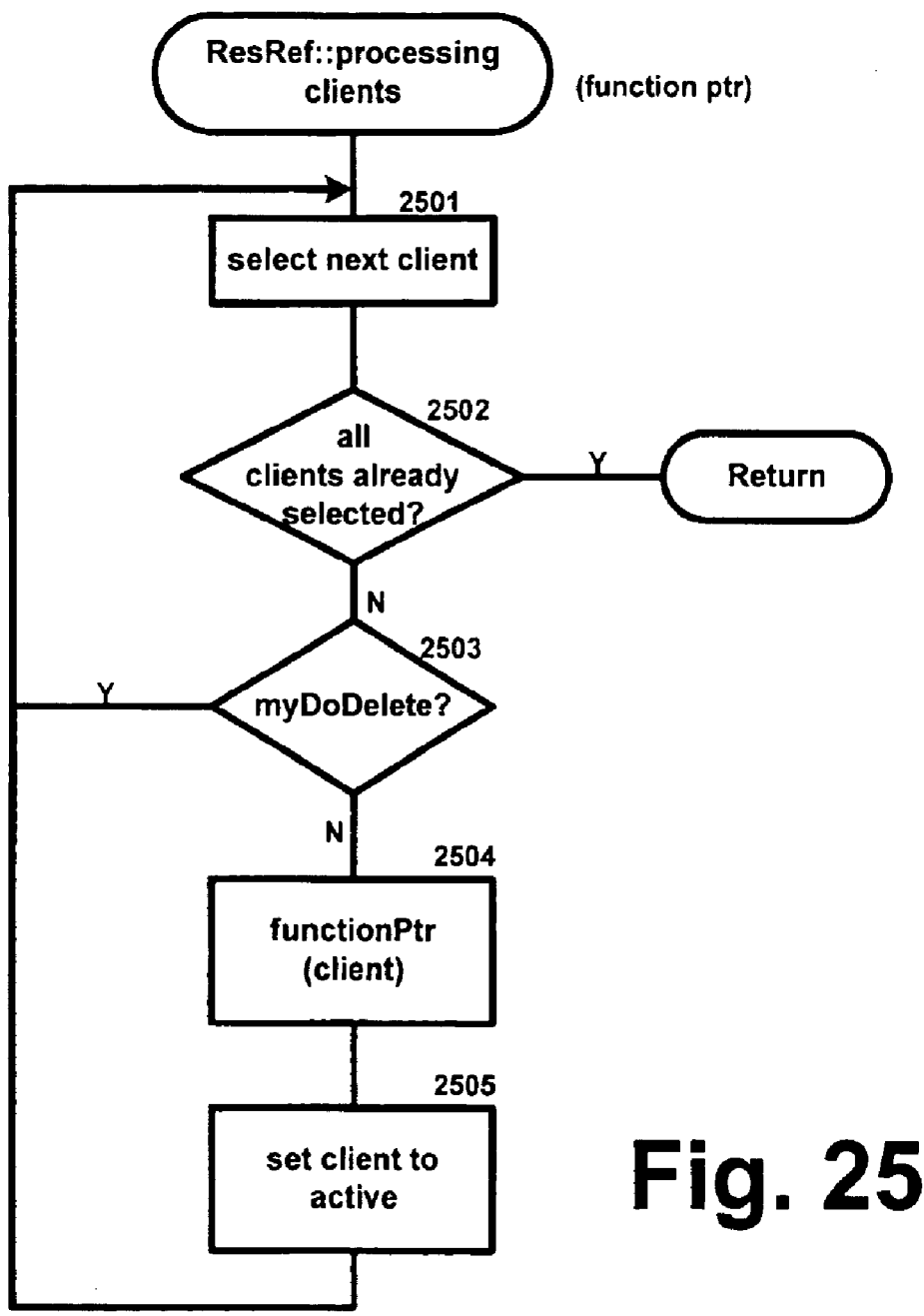
FIG. 25 is a flow diagram of an example implementation of the ResRef::processingClients function.

FIG. 25 is a flow diagram of an example implementation of the ResRef::processingClients function. This helper function is passed an indication of which function of the client objects to invoke. The function loops selecting each client object and invoking that function. In step 2501, the function loops selecting each client object in the client list. In step 2502, if all the client objects in the client list have already been selected, then the function returns, else the function continues at step 2503. In step 2503, if the selected client object is marked to be deleted, then the function loops to step 2501 to select the next client object, else the function continues at step 2504. In step 2504, the function invokes the function indicated by the passed parameter. In step 2505, the function sets the selected client object to active which indicates that client has already processed a message and knows the state of the resource and then loops to step 2501 to select the next client object. The function allows client objects to be added while processing. The function sets a didProcess flag in each client object as it invokes the function. The function loops through the client list until it detects that the function for all the client objects have been invoked. Upon completion, the function clears all the didProcess flags for when it is next invoked.

Figure 26:
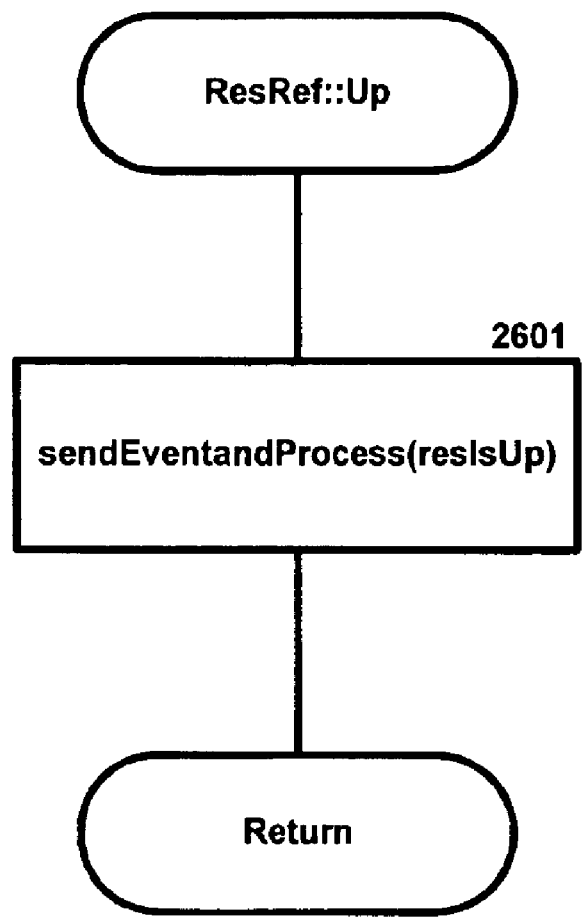
FIG. 26 is a flow diagram of an example implementation of the ResRef::up function.

FIG. 26 is a flow diagram of an example implementation of the ResRef::up function. This function is invoked by the directory object to indicate that the resource is now up. In step 2601, the function places an up event on the queue by invoking the sendEventAndProcess function and then returns. The ResRef::down function operates in an analogous manner.

Figure 27:
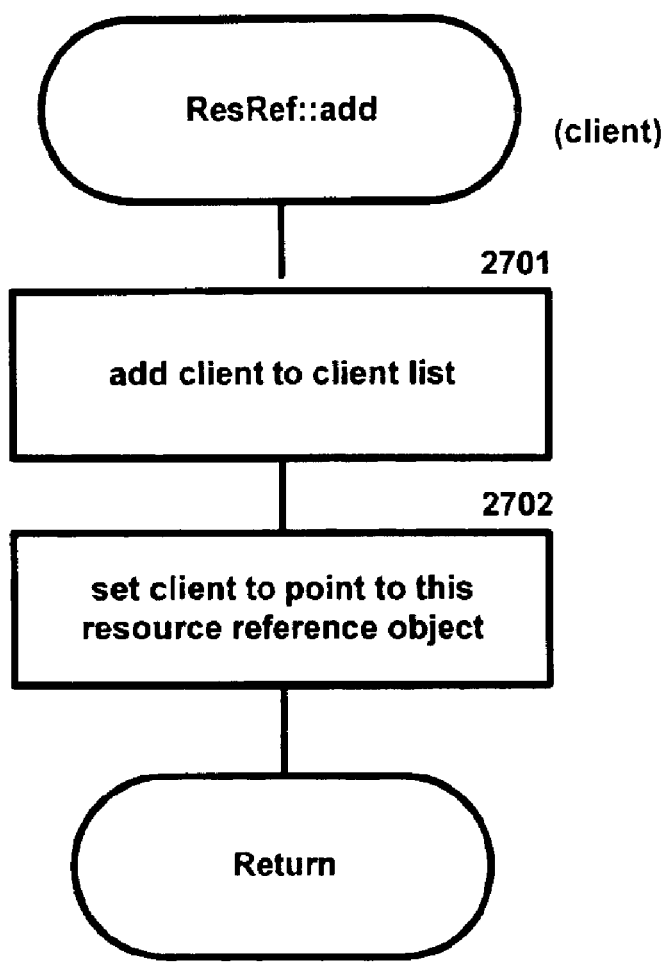
FIG. 27 is a flow diagram of an example implementation of the ResRef::add function.

FIG. 27 is a flow diagram of an example implementation of the ResRef::add function. This function is passed a client object and adds that client object to the client list of this resource reference object. In step 2701, the function adds the passed client object to the client list. In step 2702, the function sets the client object to point to this resource reference object.

Figure 28:
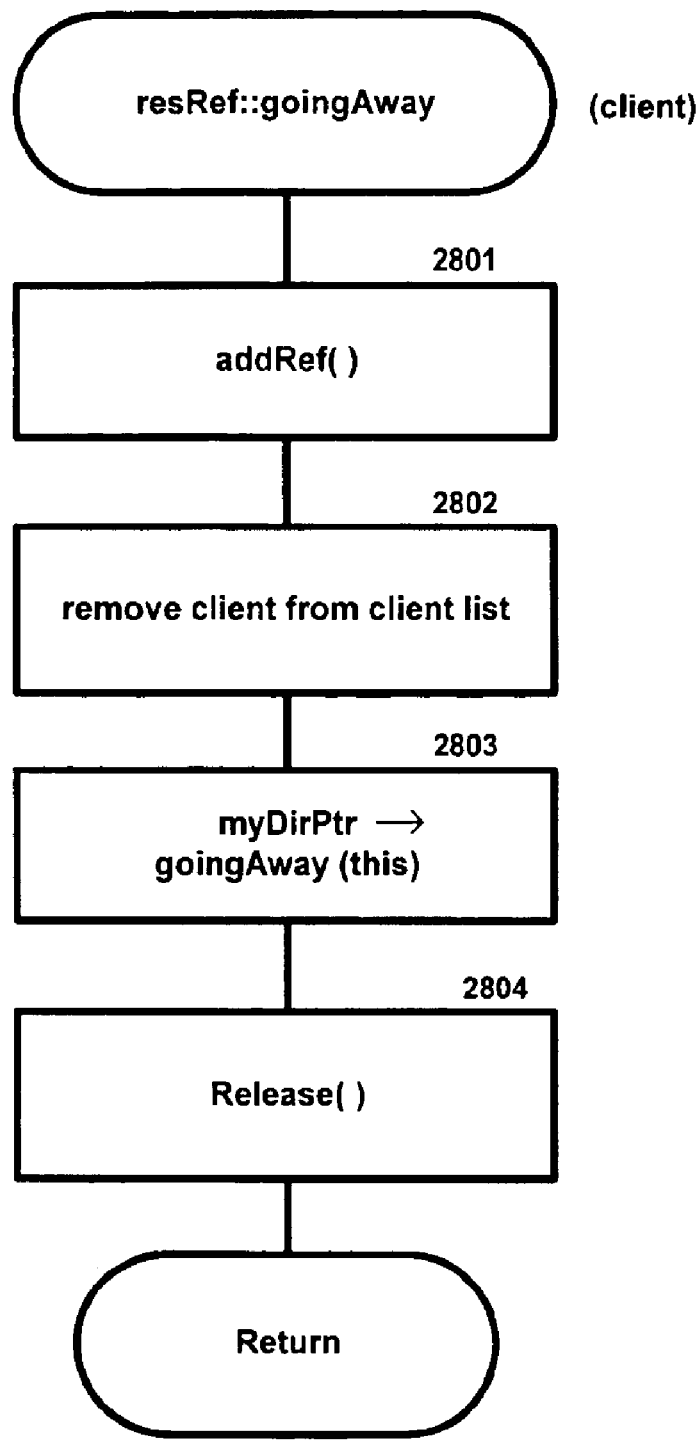
FIG. 28 is a flow diagram of an example implementation of the ResRef::goingAway function.

FIG. 28 is a flow diagram of an example implementation of the ResRef::goingAway function. The function is passed a client object. In step 2801, the function invokes the AddRef function of this resource reference object to indicate that the function is accessing this object. In step 2802, the function removes the passed client object from the client list. In step 2803, the function invokes the goingAway function of the directory object to notify the directory object that this reference resource object is going away. In step 2804, the function invokes the Release function of the resource reference object and then returns. If another thread is currently processing messages from the queue, then this resource reference object cannot yet be deleted and the function marks the passed client object to be deleted and returns a failure indicator.

Figure 29:
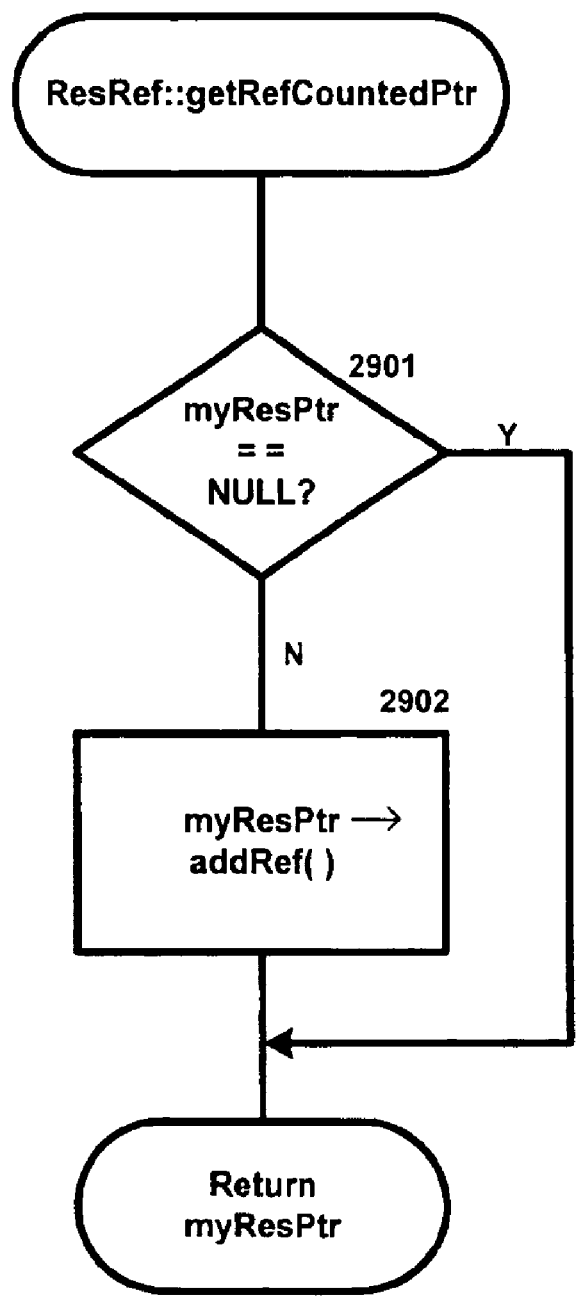
FIG. 29 is a flow diagram of an example implementation of the ResRef::getRefCountedPtr function.

FIG. 29 is a flow diagram of an example implementation of the ResRef::getRefCountedPtr function. This function returns a reference counted pointer to the resource. In step 2901, if the resource reference object points to a resource, then the function continues at step 2902, else the function returns. In step 2902, the function reference counts the resource by invoking the AddRef function of the resource and then returns the referenced counted pointer.

Figure 30:
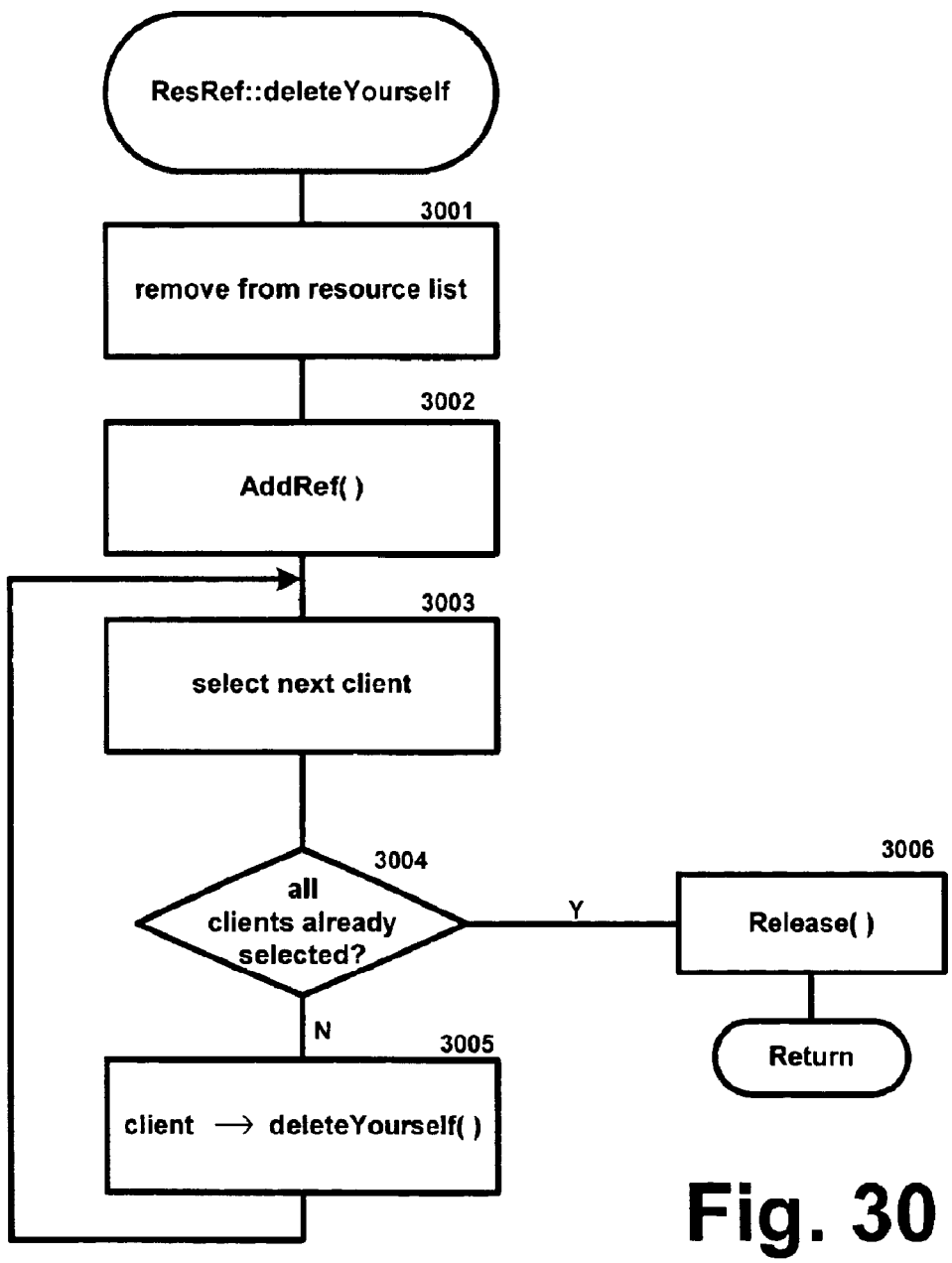
FIG. 30 is a flow diagram of an example implementation of the ResRef::deleteYourself function.

FIG. 30 is a flow diagram of an example implementation of the ResRef::deleteYourself function. In step 3001, the function removes this resource reference object from the resource reference list of the directory object. In step 3002, the function reference counts the resource reference object by invoking the AddRef function. In steps 3003–3005, the function loops selecting each client object in the client list and requesting that they delete themselves. In step 3003, the function selects the next client object in the client list. In step 3004, if all the client objects have already been selected, then the function releases the resource reference object by invoking the release function in step 3006 and then returns, else the function continues at step 3005. In step 3005, the function requests the selected client object to delete itself by invoking the deleteYourself function and then loops to step 3003 to select the next client object.

C. Client Object

Figure 31:
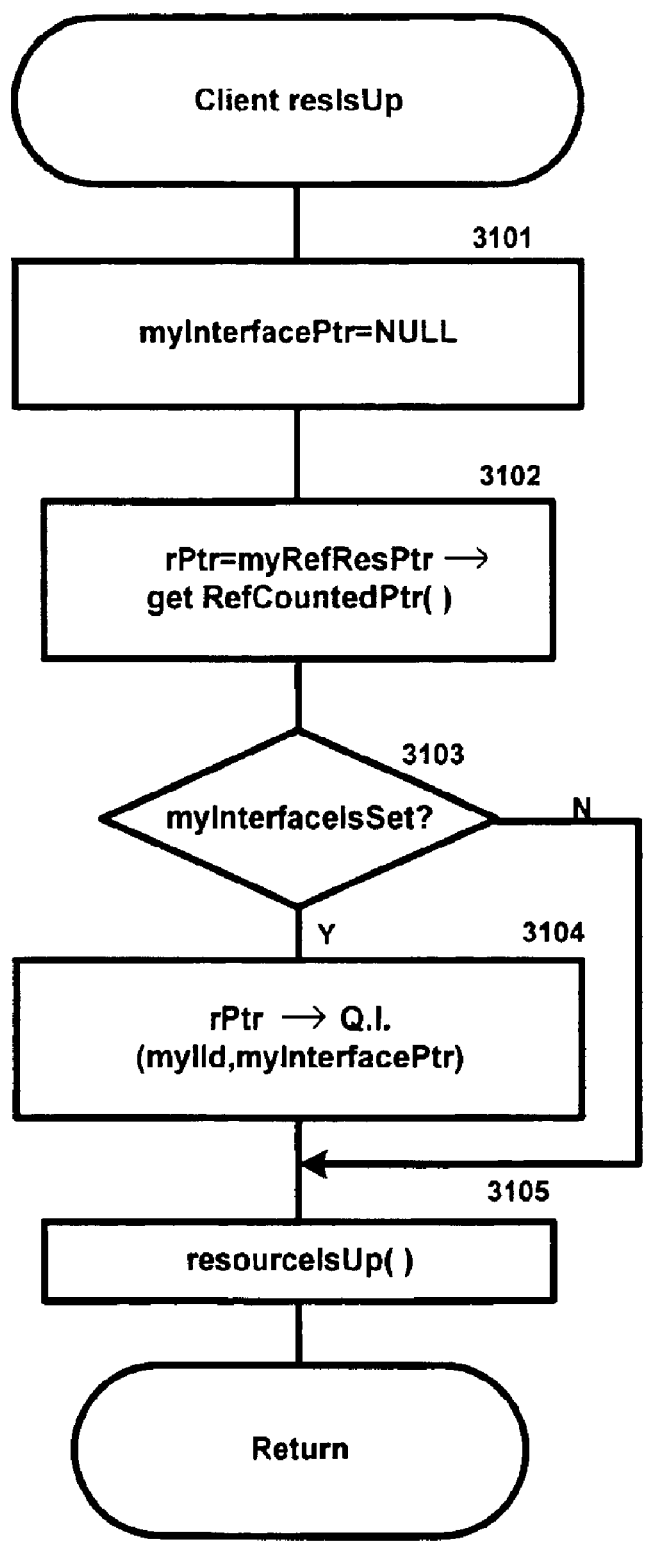
FIG. 31 is a flow diagram of an example implementation of the Client::resIsUp function.

FIGS. 31–34 are flow diagrams illustrating the processing of the functions of the client object. FIG. 31 is a flow diagram of an example implementation of the Client::resIsUp function. This function is invoked when the resource comes up. In step 3101, the function sets the interface pointer of this client object to null. In step 3102, the function retrieves a reference counted pointer to the resource by invoking the getRefCountedPtr function of the resource reference object and saves it in a smart pointer. In step 3103, if the client object has an interface identifier specified, then the function continues at step 3104, else the function continues at step 3105. In step 3104, the requested interface pointer is retrieved from the subject resource. In step 3105, the function retrieves a pointer to the interface by invoking the query interface function of the resource. In step 3105, the function notifies the client derivation that the resource is now up by invoking the resourceIsUp function provided by the client. The function then returns.

Figure 32:
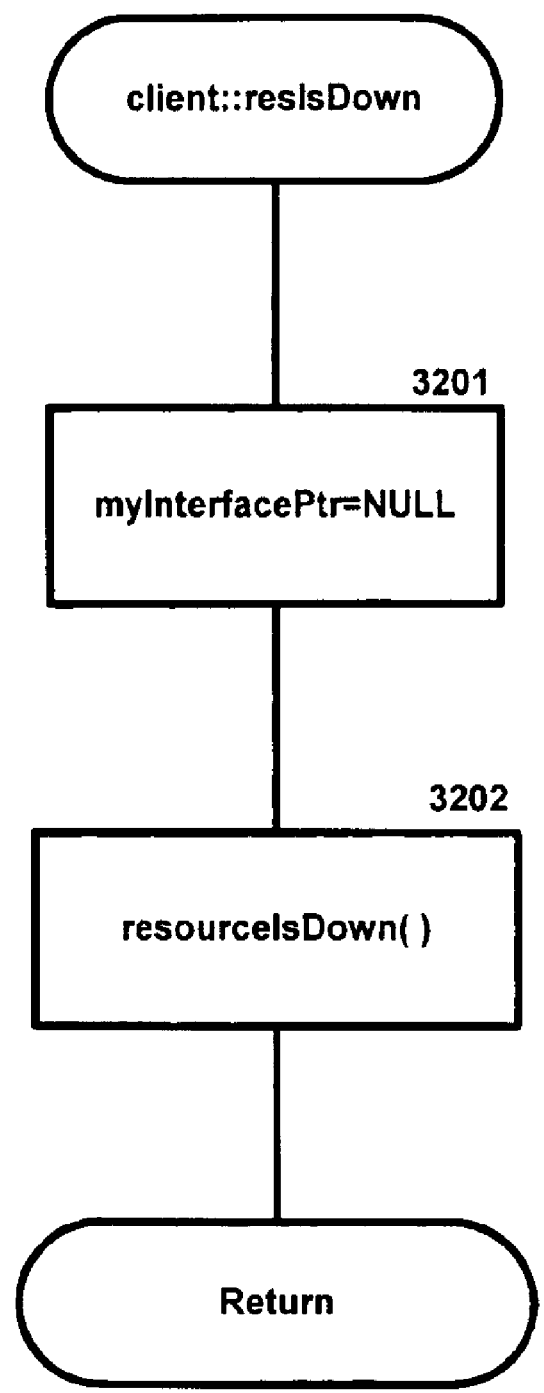
FIG. 32 is a flow diagram of an example implementation of the Client::resIsDown function.

FIG. 32 is a flow diagram of an example implementation of the Client::resIsDown function. This function is invoked when a resource goes down. In step 3201, the function sets the pointer to the resource for this client object to null. In step 3202, the function notifies the client that the resource is now down by invoking the resourceIsDown function provided by the client. The function then returns.

Figure 33:
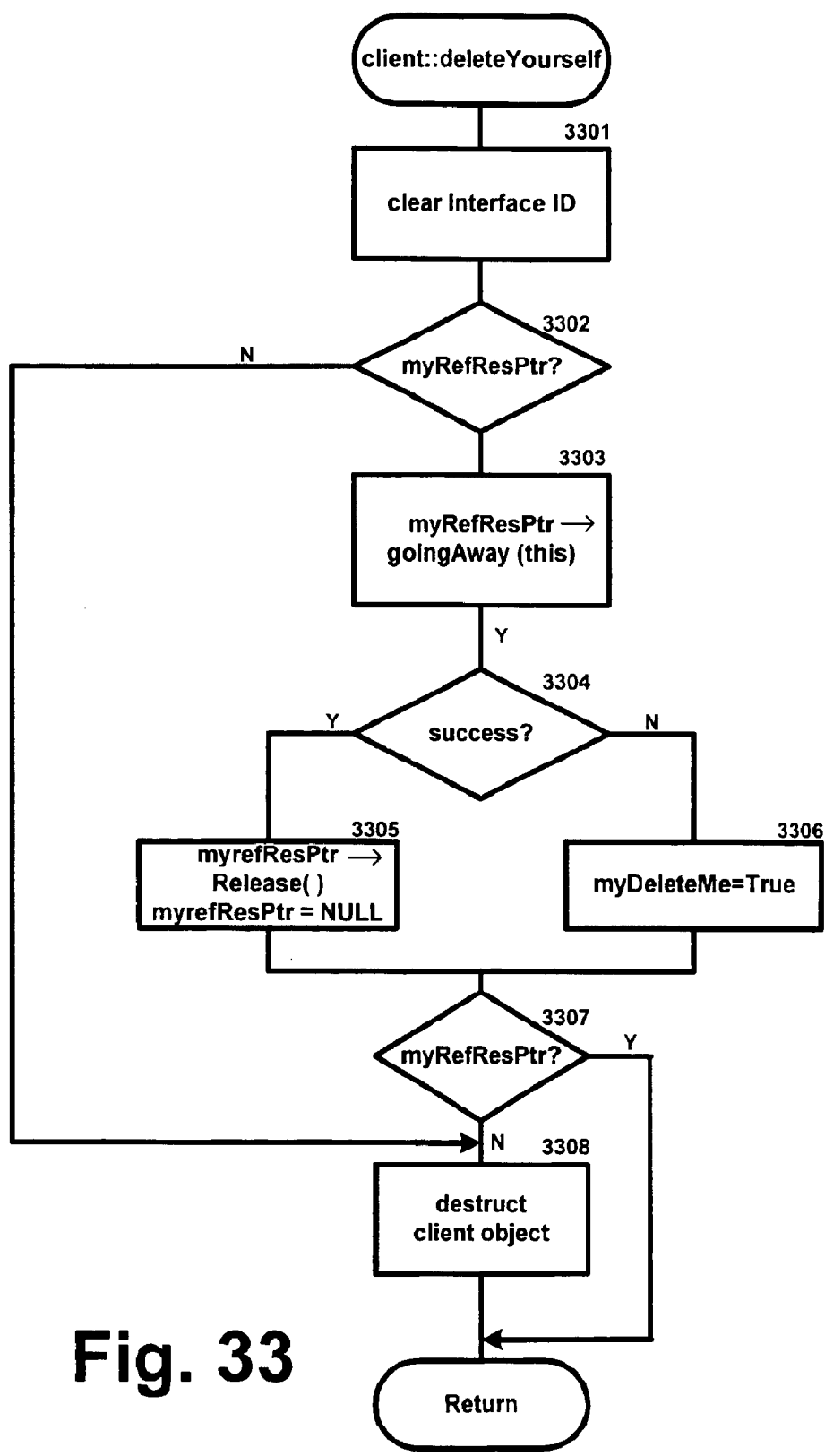
FIG. 33 is a flow diagram of an example implementation of the Client::deleteYourself function.

FIG. 33 is a flow diagram of an example implementation of the Client::deleteYourself function. This function is invoked when this client object is to be deleted. In step 3301, the function clears the interface identifier of this client object. In step 3302, if this client object has a reference to a resource reference object, then the function continues at step 3303, else the function continues at step 3308. In step 3303, the function notifies the resource reference object that this client is going away by invoking the to be goingAway function. In step 3304, if the invocation is successful, then the function continues at step 3305, else the function continues at step 3306. In step 3305, the function decrements the reference count for the resource reference object and sets its pointer to null. In step 3306, the function sets the delete flag of this client object to true. In the step 3307, if this client object has a reference to a resource reference object, then the function returns, else the function continues at step 3308. In step 3308, the function destructs this client object and returns.

Figure 34:
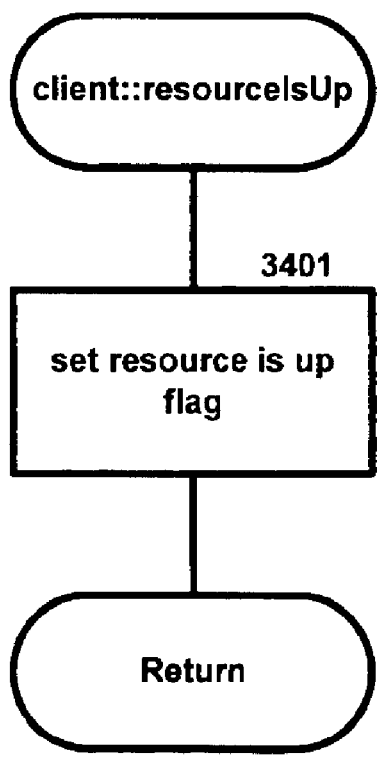
FIG. 34 is a flow diagram of example implementation of the Client::resourceIsUp function.

FIG. 34 is a flow diagram of example implementation of the Client::resourceIsUp function. This function is provided by a client to specify client specific processing to be performed when a resource comes up. In step 3401, this function sets a resource is up a flag for the client. The client also provides an analogous function for when a resource goes down.

2. Watching a Resource

FIGS. 35–44 are flow diagrams illustrating the example implementations of functions for watching a resource.

A. Watch Resource Component

Figure 35:
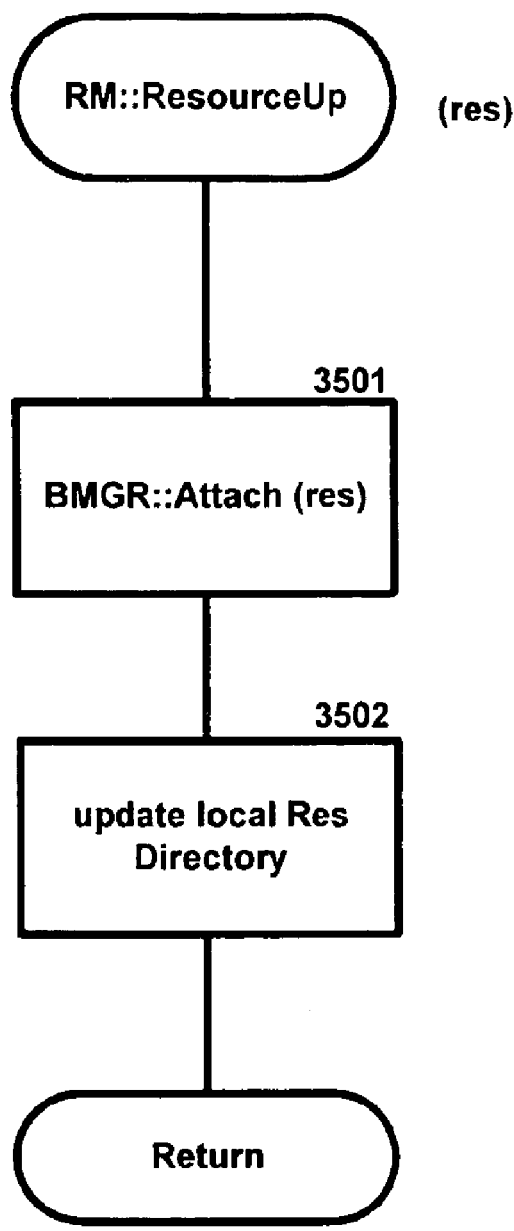
FIG. 35 is a flow diagram of an example implementation of the ResourceUp function of the resource manager.

FIGS. 35–39 are flow diagrams of functions of a resource manager for watching a resource. FIG. 35 is a flow diagram of an example implementation of the ResourceUp function of the resource manager. The resource manager invokes this function whenever a resource at that node is detected as being up. The resource manager may know that a resource is up because it controlled the creation of the resource at startup, because it dynamically created the resource when requested by another resource, or because another resource created that resource and registered the created resource with the resource manager. This function is passed a pointer to the resource that is now up. In step 3501, if the bus is up, then the function notifies the bus manager by invoking the attach function of the bus manager passing the identification of the resource that is now up, else the function returns. In step 3502, the function updates the local resource directory to indicate that the passed resource is up. The function then returns.

Figure 36:
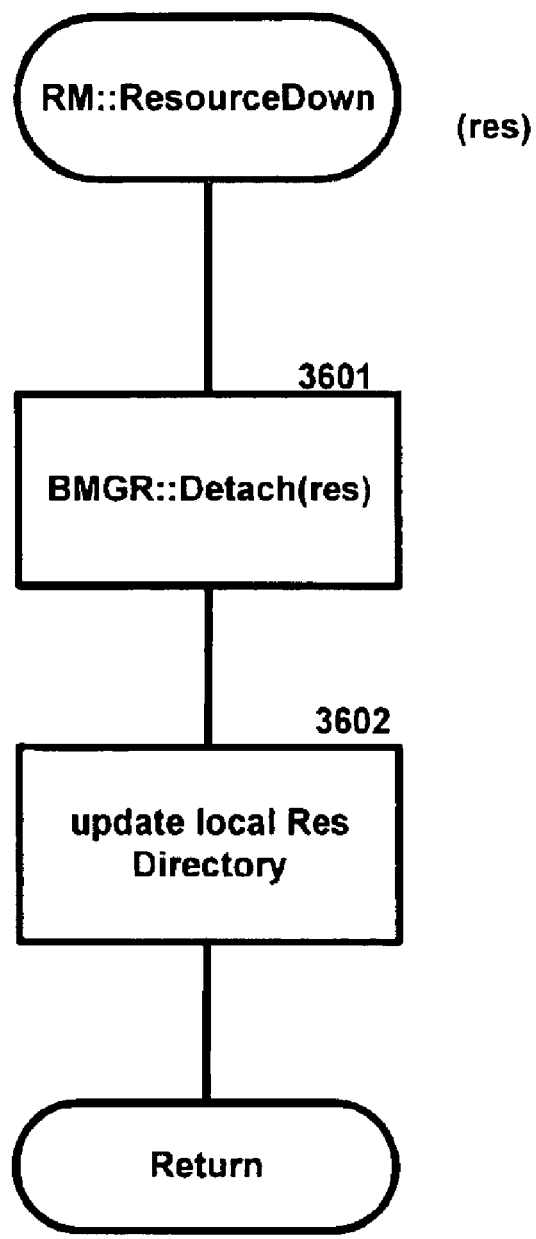
FIG. 36 is a flow diagram of an example implementation of the ResourceDown function of the resource manager.

FIG. 36 is a flow diagram of an example implementation of the ResourceDown function of the resource manager. The resource manager invokes this function passing the identification of a resource that has gone down. In step 3601, if the bus is up, then the function notifies the bus manager by invoking the detach function of the bus manager passing an indication of the resource that is now down, else the function returns. In step 3602, the function updates the local resource directory to indicate that the resource is no longer up. The function then returns.

Figure 37:
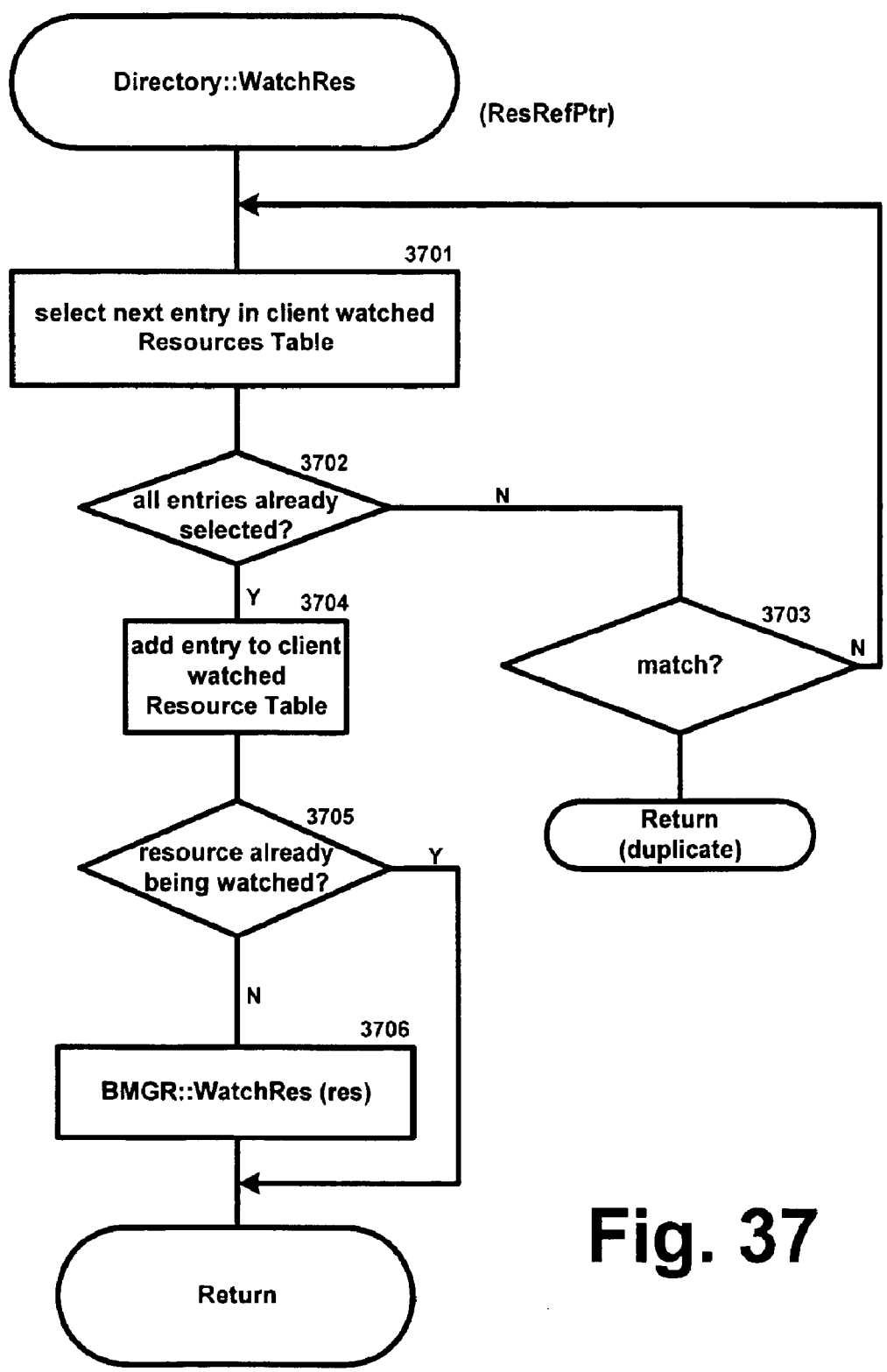
FIG. 37 is a flow diagram of an example implementation of the Directory::watchRes function.

FIG. 37 is a flow diagram of an example implementation of the Directory::watchRes function. This function is implemented by the resource manager and is invoked by a client to notify the resource manager to start watching a resource. This function is passed the identification (e.g., name) of the resource. In steps 3701–3703, the function loops checking whether the client node is already watching that resource. In the step 3701, the function selects the next entry in the client watched resource table starting with the first. In step 3702, if all the entries have already been selected, then the function continues in step 3704, else the function continues at step 3703. In step 3703, if the selected entry indicates that the passed resource is already being watched by the sane client, then the function returns an indication that a duplicate watch has been placed on this resource by the client, else the function loops to step 3701 to select the next entry. In step 3704, the function updates the client watched resource table to indicate that the client is watching the resource. In step 3705, if the resource is already being watched by the client node (because of a watch placed on that resource by another client), then the function returns, else the function continues at step 3706. In step 3706, if the bus is up, then the function notifies the bus manager to start watching the resource by invoking the watchRes function of the bus manager passing the identification of the resource to be watched. The function then returns. The passed pointer is passed to the bus manager as a notification context.

Figure 38:
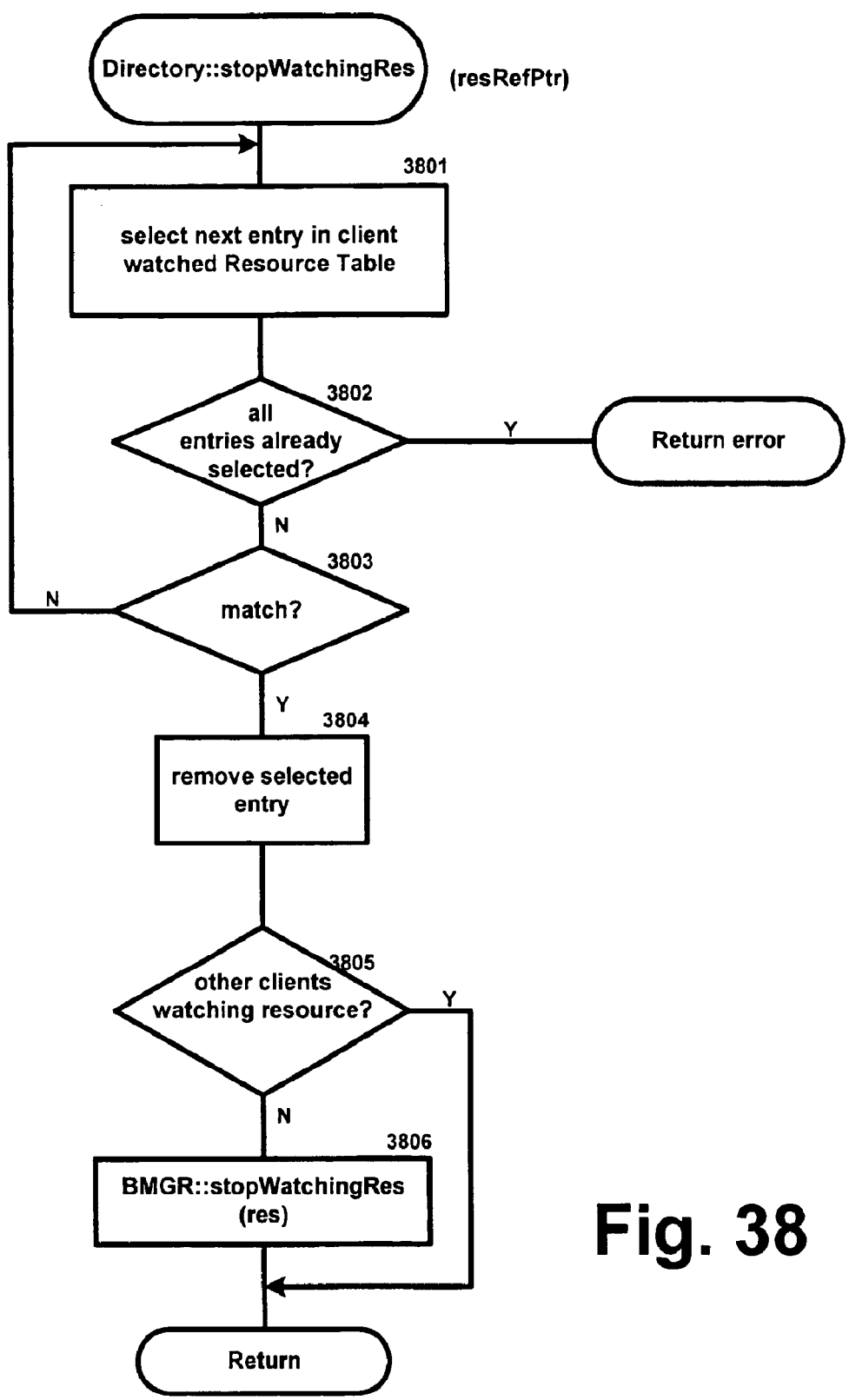
FIG. 38 is a flow diagram of an example implementation of the Directory::stopWatchingRes function.

FIG. 38 is a flow diagram of an example implementation of the Directory::stopWatchingRes function. This function is implemented by the resource manager and is invoked by a client to notify the resource manager to stop watching a resource. The function is passed the identification of the resource. In steps 3801–3803, the function searches for an entry corresponding to the resource and client in the client watched resource table. In step 3801, the function selects the next entry in the client watched resource table starting with the first. In step 3802, if all the entries have already been selected, then the client is not watching the resource and the function returns an error, else the function continues at step 3803. In step 3803, if the selected entry corresponds to the watch on the resource for the client, then the function continues at step 3804, else the function loops to step 3803 to select the next entry. In step 3804, the function removes the selected entry from the client watched resource table to indicate that the client is no longer watching the resource. In step 3805, if other clients at that node are still watching the resource, then the function returns, else the function continues at step 3806. In step 3806, if the bus is up, then the function notifies the bus manager to stop watching the resource by invoking the stopWatchingRes function of the bus manager passing an indication of the resource. The function then returns.

Figure 38A:
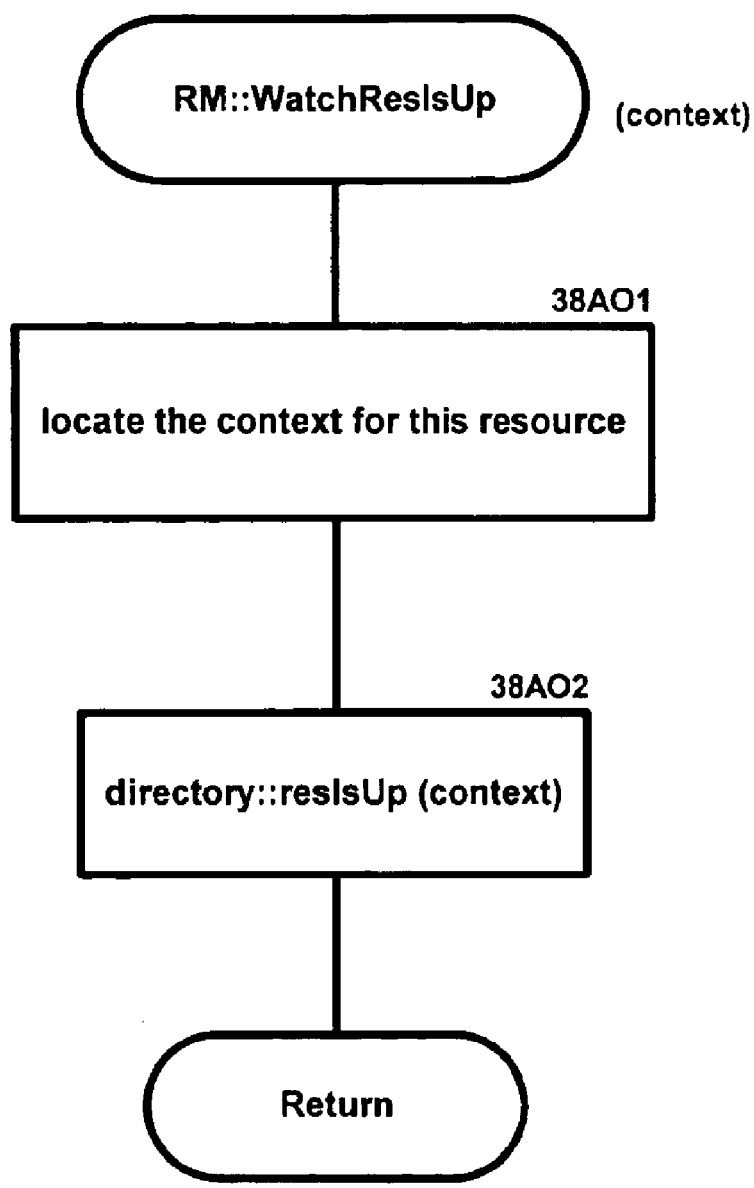
FIG. 38A is a flow diagram of an example implementation of a watchResIsUp function of the resource manager.

FIG. 38A is a flow diagram of an example implementation of a watchResIsUp function of the resource manager. This function is invoked by the bus manager when a resource that is being watched comes up. This function is passed the context of the resource that is now up. In step 38A01, the function locates the context for the resource that is now up. In step 38A02, the function invokes the resIsUp function of the directory object to notify the clients. The function then returns.

Figure 39:
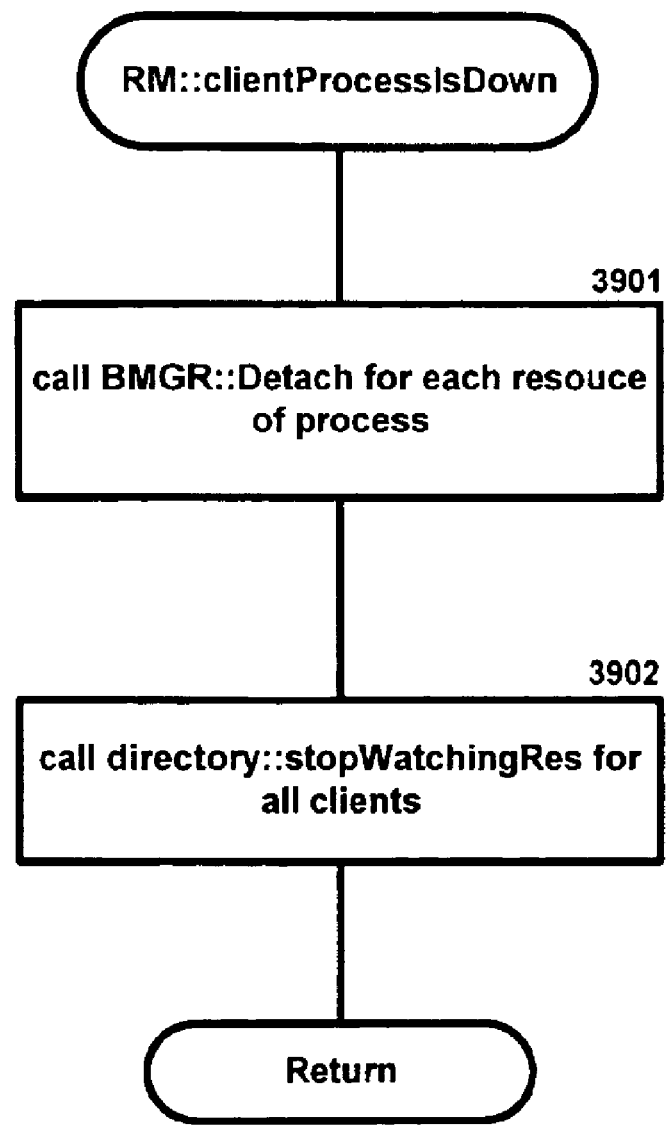
FIG. 39 is a flow diagram of an example implementation of the ClientProcessIsDown function of the resource manager.

FIG. 39 is a flow diagram of an example implementation of the ClientProcessIsDown function of the resource manager. The resource manager invokes this function whenever it detects that a process at the client node has gone down. This function performs processing to indicate that each resource of the process is now down. The resource manager maintains a list of resources per process in a process/resource list. In step 3901, if the bus is up, then the function notifies the bus manager that the resources of the process are now down by invoking the detach function of the bus manager for each resource in the process, else the function returns. In step 3902, the function invokes the Directory::stopWatchingRes function for each client within that process that was watching a resource as indicated by the client watched resource table. The function also updates its tables and returns then returns.

B. Bus Manager

Figure 40:
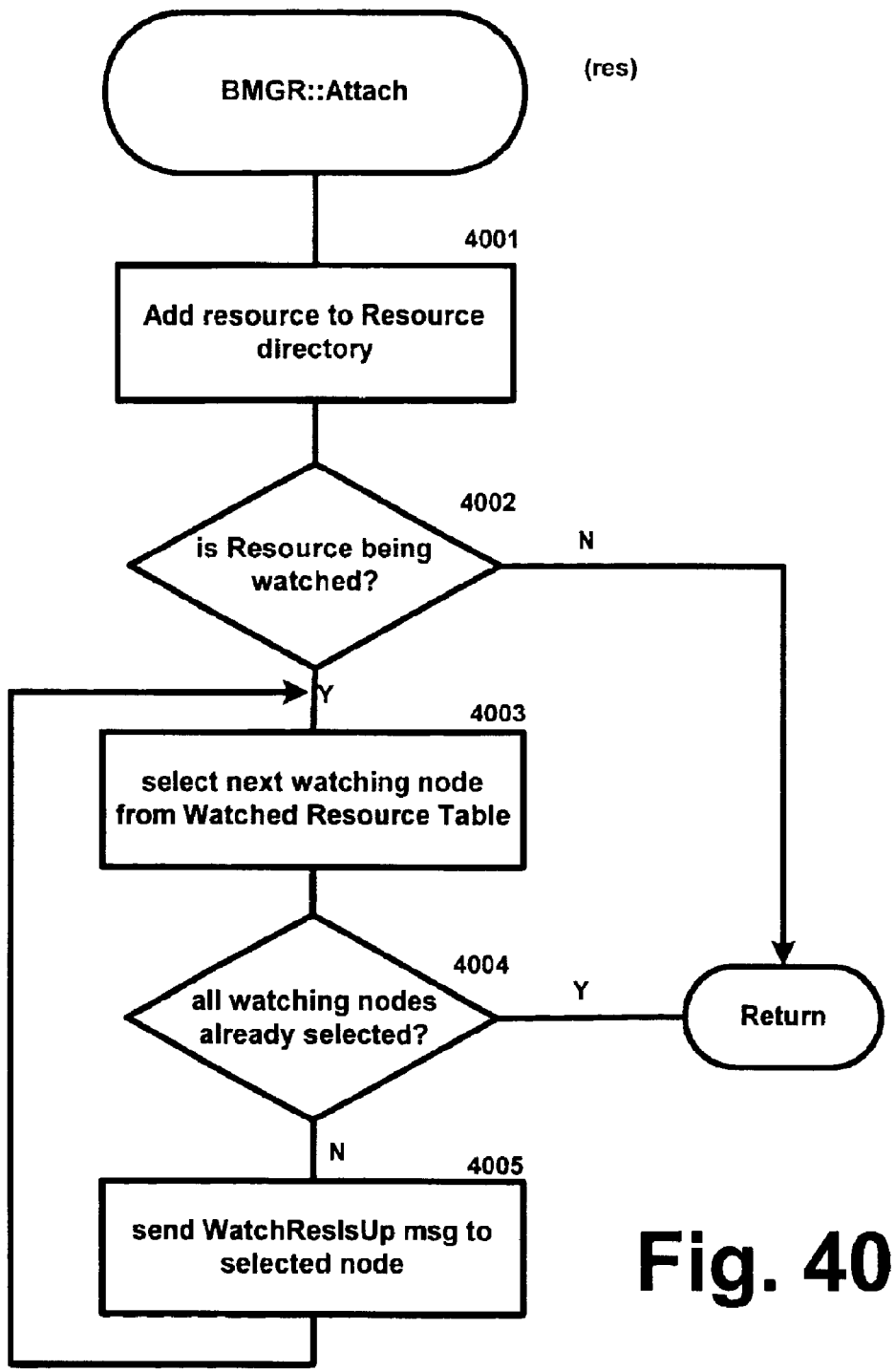
FIG. 40 is a flow diagram of an example implementation of the attach function of the bus manager.

FIGS. 40–44 are flow diagrams of functions of the bus manager. FIG. 40 is a flow diagram of an example implementation of the attach function of the bus manager. The attach function is invoked by nodes to notify the bus manager that a resource located at that node is now up. This function is passed an identification of and a pointer to the resource. In step 4001, the function updates the resource directory to indicate that the identified resource is now up and stores a pointer to that resource. In step 4002, if this resource is being watched, then the function continues at step 4003, else the function returns. The function determines whether a resource is being watched by searching the watched resource table of the bus manager. In step 4003–4005, the function loops notifying the client nodes which are watching the resource that the resource is now up. In step 4003, the function selects the next watching node that is watching for that resource from the local watched resource table. In step 4004, if all the watching nodes have already been selected, then the function returns, else the function continues at step 4005. In step 4005, the function notifies the selected watching node that the resource is now up by invoking the watchResIsUp function of the watching node. The function then loops to step 4003 to select the next watching node.

Figure 41:
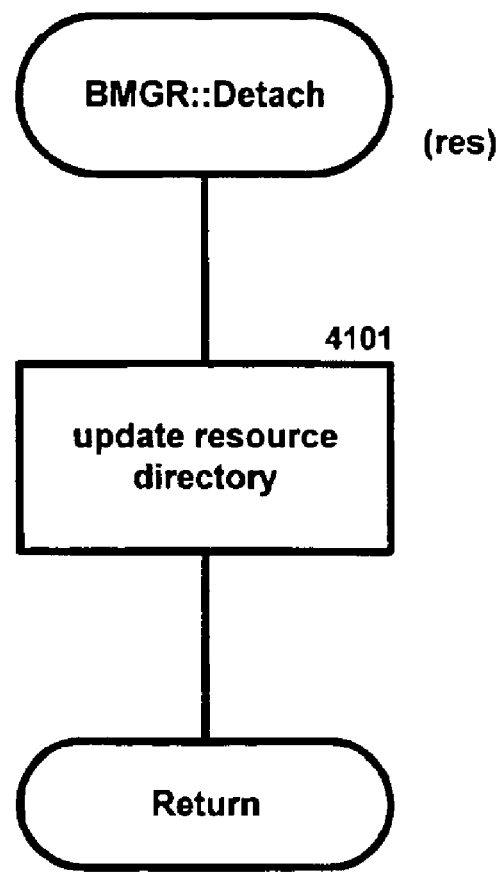
FIG. 41 is a flow diagram of an example implementation of the detach function of the bus manager.

FIG. 41 is a flow diagram of an example implementation of the detach function of the bus manager. The detach function is invoked by nodes to notify the bus manager that a resource located at that node is now down. This function is passed an indication of the resource. In step 4101, the function updates the resource directory to indicate that the resource is no longer up and then returns.

Figure 42:
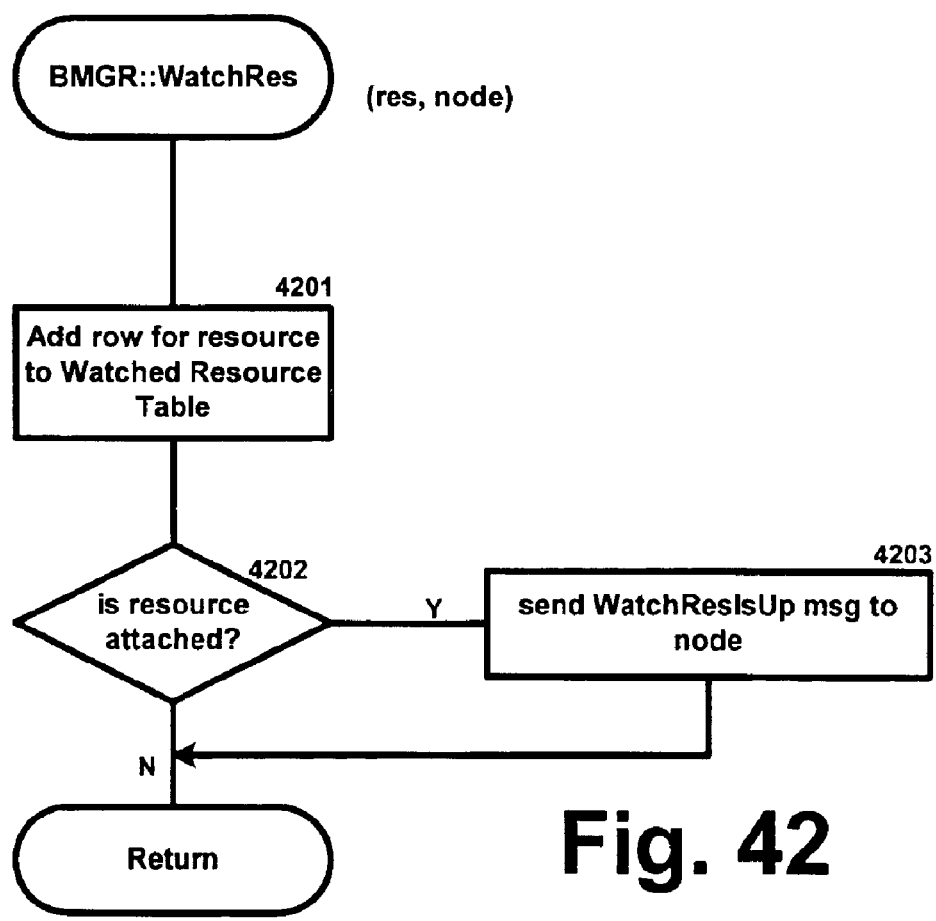
FIG. 42 is a flow diagram of an example implementation of the watchRes function of the bus manager.
Figure 43:
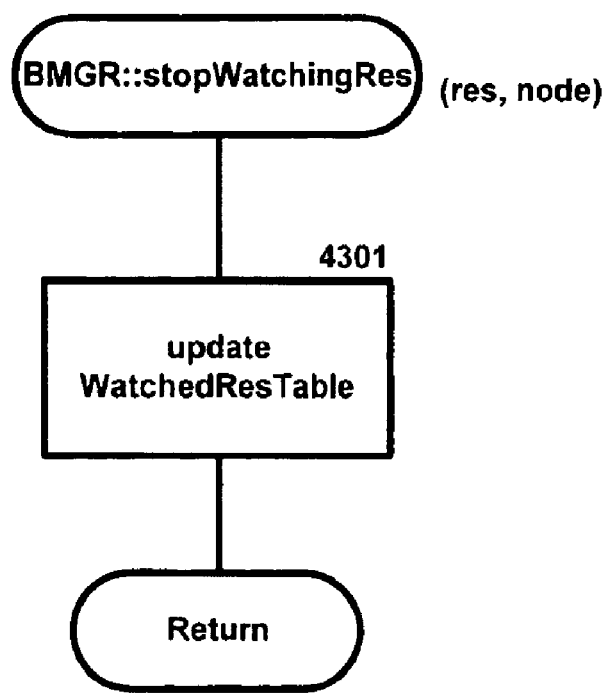
FIG. 43 is a flow diagram of an example implementation of the stopWatchingRes function of the bus manager.

FIG. 42 is a flow diagram of an example implementation of the watchRes function of the bus manager. This function is invoked by a client node and is passed the identification of the resource to be watched along with a pointer to an interface of the client node. The bus manager invokes the function watchResIsUp of the interface to notify the client node when the resource comes up. In step 4201, the function adds an entry to the local watched resource table for the passed resource and client node. In step 4202, if the resource is already up as indicated by the resource directory, then the function continues at step 4203, else the function returns. In step 4203, the function notifies the client node that the passed resource is up by invoking the watchResIsUp function of the client node passing the identification of and a pointer to the resource. The function then returns FIG. 43 is a flow diagram of an example implementation of the stopWatchingRes function of the bus manager. A client node invokes this function to stop watching the passed resource. In step 4301, the function updates the watched resource table of the bus manager to indicate that the passed client node is not watching the passed resource. The function then returns.

Figure 44:
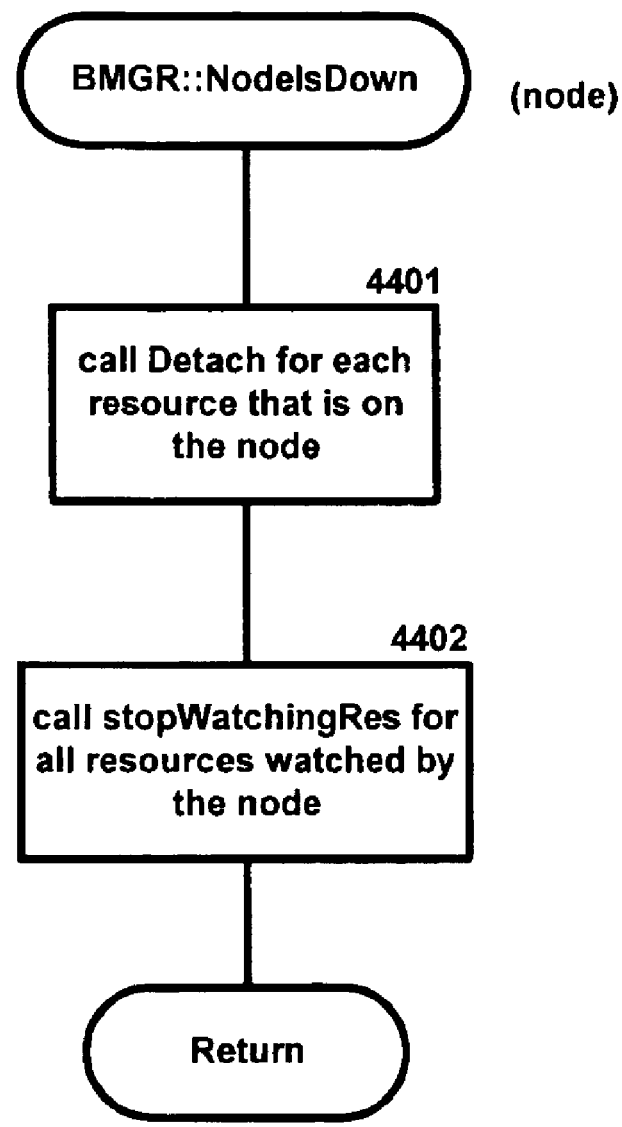
FIG. 44 is a flow diagram of example implementation of the nodeIsDown function of the bus manager.

FIG. 44 is a flow diagram of example implementation of the nodeIsDown function of the bus manager. The bus manager invokes this function whenever the bus manager detects that a node has gone down. In step 4401, the function invokes the detach function for each resource that was attached by the node that has gone down. In step 4402, the function invokes the stopWatchingRes function of the bus manager for all resources that were being watched by the node that has gone down. The function then returns.

3. Monitoring a Resource

FIG. 45–52 are flow diagrams of example implementations of the functions of a client node and server node for monitoring a resource.

A. Client Node

Figure 45:
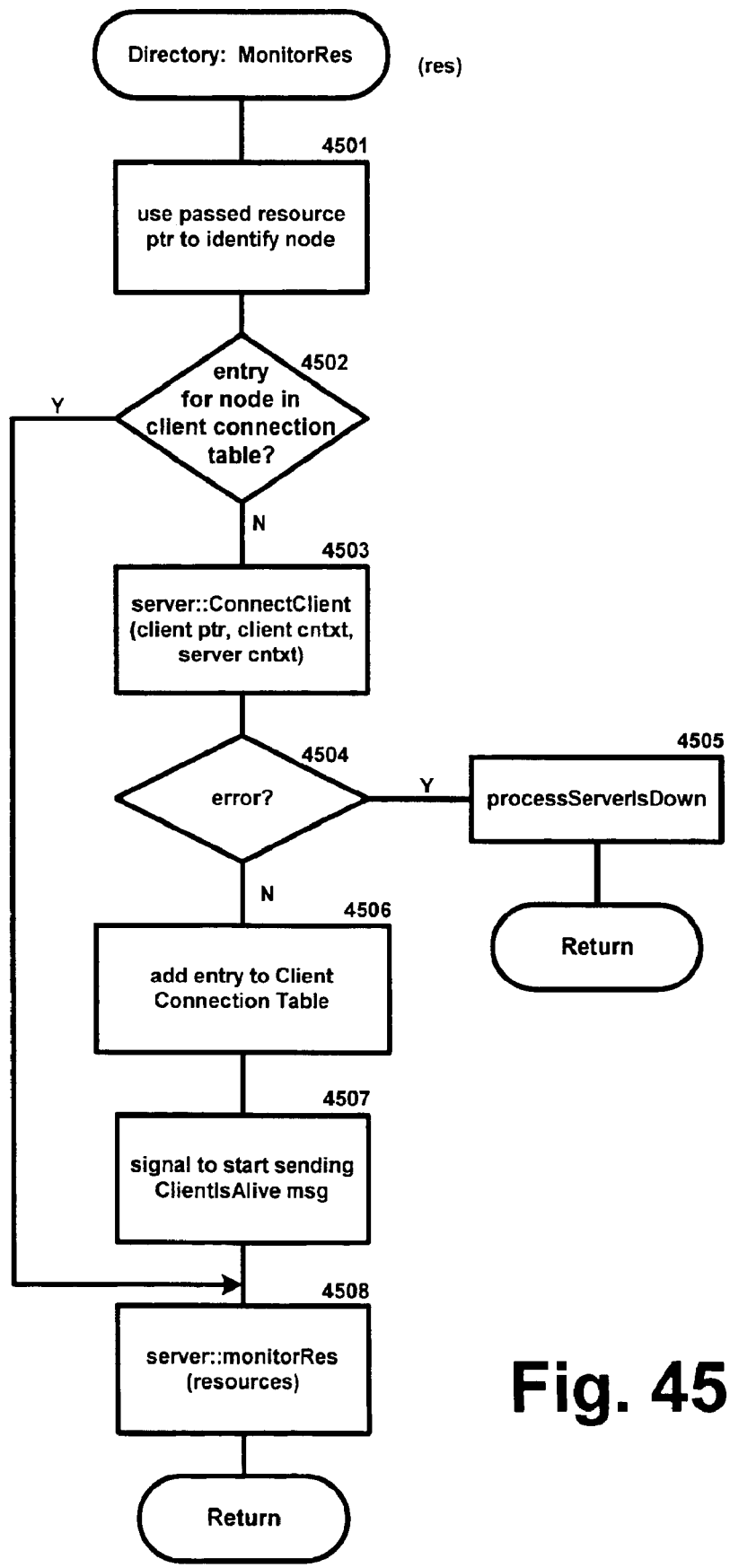
FIG. 45 is a flow diagram of an example implementation of the Directory::monitorRes function.

FIG. 45 is a flow diagram of an example implementation of the Directory::monitorRes function. This function is implemented by the resource manager and is invoked by a client to start monitoring for the passed resource to go down. In step 4501, the function uses the passed resource to identify the server node (i.e., the node where the resource is located) for the resource. The function may use the query interface function of the resource to retrieve a pointer to an interface for identifying the server node. The function also updates the monitor resource table for the resource and client so that the client can be notified when the resource goes down and so that the server node can be re-notified if it goes down and comes up. In step 4502, if a connection has already been established with the server node as indicated by the client connection table, then the function continues at step 4508, else the function continues at step 4503. In step 4503, the function establishes a connection with the server node by invoking the connectClient function of the server node passing a pointer to an interface of the client node for receiving notifications and passing a client context for identifying this connection. The invocation returns a server context. In step 4504, if an error is detected when invoking the connectClient function, then the function continues at step 4505, else the function continues at step 4506. In step 4505, the function assumes that the server node is down and performs the associated processing and then returns. In step 4506, the function updates the client connection table to indicate that a connection has now been established with server node with the client and server context. In step 4507, the function signals to start sending a client is alive message periodically to the server node. The sending of the client is alive message may be considered to be one form of "leasing" a resource. In step 4508, the function invokes the monitor resource function of the server node passing the identification of the resource to be monitored. The function then returns.

Figure 46:
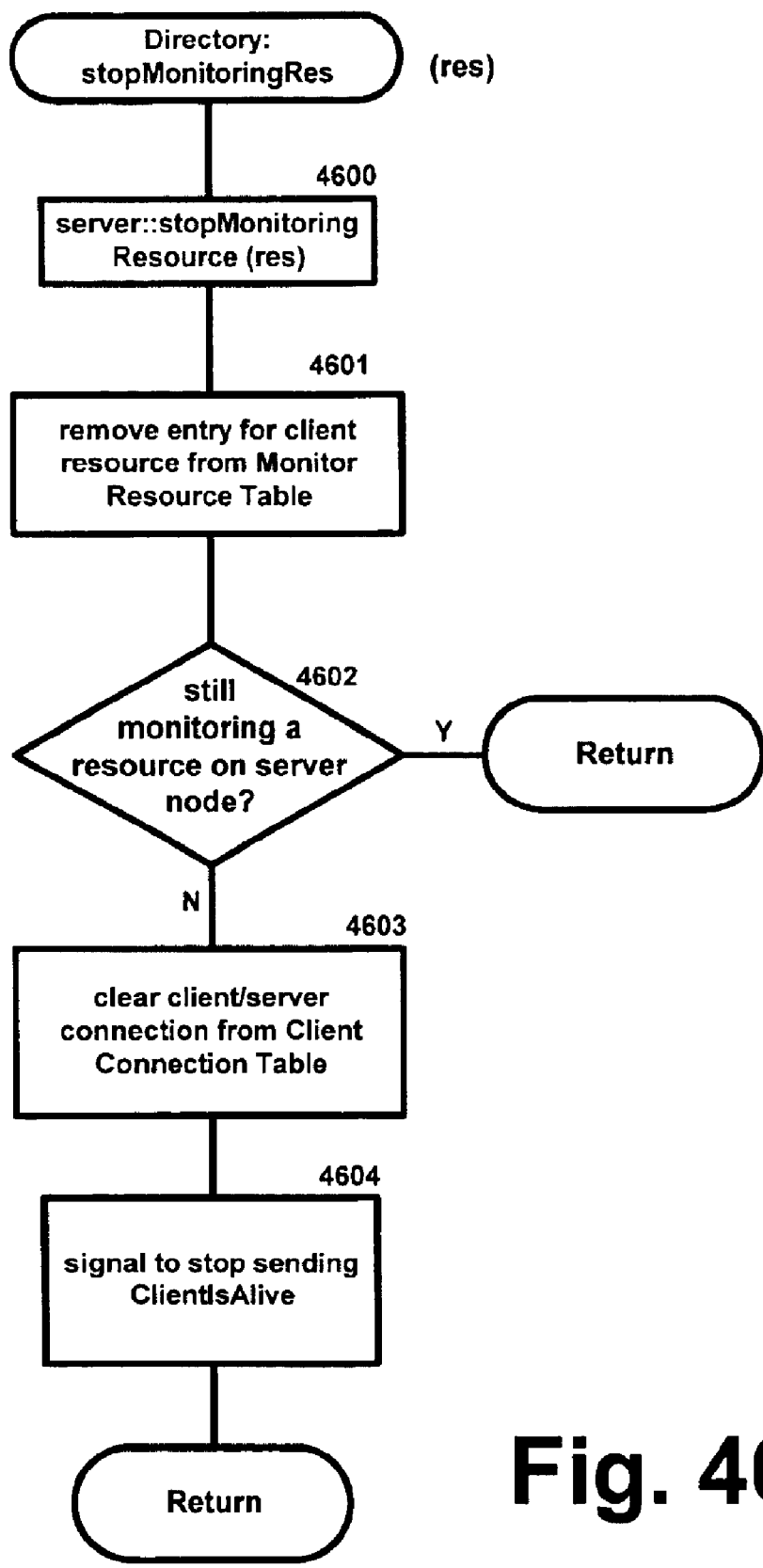
FIG. 46 is a flow diagram of example implementation of the Directory::stopMonitoringRes function.

FIG. 46 is a flow diagram of example implementation of the Directory::stopMonitoringRes function. This function is implemented by the resource manager and is invoked by a client to stop monitoring for the passed resource to go down. In step 4600, the function invokes the stop monitoring resource function of the server passing an identification of the resource. In the step 4601, the function updates the monitor resource table to indicate that the resource is no longer being monitored by the invoking client. In step 4602, if the client node is still monitoring a resource of the server node, then the function returns, else the function continues at step 4603. In step 4603, the function updates the client connection table to indicate that there is no longer a connection between the client node and the server node. In step 4604, the function signals to stop sending the client is alive message to the server node. When the server node does not receive this message during the next time period, the server node will update its server connection table to indicate that there is longer a connection. The function then returns.

Figure 46A:
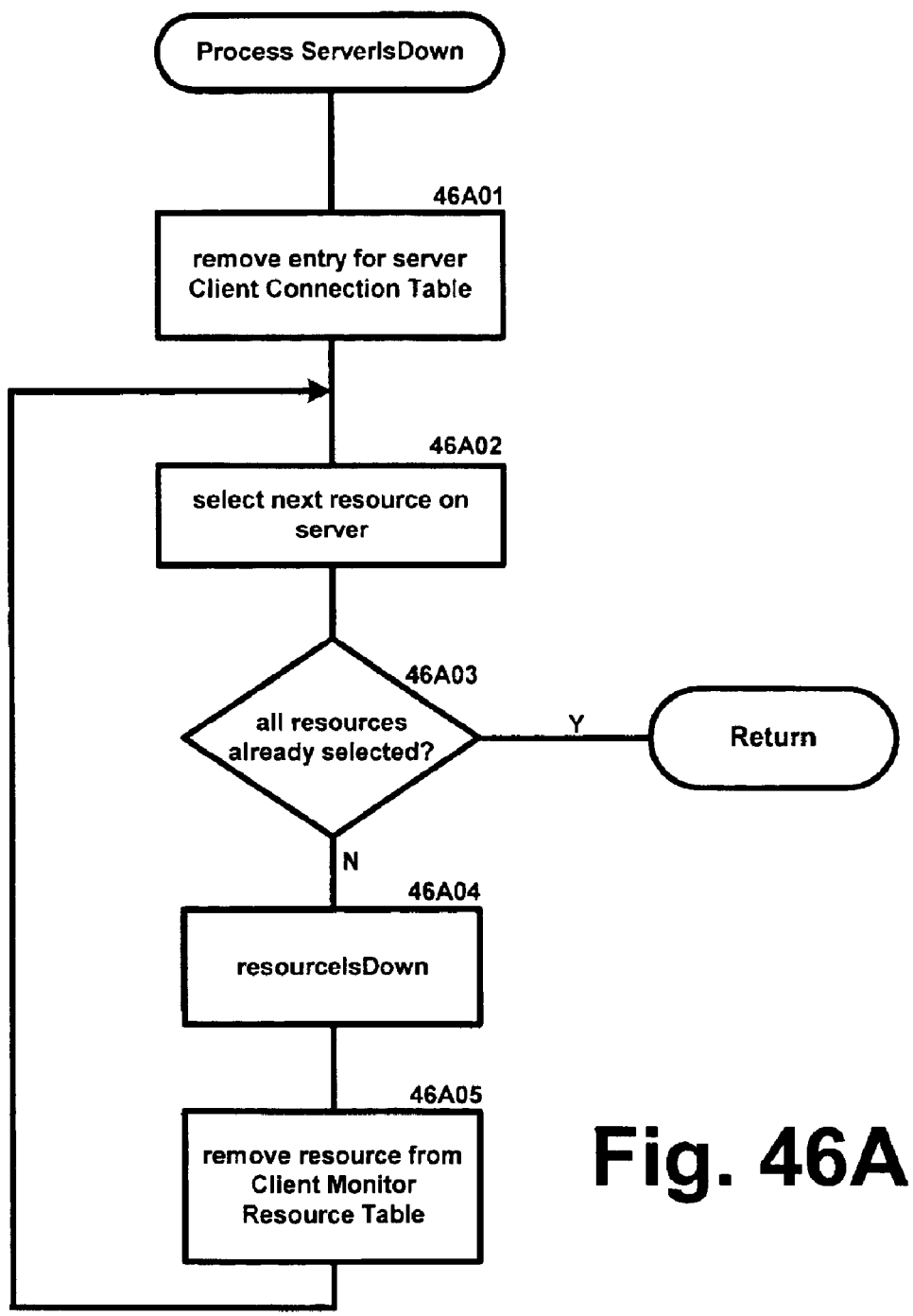
FIG. 46A is a flow diagram of an example implementation of a processServerIsDown function.

FIG. 46A is a flow diagram of an example implementation of a processServerIsDown function. This function is invoked when the client node detects that a server node is down. In step 46A01, the function removes an entry for the server node from the client connection table to indicate that there is no longer a connection established with that server node. In steps 46A02–46A05, the function loops notifying clients that are monitoring a resource on the server node that the resource has gone down. In step 46A02, the function selects the next resource of the server node. In step 46A03, if all resources have already been selected, then the function returns, else the function continues at step 46A04. In step 46A04, the function invokes the resIsDown function of the directory object. In step 46A05, the function removes resource entry from the client monitor resource table. The function then loops to step 46A02 to select the next resource.

Figure 47:
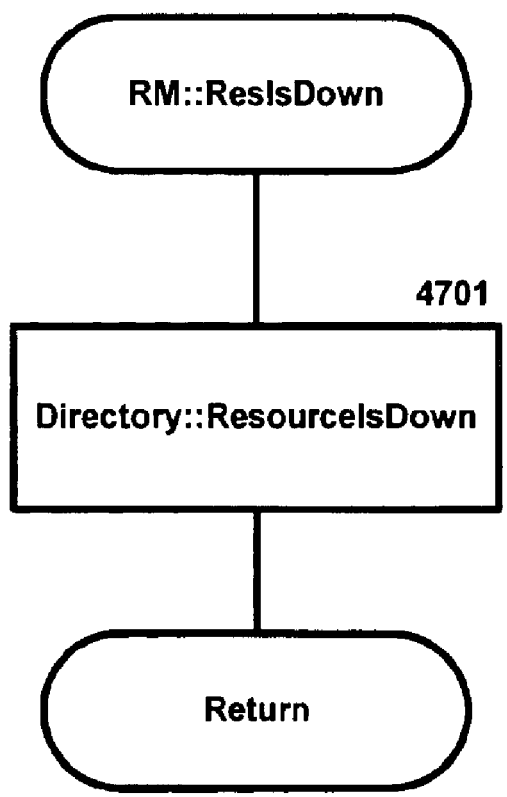
FIG. 47 is a flow diagram of an example implementation of a resIsDown function of the resource manager.

FIG. 47 is a flow diagram of an example implementation of a resIsDown function of the resource manager. This function is invoked by a server node to notify the resource manager that a resource that is being monitored has gone down. In step 4701, the function invokes the resIsDown function of the directory object to notify the monitoring clients and then returns.

B. Server Node

Figure 48:
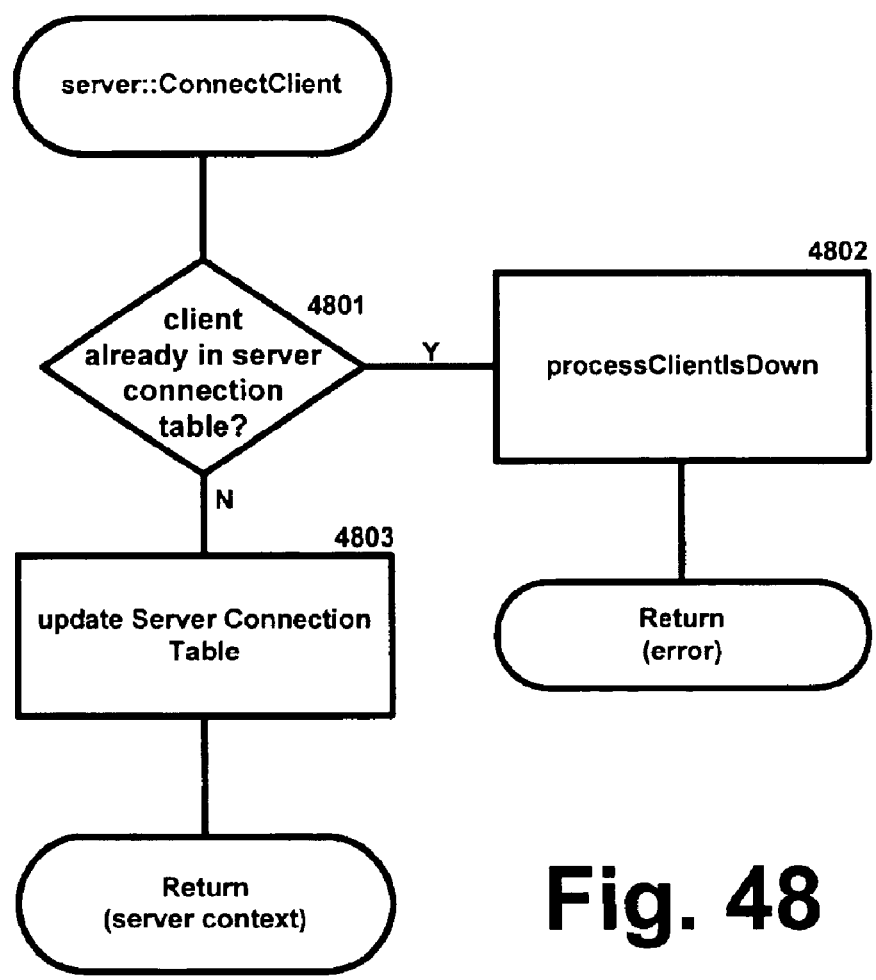
FIG. 48 is a flow diagram of an example implementation of a connectClient function of a server node.

FIG. 48 is a flow diagram of an example implementation of a connectClient function of a server node. A client node invokes this function when it wants to start monitoring resources at the server node. This function is passed a pointer to an interface of the client node which can be invoked by the server node to notify the client node when a resource has gone down. The function is also passed a client context that identifies this connection for the client. The function returns a server context. The combination of client context and server context uniquely identifies the connection. In step 4801, if the client node has a connection currently established with the server node as indicated by the server connection table, then the function continues at step 4802, else the function continues at step 4803. The server node may have missed a message that indicated that the client node had previously gone down. In step 4802, the function performs the processing to indicate that the client node has gone down and then returns an error to the client node. When the client node receives this error message, it will again try to re-establish the connection and this time the server node will recognize that no connection is currently established. In step 4803, the function updates the server connection table to indicate that a connection is currently established between the server node and client node and that the connection is identified by the server context and client context. The function then returns the server context to the client node.

Figure 48A:
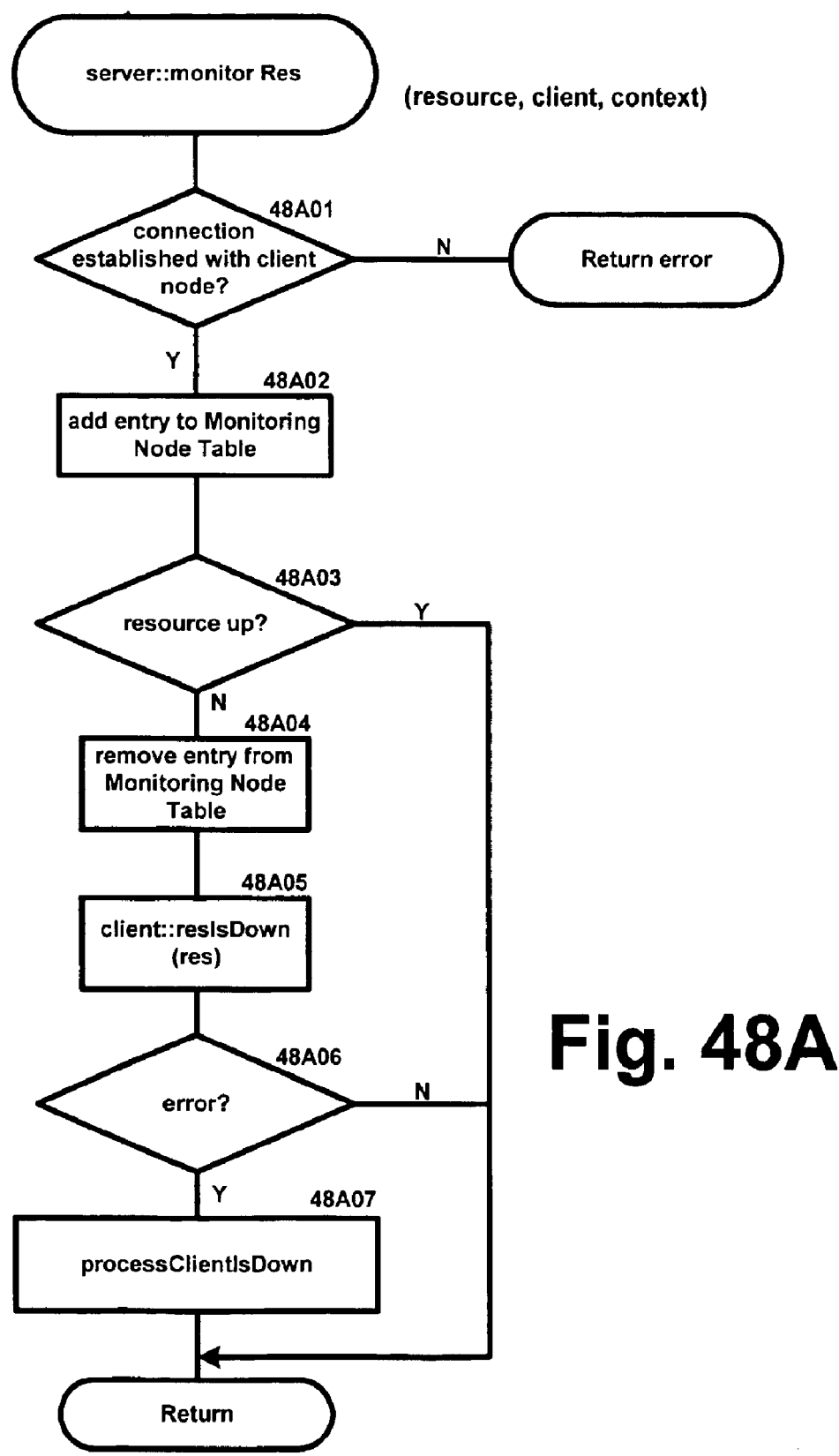
FIG. 48A is a flow diagram of an example implementation of the monitor resource function of the server node.

FIG. 48A is a flow diagram of an example implementation of the monitor resource function of the server node. This function is passed an identification of the resource, an identification of the client node, and the current connection context for the connection between the client and server nodes. In step 48A01, if a connection is currently established with the client node, then the function continues at step 48A02, else the function returns are an error. In step 48A02, the function adds an entry indicating that the client node is monitoring the resource to the monitoring node table. In step 48A03, if the resource is currently up, then the function returns, else the function continues at step 48A04. In step 48A04, the function removes the entry that was just added from the monitoring node table. In step 48A05, the routine invokes the resource is down function of the client node passing an indication of the resource. In step 48A06, if an error was detected in notifying the client node that the resources down, then the function continues at step 48A07, else the function returns. In step 48A07, the function assumes that the client node is down and performs the appropriate processing. The function then returns.

Figure 48B:
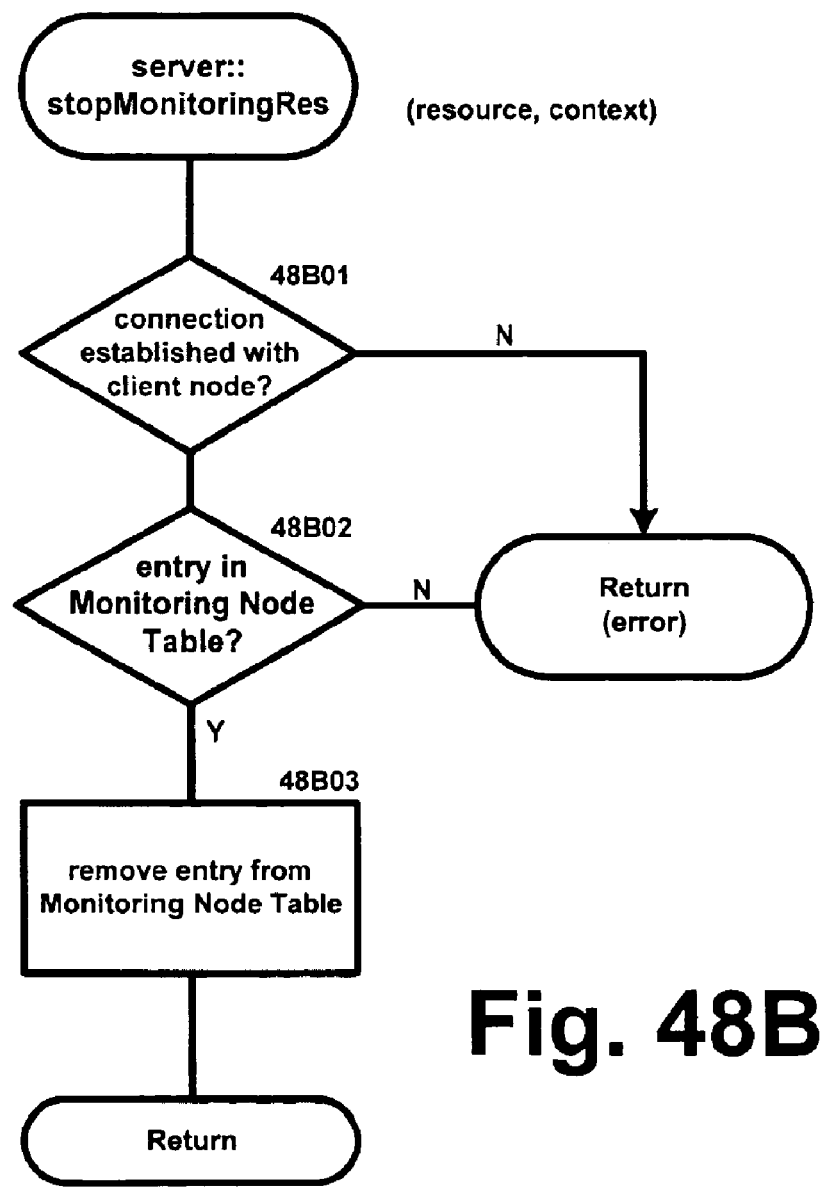
FIG. 48B is a flow diagram of an example implementation of the stop monitoring resource function of the server node.

FIG. 48B is a flow diagram of an example implementation of the stop monitoring resource function of the server node. The function is passed an identification of a resource and the current connection context for the connection between the client and server nodes. In step 48B01, if a connection is currently established with the client node, then the function continues at step 48B02, else the function returns an error. In step 48B02, if there is an entry in the monitoring node table corresponding to the monitoring of this resource by the client node, then the function continues at step 48B03, else the function returns an error. In step 48B03, the function removes the entry from the monitoring node table and then returns.

Figure 49:
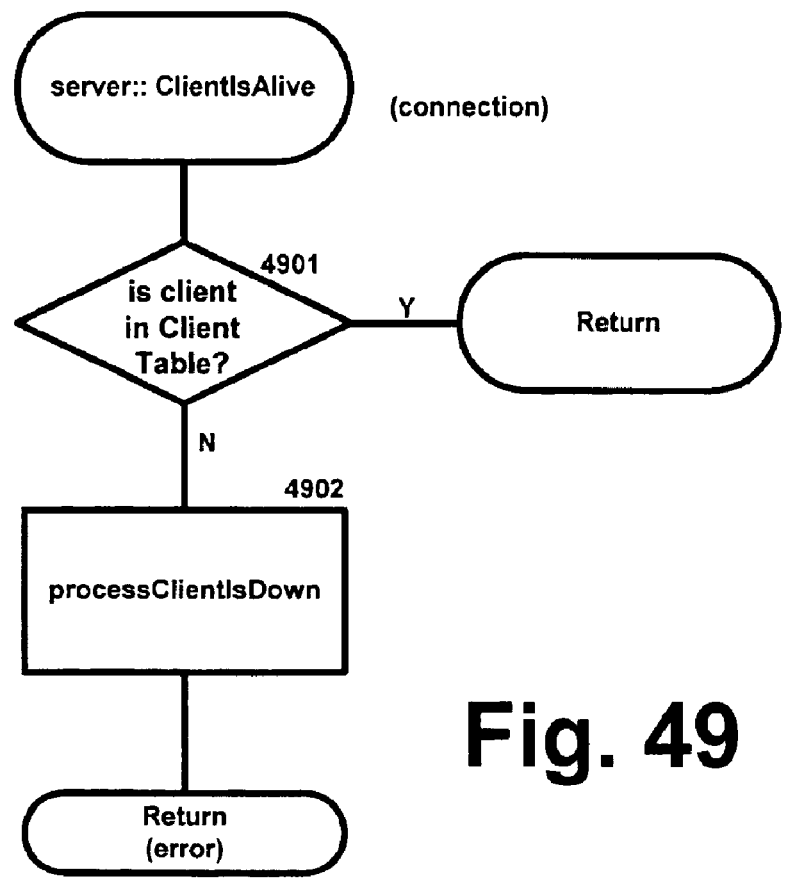
FIG. 49 is a flow diagram of example implementation of the clientIsAlive function of a server node.

FIG. 49 is a flow diagram of example implementation of the clientIsAlive function of a server node. This function is invoked by a client node and is passed the identification of the connection, that is a combination of client context and server context. In step 4901, if the client is in the client table, then the function resets the keep alive timer for that client and returns, else the function continues at step 4902. In step 4902, the function assumes that in the client node has gone down and returns an error message to the client node.

Figure 50:
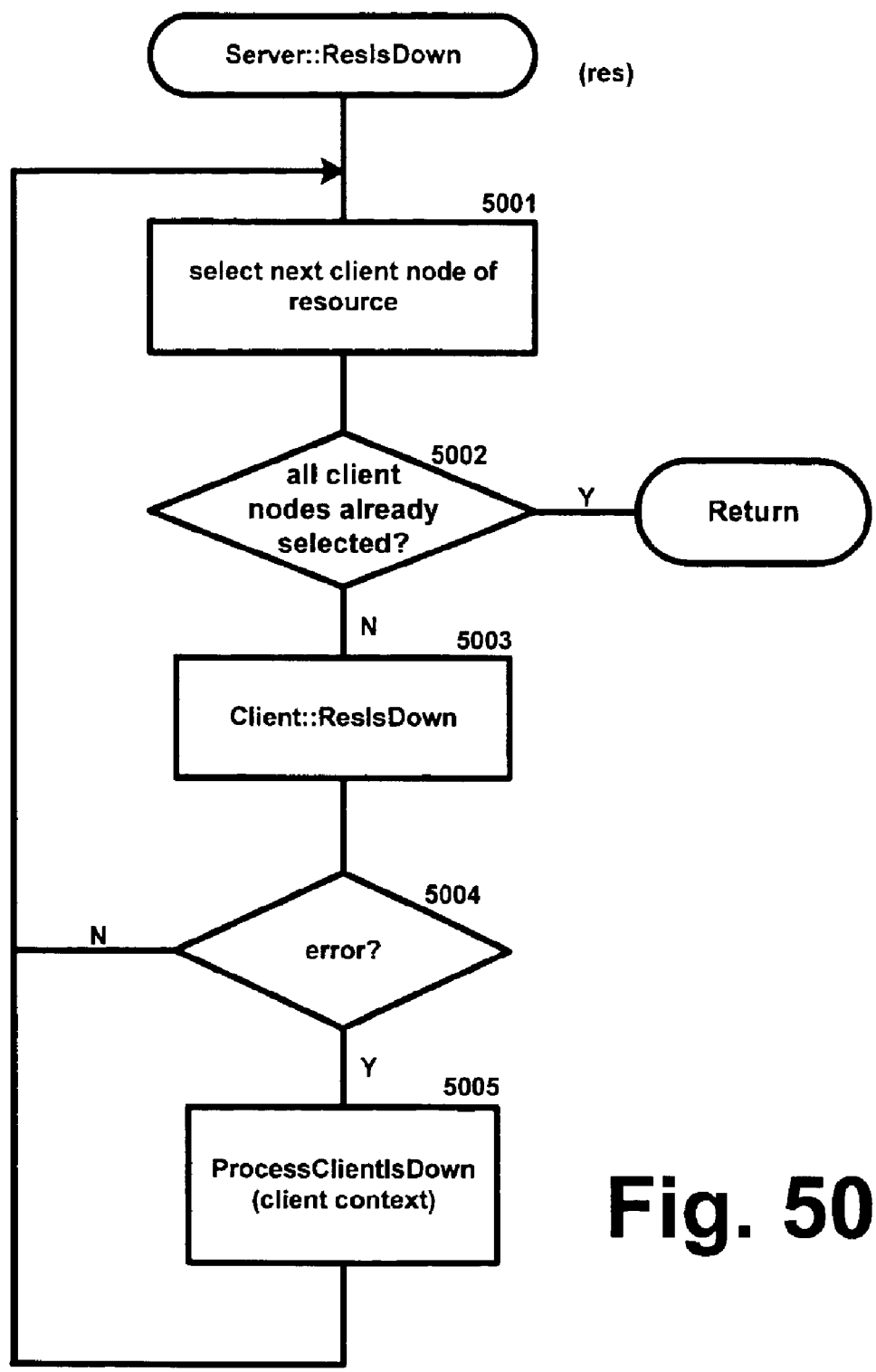
FIG. 50 is a flow diagram of an example implementation of the resIsDown function of a server node.

FIG. 50 is a flow diagram of an example implementation of the resIsDown function of a server node. This function is invoked when it is detected that a resource has gone down at the server node. This function notifies each client node that has requested to monitor that resource. In step 5001, the function selects the next client node from the monitoring node table that is monitoring that resource. In step 5002, if all the client nodes have already been selected, then the function returns, else the function continues at step 5003. In step 5003, the function invokes the resIsDown function of the client node using the pointer to the client node stored in the server connection table passing the identification of the resource that is now down. In step 5004, if an error is detected in the invocation, then the function continues at step 5005, else the function loops to step 5001 to select next client node. In step 5005, the function assumes that the selected client node has gone down and updates the server connection table and the monitoring node table and simulates that it received a resource is down message for each resource on the client node that is being maintained by the server node and loops to step 5001 to select the next client node.

Figure 51:
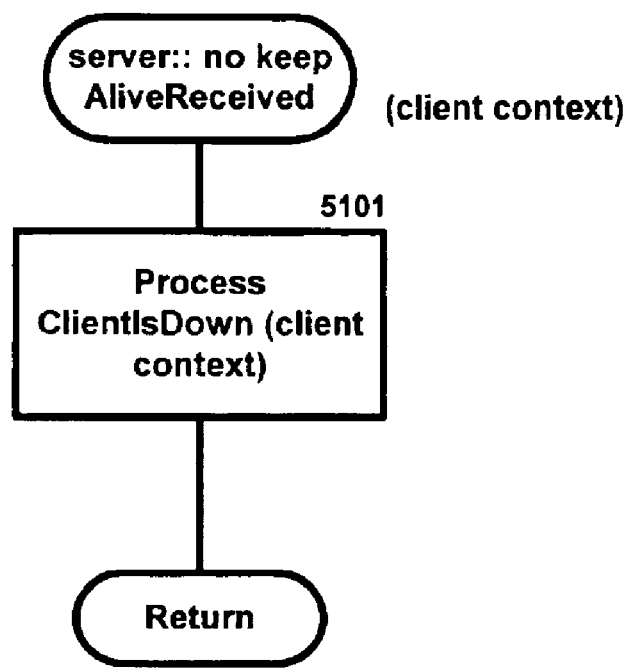
FIG. 51 is a flow diagram of an example implementation of a noKeepAliveReceived function of the server node.

FIG. 51 is a flow diagram of an example implementation of a noKeepAliveReceived function of the server node. This function is invoked when the server node detects that no keep alive message has been received from a certain client within the time. In step 5101, the function assumes that the client has gone down and updates the server connection table for that client. The function then returns.

Figure 52:
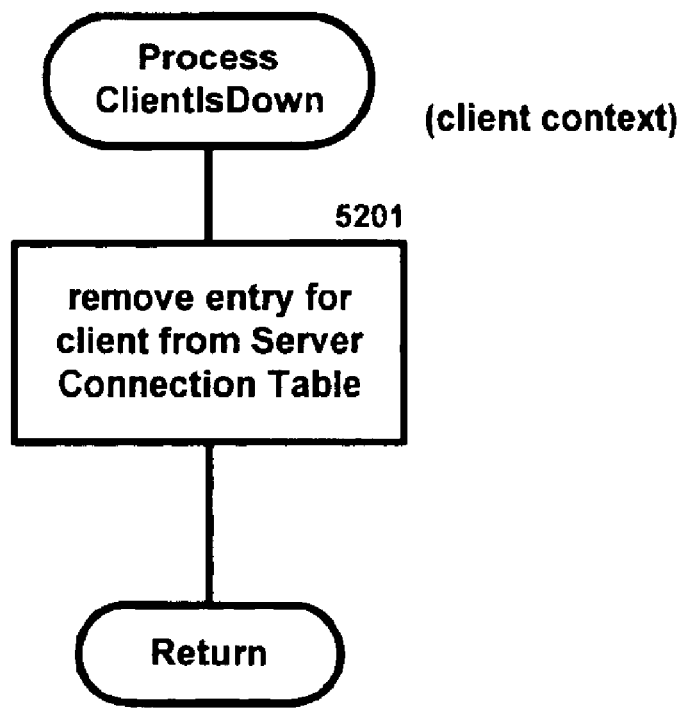
FIG. 52 is a flow diagram of an example implementation of the processClientIsDown function of a server node.

FIG. 52 is a flow diagram of an example implementation of the processClientIsDown function of a server node. In step 5301, the function removes the entry for the client connection from the server connection table. The function then returns.

4. Property Notifications

The tracking system also provides for watching the properties of a server resource by a client resource. A property of a resource corresponds to data related to the resource whose value can be set by that resource during execution of a function of the resource. That function can be invoked by another software component. The function may be specifically provided to set the value of the property (e.g., a set property function) or may set the value of the property as a side effect. In one embodiment, a property watching component of the resource tracking system allows client resources to register their interest in receiving notifications when a property of a server resource is set. The client resources also specify the behavior to be performed when the property is set. The property watching component provides a synchronous mechanism for notifying client resources when the property is set. This synchronous mechanism ensures that client resources who are registered to watch a property are notified of the setting of the property before any client resources are notified of a subsequent setting of the property. The property watching component thus provides a mechanism for synchronizing processing among multiple client resources.

Figure 53:
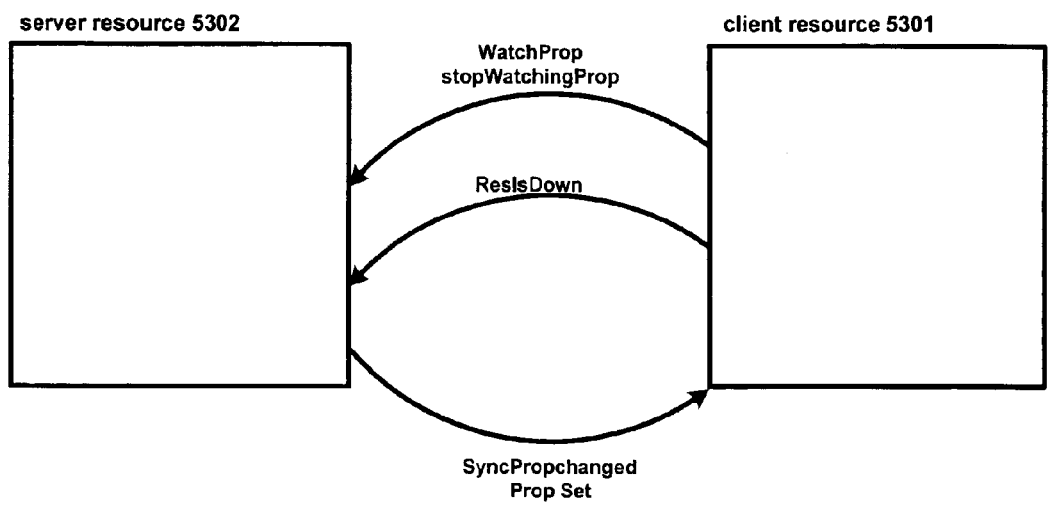
FIG. 53 is a block diagram illustrating the communications between a server resource and a client resource when watching a property.

FIG. 53 is a block diagram illustrating the communications between a server resource and a client resource when watching a property. When a client resource wants to watch a property of a server resource, the client resource registers to track the server resource as described above. When the server resource enters the up state, the client resource can then register to watch a property of the server resource. The client resource invokes a watch property function of the server resource passing the name of the property to be watched, an identification of the client resource, and a context of the client resource that uniquely identifies that property to the client resource. When the property of the server resource is set, the server resource invokes a property set function of the client resource passing the context received from the client resource and passing the value of the property. The property set function of the client resource can then use the context to identify the property and perform the behavior specified when the client resource specified its interests in watching the property. When the client resource no longer needs to watch the property, the client resource invokes the stop watching property function of the server resource. The server resource registers to monitor each of its client resources so that when a client resource goes down, the server resource receives a resource is down notification. Upon receiving such a notification, the server resource stops notifying the client resource when the property is set. In one embodiment, a client node may cache property values so requests to get the value of that property can be satisfied locally.

Figure 54:
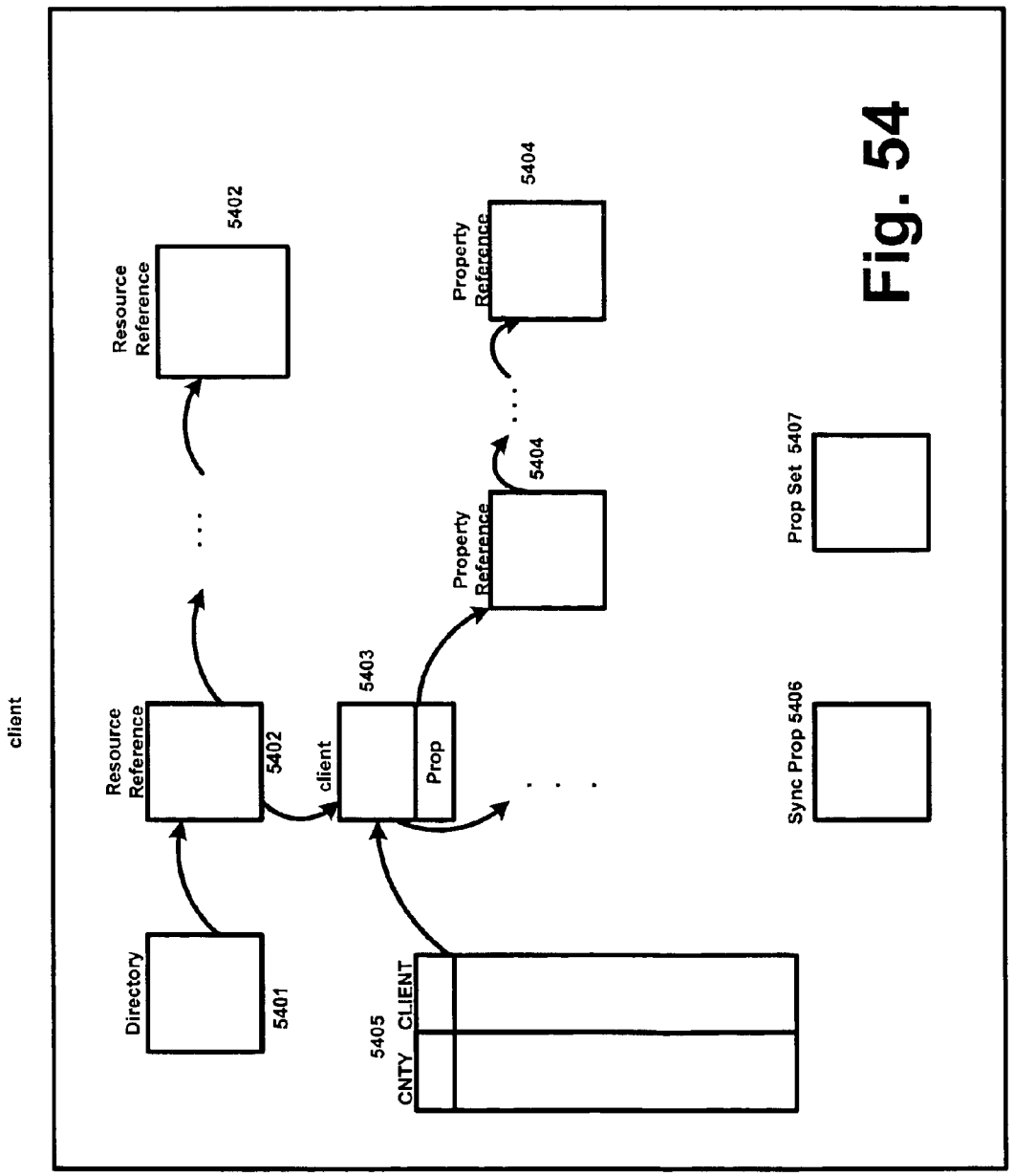
FIG. 54 is a block diagram of the components to support the watching of properties by a client resource.

FIG. 54 is a block diagram of the components to support the watching of properties by a client resource. In one embodiment, the property watching component of a client resource uses the directory object 5401, resource reference object 5402, and client object 5403 data structures that are used for tracking a resource. When a property of a server resource is being watched, a special type of client object is added to the list of client objects of the resource reference object for that server resource. The special type of client object indicates that it represents the watching of a certain property and includes a property reference object 5404 for each time that the client resource has registered to watch that property. Each property reference object has a function that is to be invoked when the property is set to notify the client resource. The context/client table 5405 contains an entry for each property of a server resource that is being watched by that client resource. Each entry contains a context and a property client indicator. The context uniquely identifies the server resource and property within the client resource, and the property client indicator points to the corresponding property client object. A client resource also includes a synchronize property function 5406 and a property set function 5407. The synchronize property function is invoked by the server resource when a client resource first registers to watch a certain property of that server resource to provide the current value of the property to the client resource. The property set function is invoked whenever a watched property is set. These functions are passed the context and the property value and perform the behaviors registered by the client resource.

Figure 55:
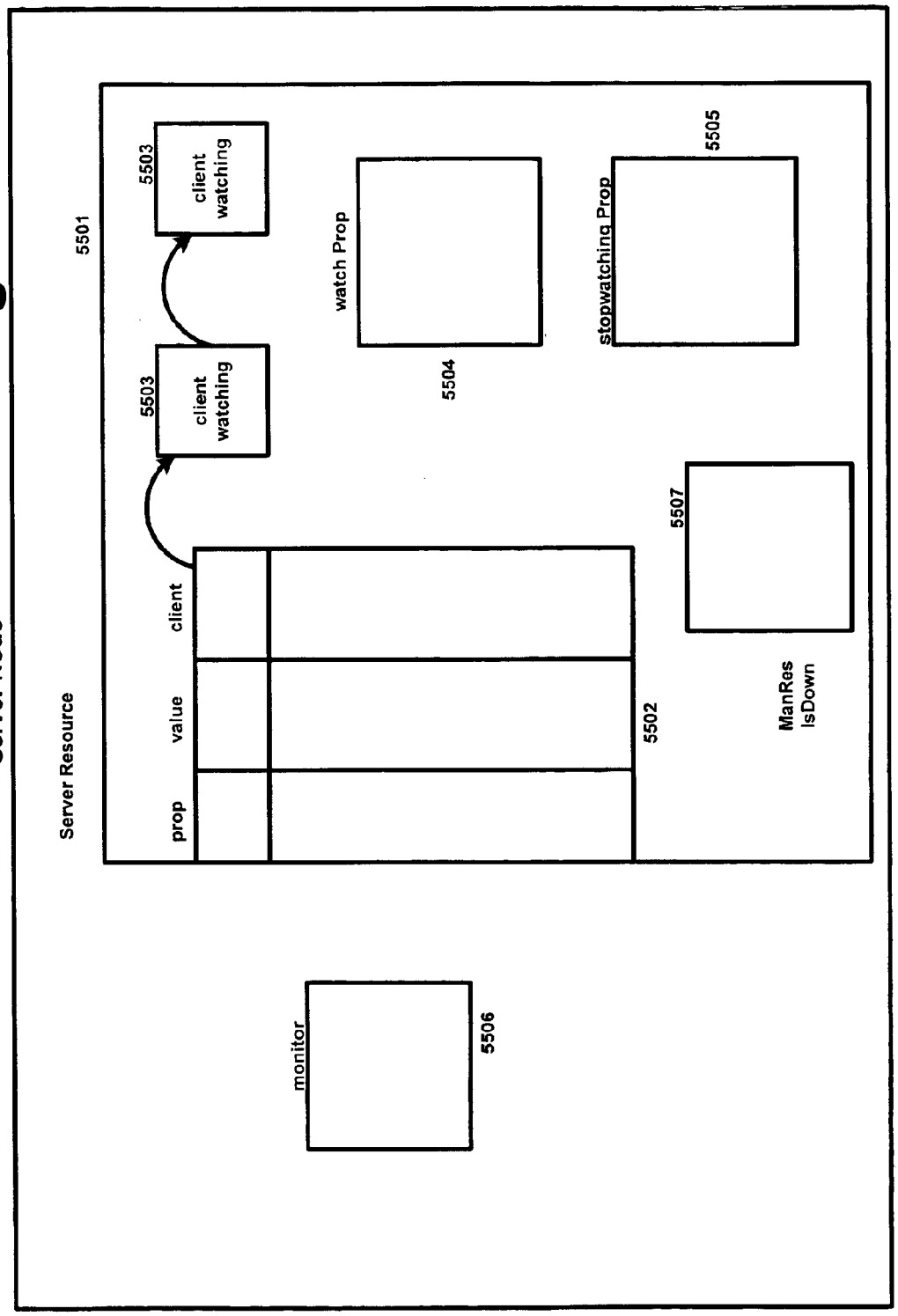
FIG. 55 is a block diagram illustrating the components to support the watching of properties of a server resource.

FIG. 55 is a block diagram illustrating the components to support the watching of properties of a server resource. The server resource 5501 includes a property/client table 5502. The property/client table contains an entry for each property of the server resource that is being watched. Each entry contains the name of the property, the value for that property, and a client watching object 5503 for each client resource that has registered to watch that property. Each entry may also include a queue for storing property values in the order in which they are set pending notification of each of the client resources. The server resource also includes a watch property function 5504 and a stop watching property function 5505. The watch property function is passed an indication of a property of the server resource, the identification of the client resource, and a context. The watch property function adds a client watching property object in the property/client table to indicate that the client resource is now watching the property. The watch property function also requests that the client resource to be monitored using a monitoring component 5506.

Figure 56:
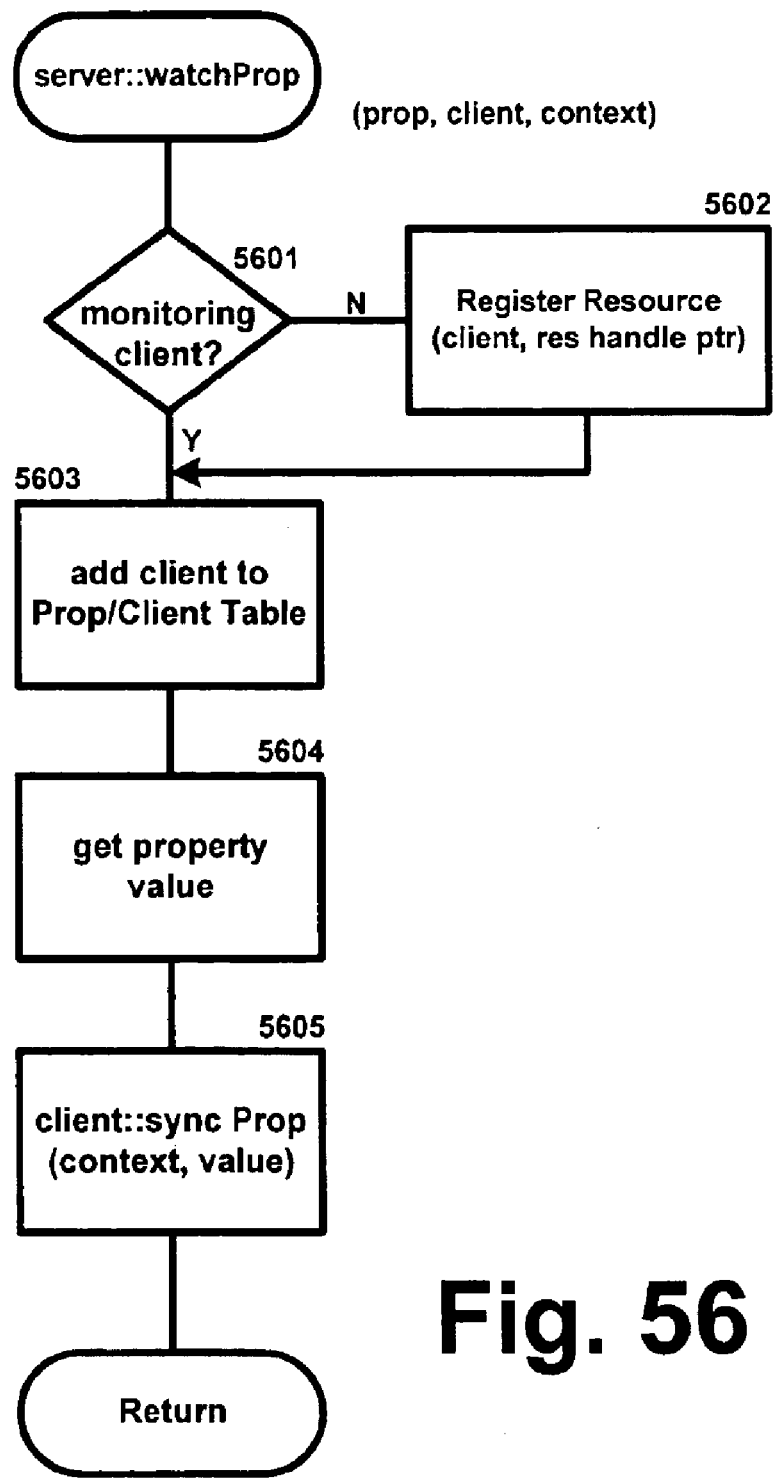
FIG. 56 is a flow diagram of an example implementation of the watch property function of the server resource.

FIG. 56 is a flow diagram of an example implementation of the watch property function of the server resource. This function is passed the name of a property, a reference to the client resource requesting to watch the property, and a context used to identify the watch within the client resource. In step 5601, if the server resource is already monitoring the client resource, the function continues at step 5603, else the function continues at step 5602. In step 5602, the function invokes the register resource function passing an indication of the client resource to register for tracking the client resource and receiving in return a handle for identifying that registration. In general, a server resource will only receive one watch property invocation for each property that a client resource registers an interest. The monitoring of the client resource may be performed using the watching and monitoring components of the resource tracking system as described above or may be performed using a monitoring component that is adapted for specifically monitoring client resources that are watching a property. In step 5603, the function adds an entry into the property/client table for the client. In step 5604, the function retrieves the property value for that property. In step 5605, the function invokes the synchronize property function of the client resource passing the context and the retrieved property value. The function then returns.

Figure 57:
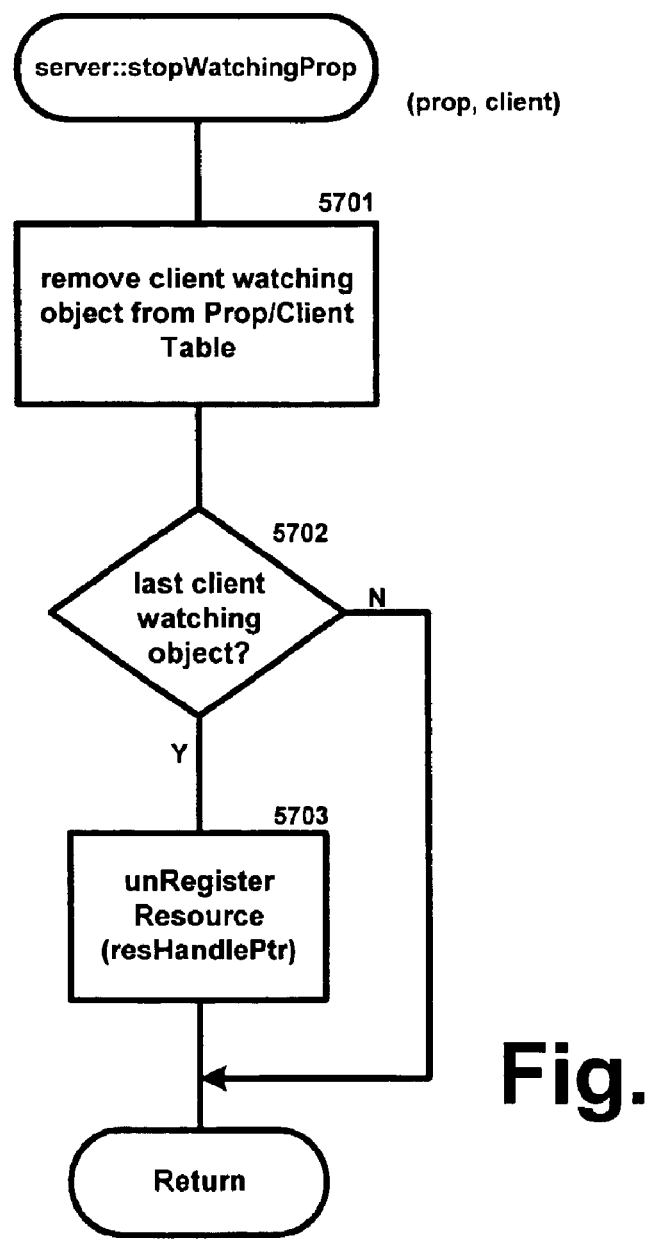
FIG. 57 is a flow diagram of an example implementation of the stop watching property function of the server resource.

FIG. 57 is a flow diagram of an example implementation of the stop watching property function of the server resource. This function is passed the name of a property and an indication of the client resource. In step 5701, the function removes the client watching object for that client resource for that property from the property/client table. In step 5702, if the property/client table contains no more client watching objects for that client resource, then the function continues at step 5703, else the function returns. In step 5703, the function invokes the unregister resource function to stop monitoring that client resource. The function then returns.

Figure 58:
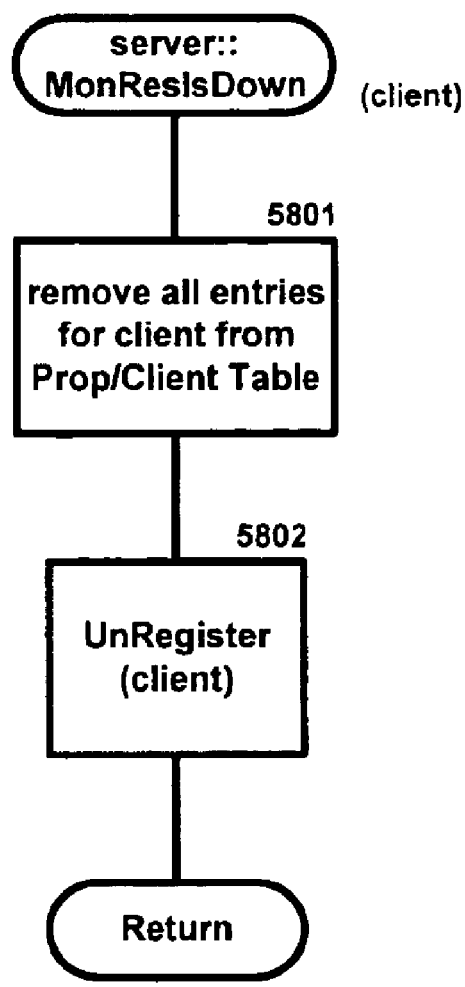
FIG. 58 is a flow diagram of an example implementation of the monitor resource is down function of the server resource.

FIG. 58 is a flow diagram of an example implementation of the monitor resource is down function of the server resource. This function is passed the identification of the client resource that is down. In step 5801, the function removes all client watching objects for the client resource from the property/client table. In step 5802, the function unregisters monitoring of that client resource and then returns.

Figure 59:
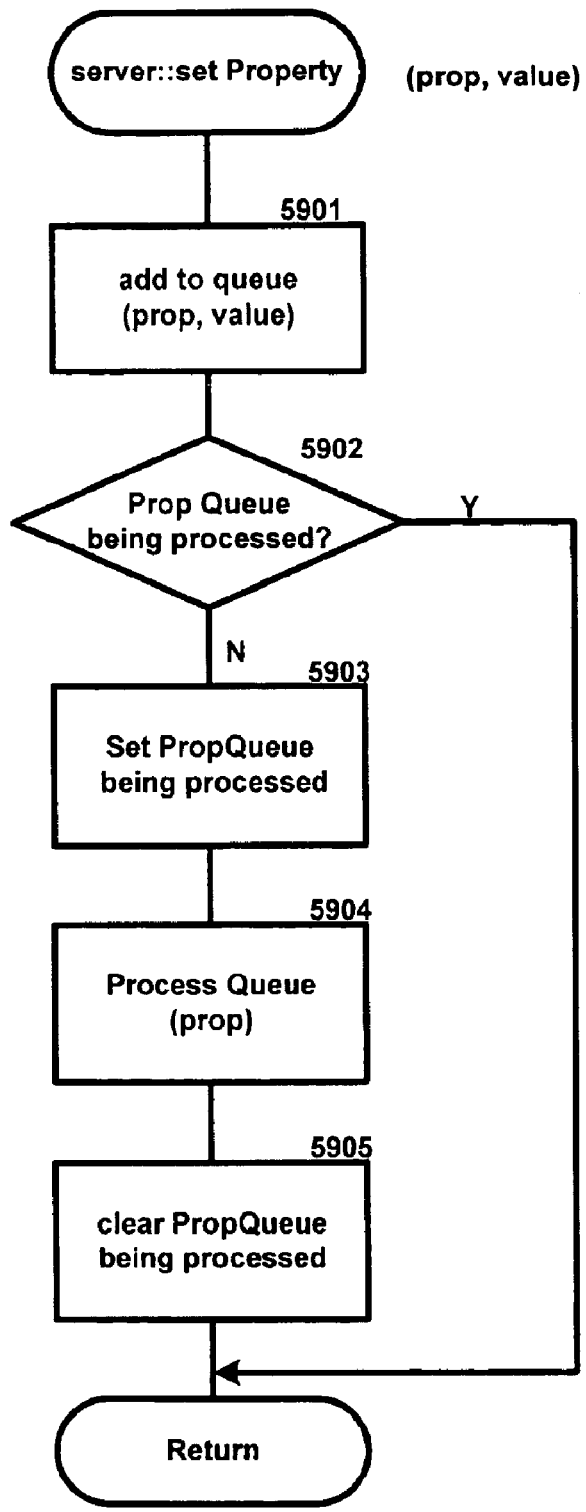
FIG. 59 is a flow diagram of an example implementation of the set property function of the server resource.

FIG. 59 is a flow diagram of an example implementation of the set property function of the server resource. The set property function of the server resource is passed the name of the property and a value. This function adds the property value to a queue for that property and then processes the values in the queue to notify the client resources. In step 5901, the function updates the property value in the property/client table and adds the property value to the queue for that property. In step 5902, if that property queue is being processed to by another thread, then the function returns, else the function continues at step 5903. In step 5903, the function sets a property queue is being processed flag to indicate that this thread will begin processing the queue for this property. In step 5904, the function invokes the process queue function to process the queue for this property. In step 5905, the function clears the property queue is being processed flag and then returns. In one embodiment, each property has an object associated with it that provides the functions and data structures for managing and processing the queue.

Figure 60:
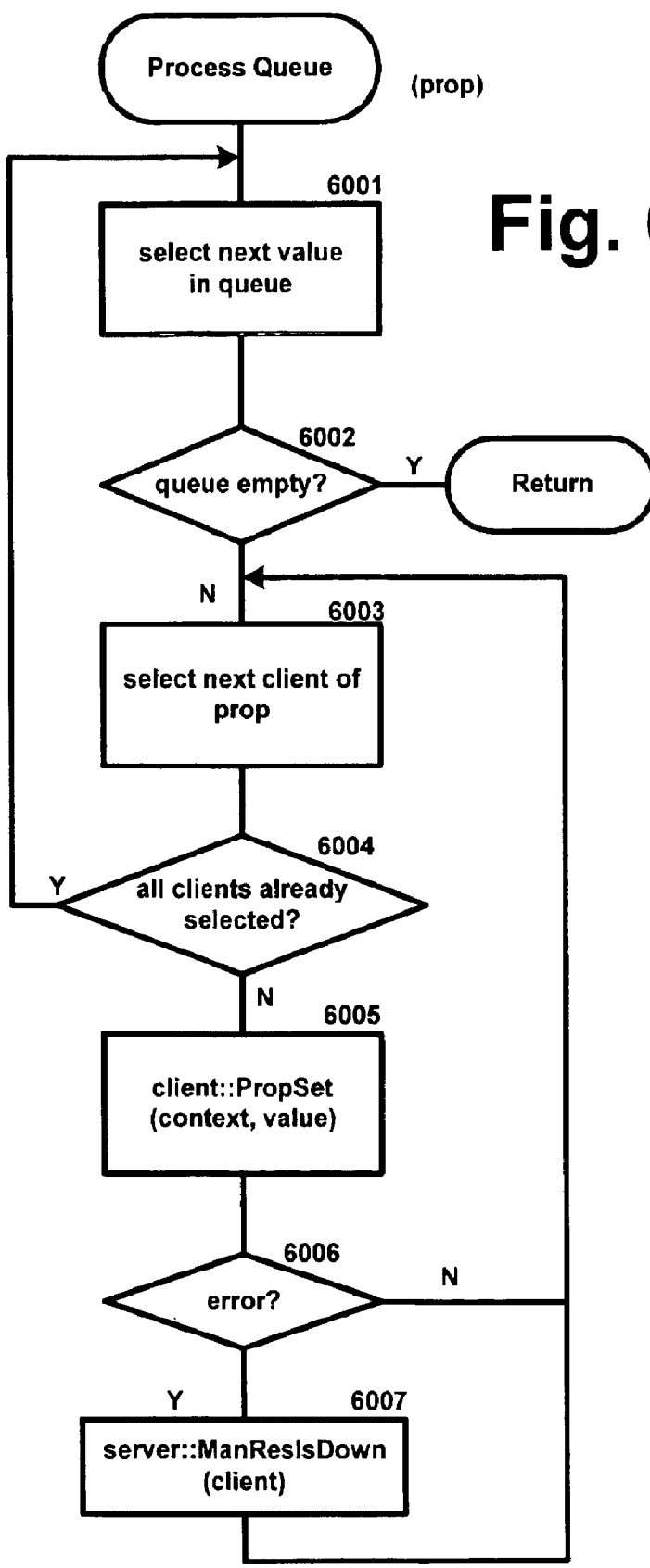
FIG. 60 is a flow diagram of the process queue function.

FIG. 60 is a flow diagram of the process queue function. The process queue function loops selecting each value in the queue for a property and notifying each client resource that is watching that property. In step 6001, the function selects the next value in the property queue. In step 6002, if the queue is empty, then the function returns, else the function continues at step 6003. In steps 6003–6007, the function loops notifying each client resource who is watching the property. In step 6003, the function selects the next client resource of the property as indicated by the client watching objects. In step 6004, if all the client resources have already been selected, the function loops to step 6001 to select the next value in the property queue. In step 6005, the function invokes the property set function of the selected client resource passing the context and the value for the property. This function is a synchronous invocation so that it does not return until the client resource performs its behaviors associated with this property. In step 6006, if an error is returned, then the client resource is assumed to be down and the function continues at step 6007, else the function loops to step 6003 to select the next client resource of the property. In step 6007, the function invokes the monitor resource is down function passing the client resource and then loops to step 6003 to select the next client resource of the property.

Figure 61:
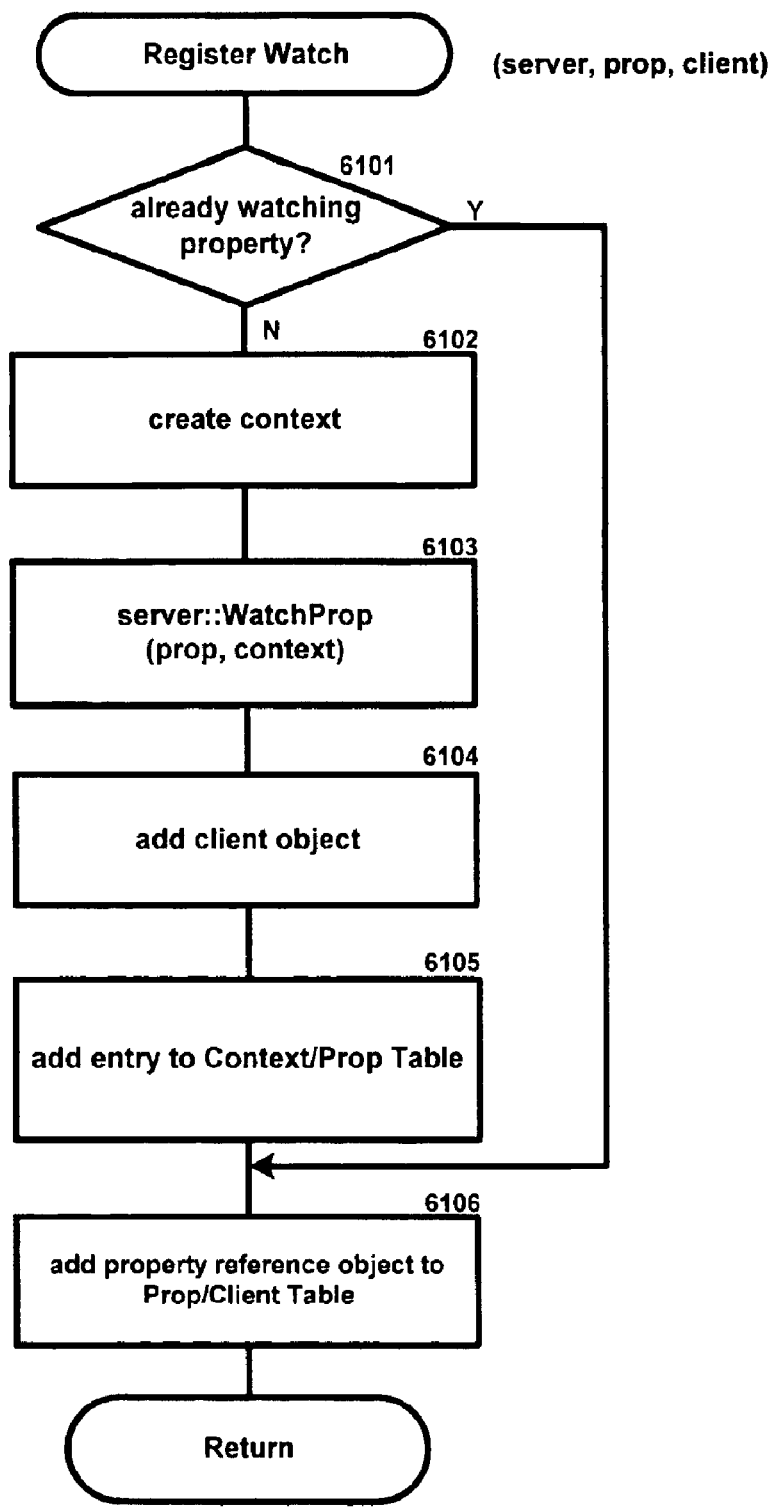
FIG. 61 is a flow diagram of an example implementation of a register watch function of a client resource.

FIG. 61 is a flow diagram of an example implementation of a register watch function of a client resource. This function is passed the identification of the server resource, the name of the property to be watched, and identification of the client resource. In step 6101, if the client resource is already watching that property, then the function continues at step 6106, else the function continues at step 6102. In step 6102, the function creates a unique context for the client resource and property. In step 6103, the function invokes the watch property function of the server resource passing the name of the property and the context. In step 6104, the function creates a property client object for that property and adds that object to the client object list of the resource reference object for that resource. In step 6105, the function adds an entry to the context/property table. In step 6106, the function adds a property reference object to the list associated with the property client object and then returns.

Figure 62:
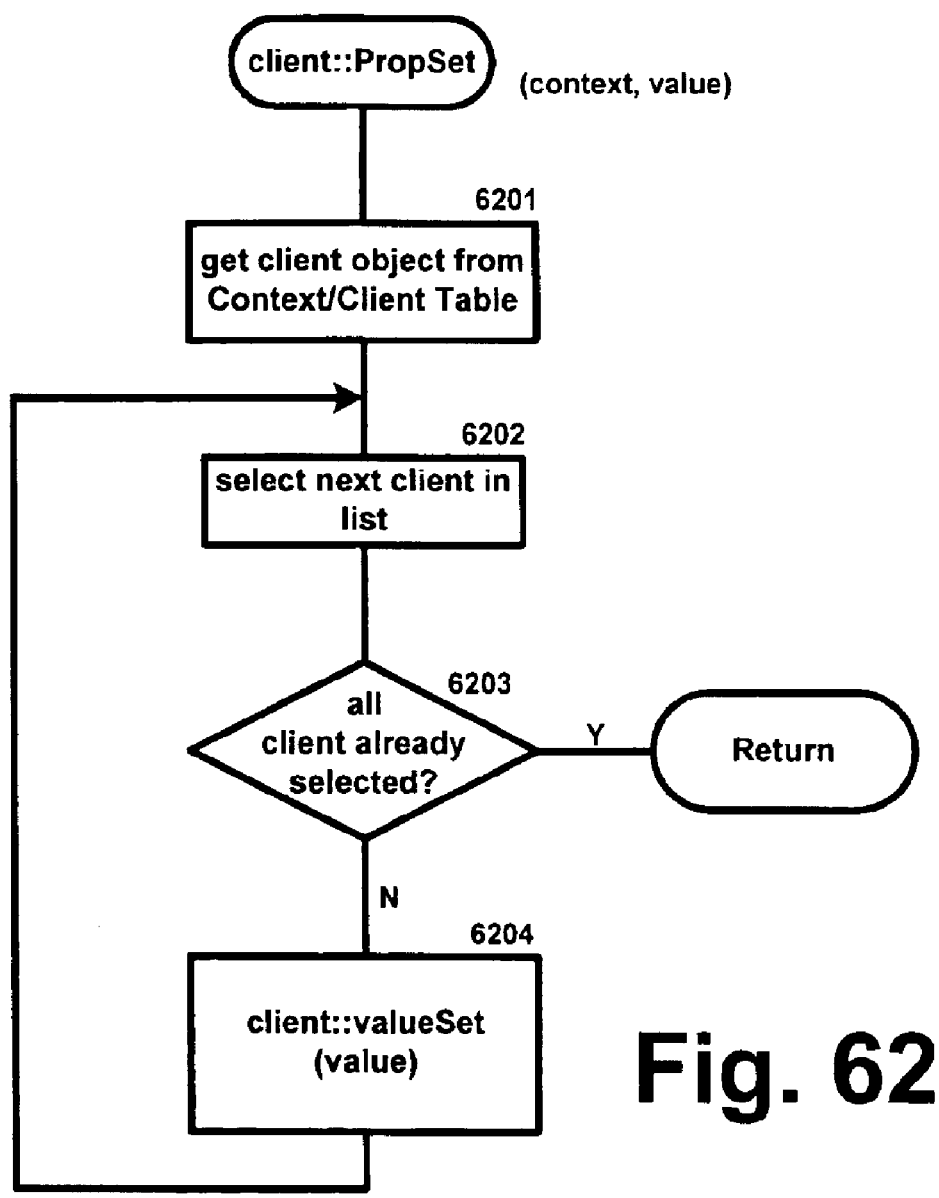
FIG. 62 is a flow diagram of an example implementation of the property set function of the client resource.

FIG. 62 is a flow diagram of an example implementation of the property set function of the client resource. This function is passed a context and a property value. In step 6001, the function retrieves the pointer to the property client object from the context/client table using the passed context. In step 6202–6204, the function loops invoking the behavior associated with each property reference object for that property client object. In step 6202, the function selects the next property reference object starting with the first. In step 6203, if all the property reference objects have already been selected, then the function returns, else the function continues at step 6204. In step 6204, the function invokes the value set function of the property reference object to notify the client resource that the property has been set. The function then loops to step 6202 to select the next property reference object.

5. Event System

The event system provides a mechanism for providing event notifications when events are generated by resources. An event is an asynchronous signal that is distributed to all client resources, also referred to as listeners, who have registered to listen for an event signal. In one embodiment, the event system neither guarantees that a listener will receive the events in the order they are generated nor guarantees that each listener will receive every event for which it is listening. Each event has an associated event type. A listener registers to listen for events of a certain event type. In one embodiment, the event types may be hierarchically organized. For example, one event type may be a timer event. The timer events may be further classified into catastrophic timer events, warning tuner events, and informational timer events, which are sub-events. An informational timer event may further be classified into start-up timer events and shut-down timer events. A listener may register to listen for events at any level in the event hierarchy. For example, a listener may register to listen for informational timer events. That listener would receive an event notification as for start-up tuner events and a shut-down timer events. A listener will receive event notifications for leaf events of the sub-tree corresponding to the event type registered. A leaf event is an event that is not further classified into sub-events. An event type may have its hierarchy embedded in its name. For example, the name of start-up timer event may be "/timer event/informational time event/start-up timer event."

Figure 63:
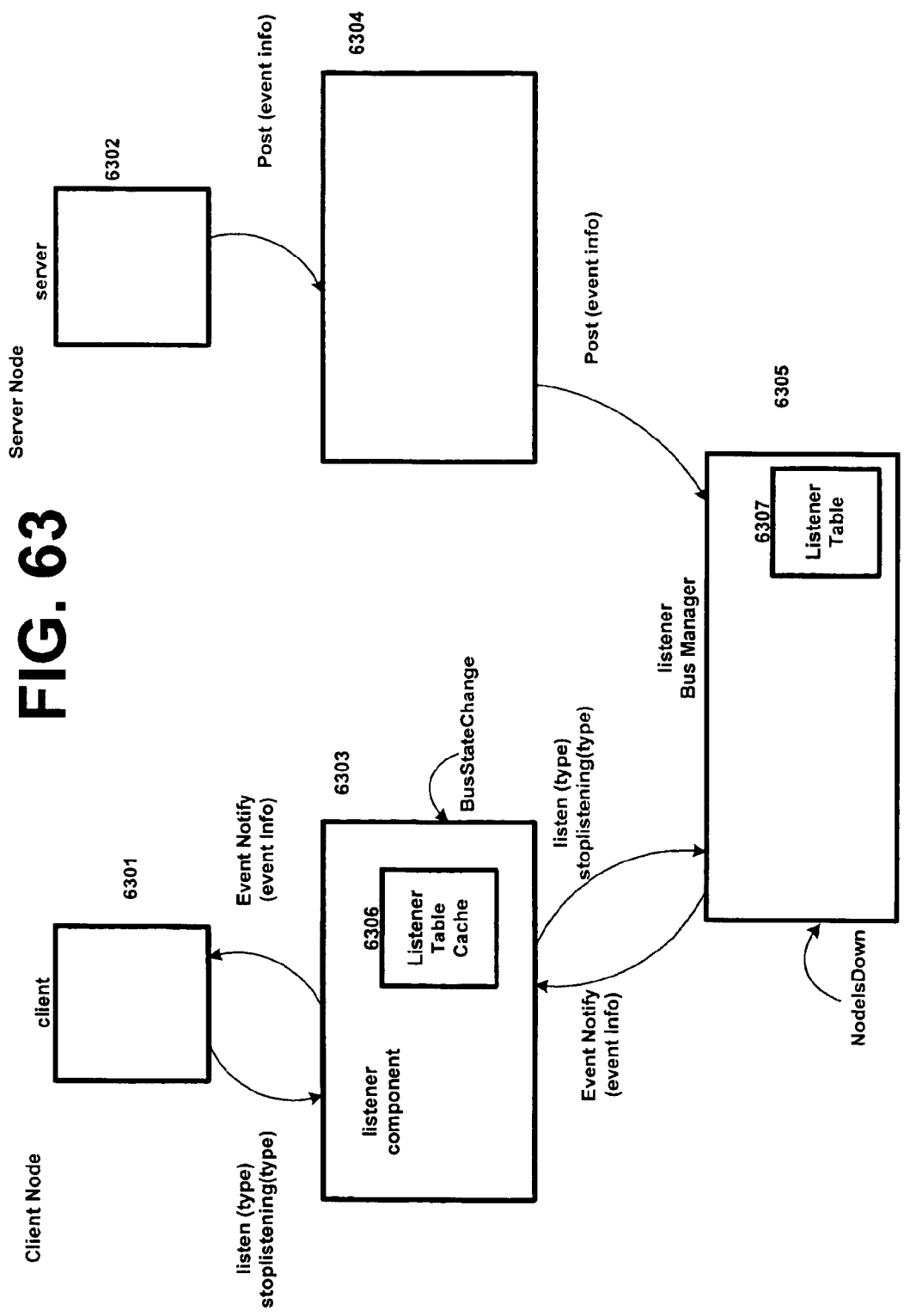
FIG. 63 is a block diagram illustrating components of the event system in one embodiment.

FIG. 63 is a block diagram illustrating components of the event system in one embodiment. A client 6301 registers to listen for events by sending a listen message along with an event type to the listener component 6303. The client receives from the listener component an event notify message along with event information when an event of that event type is generated. The client un-registers its interest in listening for events of a certain event type by sending a stop listening message along with the event type to the listener component. In one embodiment, each node has a listener component through which is routed all event-related messages for all listeners on that node. The listener component may in turn route event-related messages to a listener bus manager 6305. The listener component notifies the listener bus manager to listen for all event types for which listeners on that node have registered. The listener component may send only the listener bus manager. There is one listen message for each event type regardless of how many listeners at that node have registered for that event type. For example, if a listener component receives requests from six clients, the listener component sends only one listen message to the listener bus manager. The listener component maintains a listener table cache 6306 that contains a mapping from each event type for which a listen request has been registered and each client that has registered for that event type. When the listener component receives an event notification, it uses the listener table cache to notify each listener that has registered for that event type. In this way, the listener component reduces the event messages that are sent between that node and the node of the listener bus manager. When the listener component receives event notifications, it queues an event notifications for each of the listeners. The listener component uses a separate thread for providing the event notification to each listener. If a single thread were used to notify each listener, the event notifications could be delayed to some listeners as a result of a delay or problem in notifying another listener. The use of a separate thread for each listener ensures that the notification to one listener will not be delayed as a result of an event notification to another listener. The listener component may receive a bus state change message. If the bus goes down and then comes back up, the listener component can reregister with the listener bus manager to receive the events of the event types in its listener table cache. The listener component may also optimize its sending of listen requests based on the event hierarchy. For example, if a listener registers to listen for a informational timer, the listener component will register that request with the listener bus manager. If another listener registers to listen for a start-up timer, then the listener component will not need to register that request with the listener bus manager. Since the listener component has already registered to receive a higher-level event type, it is already registered to receive all lower-level event types.

The listener bus manager maintains a listener table 6307. The listener table contains a mapping from each event type to the registering nodes. When the listener bus manager receives an event posting, it notifies each node who has registered to listen for events of that event type and any event type that is a parent event type. The listener bus manager queues event notifications in a manner that is similar to the queuing performed by the listener component. In particular, the listener bus manager allocates a different thread for each node to which an event notification is sent so that the event notifications to other nodes are not delayed because of problems in notifying one node. The listener bus manager may receive a node is down message and remove the entries from the listener table for that node so that no more event notifications will be sent to that node. A server 6302 may generate and post events by sending a post event message to the listener bus manager. The post event message includes event information that describes the event. The event information may include the event type, a time associated with the event an indication of who generated the event, and the reason the event was generated.

6. Logging System

All log records are classified using an ASN.1 Object Id. Standard Log record ASN.1 Type Classification:

| | |
|---|---|
| 1.x | All log records |
| 1.x.0 | NonCritical |
| 1.x.0.0 | Trace output |
| 1.x.0.1 | Progress |
| 1.x.1 | Error |
| 1.x.2 | Warning |

Log records are composed of four fields of information: type, time, creator, information. Type and time are ASN.1 ids while the creator can be either an ASN.1 HcsResource instance id or a text string. The information field is the actual text generated by the logging component.

There are various components in the system that are responsible for the collecting, storage, and possible forwarding of log records. All forms of this component are modeled by the HcsLogFacility class.

HcsLogFacility Class

The HcsLogFacility class is an HcsResource derivation whose purpose is to provide storage and forwarding at various levels in the system. There are currently two implementations: the Local Log Facility, and the Central Log Facility. The HcsLogFacility interface is:

```
class HcsLogFacility:public HcsResource
{
public:
    .
    .
    .
    virtual HRESULT putRecord (char* typeAsnIIdStrPtr,
        char* timeAsn1StrPtr,
        char* idStrPtr,
        char* recordPtr) = 0;
}
```

The Local Log Facility

A Local Log Facility (LLF) instance (only one!) exists in every node in the system. The purpose of this HcsLogFacility implementation is to accept all log records from various HCS components on that node and to buffer them in a large circular on disk until they can be delivered to the Central Log Facility (CLF). The intent is that a node could survive for some time if the CLF were to be unavailable. One of the configuration parameters passed to each Local HcsLogFacility instance will be the resource name of the HcsLogFacility through which that instance is to forward its records. The current thinking is that this will be the name of the CLF, but this is not an architectural requirement. In other words, there could be intermediate levels of HcsLogFacilities placed in the system. In fact, an LLF could be configured to forward its records to another LLF. After all, an HcsLogFacility is a HcsLogFacility.

The Central Log Facility

There will be one instance of the Central Log Facility (CLF) instance in the entire system. The purpose of this HcsLogFacility implementation is to accept all log records from various HCS components within the entire system and to provide for the final storage of this information. The intent is that this facility provide for the long term, off line, archival of the entire HCS system log. In addition to this function, it will also provide for the on-line viewing of some portion of the log.

How Log Records are Written

So the question is: how do HCS components log their information? To provide a standard and safe access to the HcsLogFacilities, there is a class family provided. The family is based at a class called HcsLogPort. This class implements the common behavior of all types of LogPorts and is functional on its own.

Derived from the HcsLogPort are the HcsResourceLogPort and HcsLogFacilityPort classes. The HcsResourceLogPort provides easy support for the resource developer while the HcsLogFacilityPort provides direct access to HcsLogFacilities. In general, the first is used by Resource derivations while the second would be used by resource servers and system components.

```
class HcsLogPort
{
    public:
        /* Global Constant AsnObjectIds for all defined log record types --
    SEE INCLUDE FOR TYPE LIST */
        #include <HcsLogRecTypes.h>
    public:
        HcsLogPort (char* idStrPtr);
        virtual ~HcsLogPort (void);
        void put (const Asn1ObjectId* typePtr, char* formatStrPtr, . . .);
        inline char* getIdStrPtr (void) {return(myIdStrPtr); };
        BOOL setIdStr (char* newIdStrPtr);
        /* Methods to control log filtering */
        void enable (char* asn1IdOfLogRecTypeToEnablePtr);
        void disable (char* asn1IdOfLogRecTypeToDisablePtr);
        BOOL isEnabled (char* asn1IdOfLogRecTypeToChkPtr);
        BOOL isEnabled (const Asn1ObjectId* logRecTypeToChkPtr);
        inline HRESULT dumpFilterState (TextSink* toSinkPtr, int
maxLineSize)
            {return(myFilter.dumpState(toSinkPtr)); };
        inline void resetFilter (void) {myFilter.reset( ); };
        void forwardRec (const Asn1ObjectId* typePtr, char* timeAsn1StrPtr,
char* idStrPtr, char* recordPtr);
                /* used to forward from one
HcsLogPort implementation to another */
    protected:
        /* Derivation Interface */
        /* Defaults to writing errors only to the NT SystemLog */
        virtual void dumpRec(const Asn1ObjectId* typePtr, char*.
timeAsn1StrPtr, char* idStrPtr, char* recordPtr);
    private:
        void putOver (void);
        HcsLogPort (void);
        void* operator new (size_t size);
    private:
        char*           myIdStrPtr;
        HANDLE          myHandle;
        DWORD           myIdEvent;
        Asn1Set         myFilter;
    public:
        /* Grand fathered Methods */
        void setTrace (BOOL to);
        void setProgress (BOOL to);
        void setWarning (BOOL to);
        BOOL isTraceEnabled (void);
        BOOL isProgressEnabled (void);
        BOOL isWarningEnabled (void);
        void putError (char* formatStrPtr, . . .);
        void putWarning (char* formatStrPtr, . . .);
        void putTrace (char* formatStrPtr, . . .);
        void putProgress (char* formatStrPtr, . . .);
        void putMaintFailure (char* formatStrPtr, . . .);
};
    /* class used by resource implementors */
    class HcsResourceLogPort:public HcsLogPort
{
    public:
        HcsResourceLogPort (HcsResourceImp* ownerPtr, char* idStrPtr);
        virtual ~HcsResourceLogPort (void);
    protected:
        /* routes all output through the owning HcsResourceImp's
    putLogRecord private support method */
        void dumpRec(char* typeAsn1IdStrPtr, char* timeAsn1StrPtr, char*
    idStrPtr, char* recordPtr);
    private:
        HcsResourceLogPort (void);
        void* operator new (size_t size);
};
    /* class used by non resource centric implementations */
    class HcsLogFacilityPort:public HcsLogPort
{
    public:
        HcsLogFacilityPort (char* idStrPtr);
        HcsLogFacilityPort (HcsLogFacility* facilityPtr, char* idStrPtr);
        HRESULT setFacility (HcsLogFacility* facilityPtr);
        HRESULT clearFacility (void);
        BOOL isFacilitySet (void);
    inline BOOL isTapped (void) {return(myIsTapped); };
    inline void setTapOn (void) {myIsTapped = TRUE; };
```

-continued

```
    inline void setTapOff (void) { myIsTapped = FALSE; };
        virtual ~HcsLogFacilityPort (void);
    protected
        /* defaults to writing errors only to the NT SystemLog (chicago??)
    unless an HcsLogFacility is made available
            and is functioning */
        void dumpRec (const Asn1ObjectId* typePtr, char* timeAsn1StrPtr,
    char* idStrPtr, char* recordPtr);
    private:
        HcsLogFacilityPort (void);
        void* operator new (size_t size);
    private:
        HcsLogFacilityOlePtr    myFacOlePtr;
        BOOL          myIsFacSet;
    BOOL       myIsTapped;
};
```

Effects on the HcsResourceImp Interface

HcsResourceImp::putLogRecord implementation: keeps an internal HcsLogFacilityPort instance which is used to forward records through. Before a record is actually forwarded, HcsResourceImp checks to make sure an HcsLogFacility has been assigned to its port. If this is not the case, an attempt is made to locate the local HcsLogFacility for that node via the HcsResrcBusIf::locateLocalResourceById method (new). In any case, the log record is written via the resource instance's HcsLogFacilityPort.

New: The HcsResource interface defines, and the HcsResourceImp implements, two methods:

HRESULT enableLogging ([in, string]char* forLogRecClassPtr);

HRESULT disableLogging ([in, string]char* forLogRecClassPtr);

These are used by support to enable and disable logging dynamically within instances of HcsResources.

The HcsLogFacility Class and HcsLogFacilityPorts

Notice that any HcsLogFacility can be referenced by a HcsLogFacilityPort. This means that some components may wish to connect directly to the CLF. A good example of this may be the Resource Bus Manager (RBMGR.EXE).

Although specific embodiments of, and examples for, the present invention are described herein for illustrative purposes, it is not intended that the invention be limited to these embodiments. Equivalent methods, structures, processes, steps and other modifications within the spirit of the invention fall within the scope of the invention. Accordingly, the invention is not limited to the specific embodiments, but instead the scope of an invention is specified by the following claims.

What is claimed is:

1. A method in a computer system for providing property notifications for properties of software components in a distributed computing environment, the method comprising:
   registering, by a first software component, an interest in watching a property of a second software component;
   receiving a notification by the first software component when the property of said second software component is set;
   establishing direct communications between said first software component and said second software component;
   monitoring a state of the first software component, wherein monitoring a state comprises receiving periodic notifications from the first software component; and
   determining when the first software component is in a down state based upon said monitoring and resetting an internal state of the second software component.

2. The method of claim 1, further including retrieving the state of the property independently of receiving the notification when the property is set.

3. The method of claim 1, further including un-registering the interest in watching the property of the second software component.

4. The method of claim 1, wherein the property has associated access rights and wherein an interest can only be registered by the first software component if the first software component has sufficient access rights.

5. The method of claim 1, wherein a plurality of first software components have registered an interest in watching the property, and wherein each software component that is watching the property receives notification of a current setting of the property before any software component that is watching the property receives a notification of a subsequent setting of the property.

6. The method of claim 1, wherein a plurality of first software components have registered an interest in watching the property, and wherein each software component that is watching the property receives notifications of a plurality of settings of the property in the same temporal order in which the plurality of settings occurred.

7. A method in a computer system for providing property notifications for property settings in a distributed computing environment, the method comprising:
   for each of a plurality of software components, registering an interest in watching a property, wherein the property is associated with a server node;
   receiving a notification when the property of interest is set;
   establishing direct communications for the plurality of software components with the server node based on the received notification;
   periodically notifying the server node by said direct communications that a software component is operational if said software component is operational;
   setting the property a plurality of times; and
   for each setting of the property, notifying each software component of the plurality of software components that the property has been set prior to notifying any software component of the plurality of software components of any later setting of the property.

8. The method of claim 7, wherein a software component of the plurality of software components receives the notifications of the settings in the same temporal order in which the plurality of settings occurred.

9. The method of claim 1, further including, after said registering, determining when the second component enters an up state.

10. The method of claim 9, wherein said registering takes place prior to instantiation of the second component.

11. A computer readable medium comprising computer executable instructions for performing the method of claim 1.

12. A computer readable medium comprising computer executable instructions for performing the method of claim 8.

13. A modulated data signal carrying computer executable instructions for performing the method of claim 1.

14. A modulated data signal carrying computer executable instructions for performing the method of claim 8.

15. A computing device comprising means for performing the method of claim 1.

16. A computing device comprising means for performing the method of claim 8.

* * * * *